United States Patent
Sato et al.

(10) Patent No.: US 10,927,271 B2
(45) Date of Patent: Feb. 23, 2021

(54) MICROCAPSULE, AQUEOUS DISPERSION, METHOD FOR MANUFACTURING AQUEOUS DISPERSION, AND IMAGE FORMING METHOD

(71) Applicant: FUJIFILM CORPORATION, Tokyo (JP)

(72) Inventors: Noriaki Sato, Kanagawa (JP); Ichiro Koyama, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 122 days.

(21) Appl. No.: 16/033,199

(22) Filed: Jul. 12, 2018

(65) Prior Publication Data

US 2018/0320012 A1 Nov. 8, 2018

Related U.S. Application Data

(63) Continuation of application No. PCT/JP2017/002174, filed on Jan. 23, 2017.

(30) Foreign Application Priority Data

| Feb. 5, 2016 | (JP) | JP2016-021362 |
| Jul. 22, 2016 | (JP) | JP2016-144296 |

(51) Int. Cl.

| B01J 13/16 | (2006.01) |
| C09D 11/38 | (2014.01) |
| C08G 18/80 | (2006.01) |
| C08G 18/79 | (2006.01) |
| C08G 18/78 | (2006.01) |
| C08G 18/38 | (2006.01) |
| C08G 18/67 | (2006.01) |
| B01J 13/14 | (2006.01) |
| C09D 11/30 | (2014.01) |
| B41J 2/01 | (2006.01) |

(Continued)

(52) U.S. Cl.
CPC ............ *C09D 11/38* (2013.01); *B01J 13/14* (2013.01); *B01J 13/16* (2013.01); *B41J 2/01* (2013.01); *C08G 18/3821* (2013.01); *C08G 18/673* (2013.01); *C08G 18/7831* (2013.01); *C08G 18/792* (2013.01); *C08G 18/794* (2013.01); *C08G 18/8025* (2013.01); *C08G 18/8029* (2013.01); *C09D 11/033* (2013.01); *C09D 11/101* (2013.01); *C09D 11/102* (2013.01); *C09D 11/30* (2013.01)

(58) Field of Classification Search
CPC ... B01J 13/14; B01J 13/16; B41J 2/01; C08G 18/3821; C08G 18/673; C08G 18/7831; C08G 18/792; C08G 18/794; C08G 18/8025; C08G 18/8029; C09D 11/033; C09D 11/101; C09D 11/102; C09D 11/30; C09D 11/38

See application file for complete search history.

(56) References Cited

U.S. PATENT DOCUMENTS

| 2018/0127612 A1* | 5/2018 | Sato ............... C08G 18/227 |
| 2018/0142111 A1 | 5/2018 | Sato et al. |

FOREIGN PATENT DOCUMENTS

| CN | 107849349 A | 3/2018 |
| CN | 107922729 A | 4/2018 |
| EP | 3345966 A1 | 7/2018 |
| EP | 3345967 A1 | 7/2018 |

(Continued)

OTHER PUBLICATIONS

Extended European Search Report dated Nov. 22, 2018, issued in corresponding EP Patent Application No. 17747246.1.

(Continued)

*Primary Examiner* — Irina S Zemel
(74) *Attorney, Agent, or Firm* — Solaris Intellectual Property Group, PLLC

(57) ABSTRACT

Provided are a microcapsule including a shell that has a three-dimensional cross-linked structure containing a hydrophilic group and Structure (1) and including a core that is in the interior of the shell, in which at least one of the shell or the core has a polymerizable group; and an application thereof. In Structure (1), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from X, $R^1$ to $R^3$ represent an aliphatic hydrocarbon group having 5 to 15 carbon atoms which may have a ring structure, provided that an aliphatic hydrocarbon group having an aromatic ring is excluded from $R^1$ to $R^3$, and * represents a binding position, each of p, m, and n is equal to or greater than 0, and p+m+n equals 3 or greater.

Structure (1)

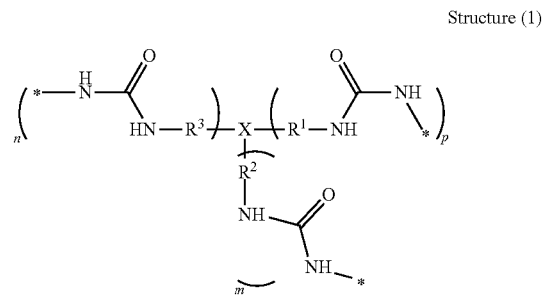

19 Claims, No Drawings

(51) Int. Cl.
  *C09D 11/033* (2014.01)
  *C09D 11/101* (2014.01)
  *C09D 11/102* (2014.01)

(56) References Cited

FOREIGN PATENT DOCUMENTS

| | | | |
|---|---|---|---|
| JP | 2000-211262 A | 8/2000 | |
| JP | 2005-255958 A | 9/2005 | |
| JP | 2006-89577 A | 4/2006 | |
| JP | 2006-089577 A | 4/2006 | |
| JP | 2007-292961 A | 11/2007 | |
| JP | 2009-6544 A | 1/2009 | |
| JP | 2012-139643 A | 7/2012 | |
| JP | 2012-140574 A | 7/2012 | |
| JP | 2014-507433 A | 3/2014 | |
| WO | WO-2011154893 A1 * | 12/2011 | ......... C11D 17/0039 |
| WO | 2015/158652 A2 | 10/2015 | |
| WO | 2015/158654 A1 | 10/2015 | |

OTHER PUBLICATIONS

English language translation of the following: Office action dated Apr. 23, 2020 from the SIPO in a Chinese patent application No. 201780009023.0 corresponding to the instant patent application. This office action translation is submitted now in order to supplement the understanding of the cited references which are being disclosed in the instant Information Disclosure Statement.
International Search Report issued in International Application No. PCT/JP2017/002174 dated Mar. 7, 2017.
Opinion of the ISA issued in International Application No. PCT/JP2017/002174 dated Mar. 7, 2017.
English language translation of the following: Office action dated Feb. 19, 2019 from the JPO in a Japanese patent application No. 2017-565487 corresponding to the instant patent application.
Office Action dated Feb. 10, 2020, issued by the EPO in corresponding EP Patent Application No. EP17747246.1.

* cited by examiner

MICROCAPSULE, AQUEOUS DISPERSION, METHOD FOR MANUFACTURING AQUEOUS DISPERSION, AND IMAGE FORMING METHOD

CROSS-REFERENCE TO RELATED APPLICATIONS

This application is a continuation application of International Application No. PCT/JP2017/002174, filed Jan. 23, 2017, the disclosure of which is incorporated herein by reference in its entirety. Further, this application claims priority from Japanese Patent Application No. 2016-021362, filed Feb. 5, 2016, and Japanese Patent Application No. 2016-144296, filed Jul. 22, 2016, the disclosures of which are incorporated herein by reference in its entirety.

BACKGROUND OF THE INVENTION

1. Field of the Invention

The present disclosure relates to a microcapsule, an aqueous dispersion, a method for manufacturing an aqueous dispersion, and an image forming method.

2. Description of the Related Art

As image forming methods for forming an image on a recording medium, there are an electrophotographic method, a sublimation-type thermal transfer method, a fusion-type thermal transfer method, an ink jet method, and the like.

The ink jet image forming method has advantages such as being able to be performed using an inexpensive device and incurring low running costs because ink can be efficiently used.

As one of the ink jet image forming methods, there is an image forming method in which an ink jet ink that can be cured by being irradiated with active energy rays such as ultraviolet rays is used.

As examples of the ink jet ink, there is proposed an ink jet ink containing water and a capsule in which a surround of a core is covered with a polymer shell, in which the capsule is dispersed in water by a dispersing group covalently bonded to the polymer shell, the core contains at least one chemically reactive compound that is heated and/or irradiated with infrared rays so as to form a reaction product, and an average particle diameter of capsules is smaller than 4 μm (for example, refer to WO2015/158654A).

In addition, as examples of other ink jet inks, there is proposed an ink jet ink containing water and a capsule in which a surround of a core is covered with a polymer shell, in which the capsule is dispersed in water by a dispersing group covalently bonded to the polymer shell, the core contains at least one chemically reactive compound that is irradiated with ultraviolet rays so as to form a reaction product and contains a photopolymerization initiator, and an average particle diameter of capsules is smaller than 4 μm (for example, refer to WO2015/158652A).

In addition, as examples of the microcapsule, there is proposed a flavoring product polyurea core-shell microcapsule which includes a polyurea shell containing a reaction product of a polyisocyanate having at least two isocyanate groups and an amino acid and guanazole and includes a core containing aromatics (for example, refer to JP2014-507433A).

SUMMARY OF THE INVENTION

In the inks disclosed in WO2015/158654A and WO2015/158652A, only an isocyanate compound containing an aromatic ring (hereinafter, will also be referred to as aromatic isocyanate compound) is used as an isocyanate compound which is a raw material for forming a microcapsule. In a case where a microcapsule is manufactured using only such a raw material, the isocyanate compound containing an aromatic ring has a high level of reactivity, and therefore it becomes easy to form a microcapsule having a large particle diameter is (that is, coarse particles are easily formed). In a case where the microcapsule having a large particle diameter is adopted to be used as an ink jet ink, there is a tendency that jetting properties of the ink deteriorate, and a planar shape deteriorates. In addition, the microcapsule manufactured with such a raw material tends to have low weather fastness (that is, light fastness and wet heat resistance).

In addition, the microcapsule disclosed in JP2014-507433A does not have a polymerizable group, and there are no assumptions that a film is formed by the microcapsule.

The present disclosure has been made in view of the above circumstances, and an object thereof is to provide a microcapsule by which a film is formed and in which coarse particles are less, jetting properties of an ink are excellent in a case where the microcapsule is adopted to be used as an ink jet ink, and weather fastness is excellent; an aqueous dispersion; and a method for manufacturing an aqueous dispersion; and an image forming method by which an image in which jetting properties of an ink are favorable and weather fastness is excellent is obtained.

In the present specification, the coarse particles refer to particles having a particle diameter exceeding 5 μm.

Specific means for achieving the object includes the following aspects.

<1> A microcapsule comprising: a shell that has a three-dimensional cross-linked structure containing a hydrophilic group and Structure (1); and a core that is in the interior of the shell, in which at least one of the shell or the core has a polymerizable group.

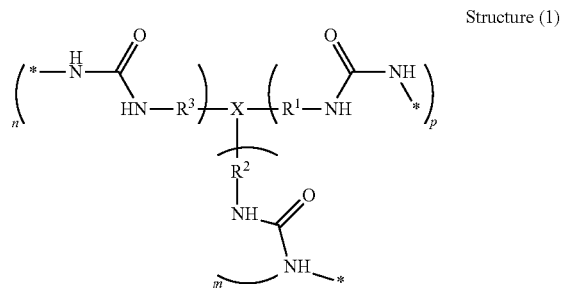

Structure (1)

In Structure (1), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from the organic group represented by X, in Structure (1), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (1), * represents a binding position, each of p, m, and n is equal to or greater than 0, and p+m+n equals 3 or greater.

<2> The microcapsule according to <1>, in which a content rate of Structure (1) in the shell is 8% by mass to 100% by mass with respect to a total mass of the shell.

<3> The microcapsule according to <1> or <2>, in which the shell contains at least one structure selected from Structure (2), Structure (3), or Structure (4), as Structure (1).

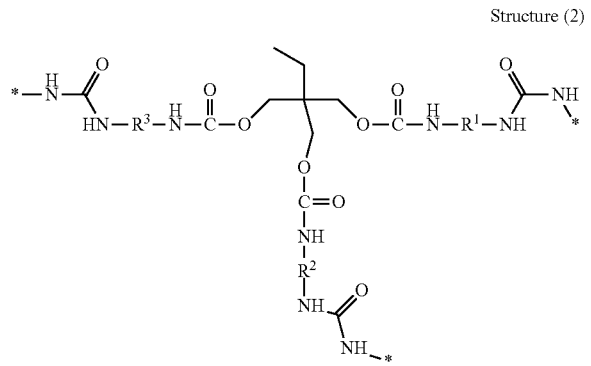

Structure (2)

In Structure (2), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (2), * represents a binding position.

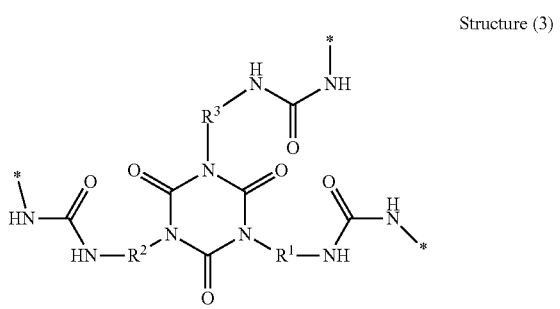

Structure (3)

In Structure (3), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (3), * represents a binding position.

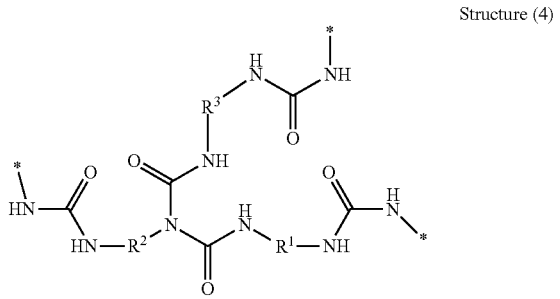

Structure (4)

In Structure (4), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (4), * represents a binding position.

<4> The microcapsule according to any one of <1> to <3>, in which the polymerizable group is a radically polymerizable group.

<5> The microcapsule according to any one of <1> to <4>, in which the core contains a radically polymerizable compound.

<6> The microcapsule according to <5>, in which the radically polymerizable compound contains a di- or lower functional radically polymerizable compound and a tri- or higher functional radically polymerizable compound.

<7> The microcapsule according to any one of <1> to <6>, in which the core contains a photopolymerization initiator.

<8> The microcapsule according to <7>, in which the photopolymerization initiator contains at least one of a carbonyl compound or an acylphosphine oxide compound.

<9> The microcapsule according to <7> or <8>, in which the core further contains a sensitizer.

<10> The microcapsule according to any one of <1> to <3>, in which the polymerizable group is a thermally polymerizable group.

<11> The microcapsule according to any one of <1> to <3> and <10>, in which the core contains a thermally polymerizable compound.

<12> An aqueous dispersion comprising: the microcapsule according to any one of <1> to <11>; and water.

<13> The aqueous dispersion according to <12>, further comprising a colorant.

<14> The aqueous dispersion according to <13>, in which a content of an anionic surfactant is 1% by mass or less with respect to a total mass of the aqueous dispersion.

<15> The aqueous dispersion according to any one of <12> to <14>, in which the total solid content of the microcapsule is 50% by mass or more with respect to a total solid content of the aqueous dispersion.

<16> The aqueous dispersion according to any one of <12> to <15>, which is used as an ink jet ink.

<17> A method for manufacturing an aqueous dispersion, comprising: a preparation step of mixing an oil-phase component that contains a compound represented by General Formula (A), at least one compound of a tri- or higher functional isocyanate compound having a polymerizable group or a polymerizable compound, and an organic solvent, with a water-phase component that contains water and a compound having a hydrophilic group, and emulsifying and dispersing the mixture so as to prepare an aqueous dispersion.

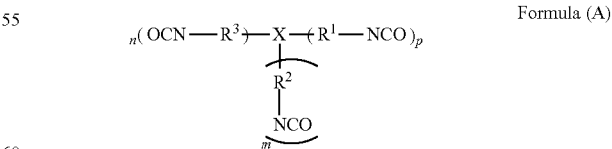

Formula (A)

In General Formula (A), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from the organic group represented by X, in General Formula (A), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by R, $R^2$, and $R^3$, and in General Formula (A), each of p, m, and n is equal to or greater than 0, and p+m+n equals 3 or greater.

<18> The method for manufacturing an aqueous dispersion according to <17>, in which the compound represented by General Formula (A) includes at least one selected from compounds represented by General Formula (B), General Formula (C), or General Formula (D).

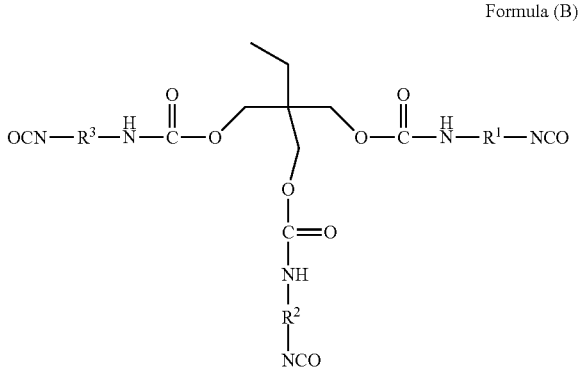

Formula (B)

In General Formula (B), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$.

Formula (C)

In General Formula (C), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$.

Formula (D)

In General Formula (D), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$.

<19> An image forming method comprising an application step of applying the aqueous dispersion according to any one of <12> to <16> onto a recording medium.

According to the present disclosure, a microcapsule by which a film is formed and in which coarse particles are less, jetting properties of an ink are excellent in a case where the microcapsule is adopted to be used as an ink jet ink, and weather fastness is excellent; an aqueous dispersion; and a method for manufacturing an aqueous dispersion; and an image forming method by which an image in which jetting properties of an ink are favorable and weather fastness is excellent is obtained, are provided.

DESCRIPTION OF THE PREFERRED EMBODIMENTS

Hereinafter, specific embodiments of the present invention will be described in detail, but the present invention is not limited to the following embodiments.

In the present specification, a range of numerical values described using "to" means a range including the numerical values listed before and after "to" as a minimum value and a maximum value.

In the numerical value ranges described in a stepwise manner in the present specification, an upper limit value or a lower limit value described in a certain numerical value range may be replaced with an upper limit value or a lower limit value of the numerical value range of other stepwise description. In addition, in the numerical value ranges described in the present specification, an upper limit value or a lower limit value described in a certain numerical value range may be replaced with values shown indicated in examples.

In the present specification, in a case where there are a plurality of substances corresponding to each component in a composition, unless otherwise specified, the amount of each component in the composition means the total amount of the plurality of substances present in the composition.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, visible rays, and infrared rays.

In the present specification, the ultraviolet rays are referred to as "Ultra Violet (UV) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

<Microcapsule>

A microcapsule includes a shell that has a three-dimensional cross-linked structure containing a hydrophilic group and Structure (1); and a core that is in the interior of the shell, in which at least one of the shell or the core has a polymerizable group.

The microcapsule of the present disclosure is formed of the outermost shell having the three-dimensional cross-linked structure containing at least one of a urethane bond and a urea bond, and the core which is a region occupying the shell.

The aqueous dispersion of the present disclosure to be described later contains the microcapsule of the present disclosure and water.

The aqueous dispersion of the present disclosure may include only one kind of the microcapsule or may include two or more kinds of the microcapsules.

Whether a microcapsule is the microcapsule can be checked by coating a recording medium with an aqueous dispersion liquid of the microcapsule and dying the same so as to obtain a sample for morphological observation, and then cutting the sample so as to observe the cut surface using an electron microscope and the like.

Details of the action mechanism in one embodiment of the present invention are not clear, but it is presumed as follows.

In the microcapsule of the related art (microcapsules contained in the ink disclosed in WO2015/158654A and WO2015/158652A), an isocyanate compound containing an aromatic ring is used as a raw material, and therefore a particle diameter of the microcapsule tends to become coarse. In a case where the microcapsule having a large particle diameter is used as an ink jet ink, there is a tendency that jetting properties of the ink deteriorate, and a planar shape deteriorates. In addition, the microcapsule manufactured with such a raw material tends to have low weather fastness (that is, light fastness and wet heat resistance). In addition, the microcapsule disclosed in JP2014-507433A does not have a polymerizable group, and there are no assumptions that a film is formed by the microcapsule.

In the microcapsule of the present disclosure, the shell has the three-dimensional cross-linked structure containing a hydrophilic group and Structure (1) (that is, the structure formed with an isocyanate compound not containing an aromatic ring as a raw material), and the at least one of the shell or the core has the polymerizable group. Particularly, it is considered that with the shell containing Structure (1), a level of reactivity of the isocyanate compound does not become excessively high, and thus the formation of coarse particles can be suppressed in a reaction in a case of forming the microcapsule. As a result, for example, in a case where the microcapsule of the present disclosure is adopted to be used as an ink jet ink, an ink having excellent jetting properties can be formed. In addition, with such an ink jet ink, it is possible to form an image having a favorable planar shape.

In addition, it is considered that the three-dimensional cross-linked structure in the shell of the microcapsule contains Structure (1), and as a result, resistance with respect to a change in physical properties (coloration and the like) due to light (that is, light fastness) and stability under wet heat environment (that is, wet heat resistance) become excellent. That is, it is considered that the microcapsule becomes to have excellent weather fastness. In addition, in the microcapsule, at least one of the shell or the core has the polymerizable group, the microcapsules adjacent to each other are bonded to each other by irradiation with active energy rays, and therefore a film can be formed.

[Polymerizable Group Contained in Microcapsule]

The microcapsule has the polymerizable group in at least one of the shell or the core. That is, in the microcapsule, the polymerizable group may be present in the shell or may be present in the core. The phrase "polymerizable group present in the core" means that a compound having the polymerizable group is contained in the core (that is, polymerizable compound).

In both cases, the polymerizable group is preferably present in a surface portion of the microcapsule (a contact portion with a dispersion medium in a case where the microcapsule is dispersed by the dispersion medium, for example).

The polymerizable group is not particularly limited as long as the polymerizable group is a group allowing a polymerization reaction to occur. As the polymerizable group, a photopolymerizable group or a thermally polymerizable group is preferable.

As the photopolymerizable group, a radically polymerizable group is preferable, a group containing an ethylenic double bond is more preferable, and a group containing at least one of a vinyl group or a 1-methylvinyl group is even more preferable. As the radically polymerizable group, a (meth)acryloyl group is particularly preferable from the viewpoints of a polymerization reactivity and hardness of a formed film.

The thermally polymerizable group is preferably an epoxy group, an oxetanyl group, an aziridinyl group, an azetidinyl group, a ketone group, an aldehyde group, or a blocked isocyanate group.

The microcapsule may have only one kind of the polymerizable group or may have two or more kinds of polymerizable groups.

Whether the "microcapsule has the polymerizable group" can be checked by, for example, Fourier transform infrared spectroscopy (FT-IR).

Details of the polymerizable group and the polymerizable group compound contained in the microcapsule will be described later.

[Shell of Microcapsule]

The microcapsule includes the shell having the three-dimensional cross-linked structure containing the hydrophilic group and Structure (1).

In the present specification, the term "three-dimensional cross-linked structure" refers to a three-dimensional network structure formed by cross-linking.

The hydrophilic group contained in the three-dimensional cross-linked structure may be present in Structure (1) and may be present in a part other than Structure (1).

The shell of the microcapsule having the three-dimensional cross-linked structure contributes to improvement of dispersion stability and redispersibility in a case where the microcapsule is adopted in the aqueous dispersion.

The term "redispersibility" means the properties in which in a case where an aqueous liquid (for example, water, an aqueous solution, an aqueous dispersion, or the like) is supplied to a solidified product formed by the evaporation of water from the aqueous dispersion, the particles (in this case, microcapsules) in the solidified product are dispersed again in the aqueous liquid. Examples of the solidified product include a solidified product of the aqueous dispersion formed by a coating head or an ink jet head.

Whether the shell of the microcapsule has the three-dimensional cross-linked structure is checked as below. The operation described below is performed under the condition of a liquid temperature of 25° C.

In addition, the following operation is performed on the aqueous dispersion in which the microcapsule is dispersed in water. In a case where the aqueous dispersion does not contain a pigment, the operation described below is performed using the aqueous dispersion as it is. In a case where the aqueous dispersion contains a pigment, first, the pigment is removed from the aqueous dispersion by centrifugation, and then the operation described below is performed on the aqueous dispersion from which the pigment has been removed.

A sample is collected from the aqueous dispersion. Tetrahydrofuran (THF) having a mass 100 times the mass of the total solid content in the sample is added to and mixed with the collected sample, thereby preparing a diluted solution. The obtained diluted solution is subjected to centrifugation under the condition of 80,000 rounds per minute (rpm; the same shall apply hereinafter) and 40 minutes. After the centrifugation, whether there are residues is checked by visual observation. In a case where there are residues, a redispersion is prepared by redispersing the residues in water. For the obtained redispersion, by using a wet-type particle size distribution measurement apparatus (LA-960, manufactured by HORIBA, Ltd.), the particle size distribution is measured by a light scattering method.

In a case where the particle size distribution can be checked by the operation described above, it is determined that the shell of the microcapsule has the three-dimensional cross-linked structure.

(Structure (1))

The shell of the microcapsule has the three-dimensional cross-linked structure containing at least Structure (1).

The shell of the microcapsule contains Structure (1), thereby improving weather fastness of the microcapsule. In addition, with the shell containing Structure (1), the formation of coarse particles can be suppressed in a case of manufacturing the microcapsule.

The microcapsule of the shell may include a plurality of Structures (1), and the plurality of Structures (1) may be the same as or different from each other.

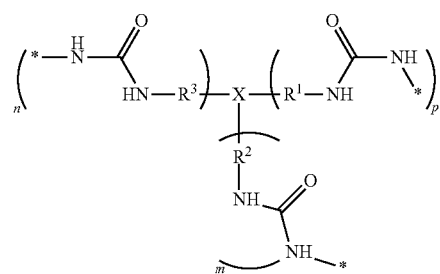

Structure (1)

In Structure (1), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from the organic group represented by X, in Structure (1), R, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (1), * represents a binding position, each of p, m, and n is equal to or greater than 0, and p+m+n equals 3 or greater.

The aliphatic hydrocarbon group in the organic group represented by X is preferably a linear or branched aliphatic hydrocarbon group having 1 to 15 carbon atoms, and more preferably a linear or branched aliphatic hydrocarbon group having 1 to 10 carbon atoms.

Examples of the ring structure that the aliphatic hydrocarbon group in the organic group represented by X and the aliphatic hydrocarbon group represented by $R^1$, $R^2$, and $R^3$ may have, include an alicyclic structure.

Examples of the alicyclic structure include a cycloalkyl ring structure such as a cyclohexane ring structure, a bicyclohexane ring structure, a bicyclodecane ring structure, an isobornene ring structure, a dicyclopentane ring structure, an adamantane ring structure, a tricyclodecane ring structure, and the like.

In Structure (1), p is equal to or greater than 0, p is preferably 1 to 10, more preferably 1 to 8, even more preferably 1 to 6, and particularly preferably 1 to 3.

In Structure (1), m is equal to or greater than 0, m is preferably 1 to 10, more preferably 1 to 8, even more preferably 1 to 6, and particularly preferably 1 to 3.

In Structure (1), n is equal to or greater than 0, n is preferably 1 to 10, more preferably 1 to 8, even more preferably 1 to 6, and particularly preferably 1 to 3.

In Structure (1), p+m+n is preferably an integer of 3 to 10, more preferably an integer of 3 to 8, and even more preferably an integer of 3 to 6.

The (p+m+n)-valent organic group represented by X is preferably a group represented by any one of (X-1) to (X-12).

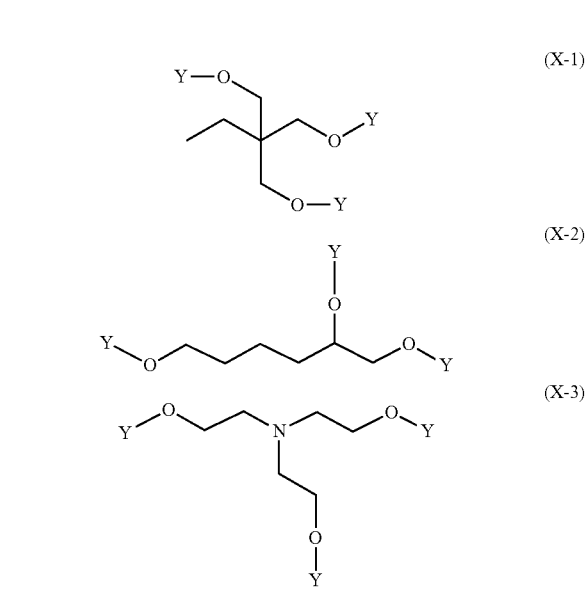

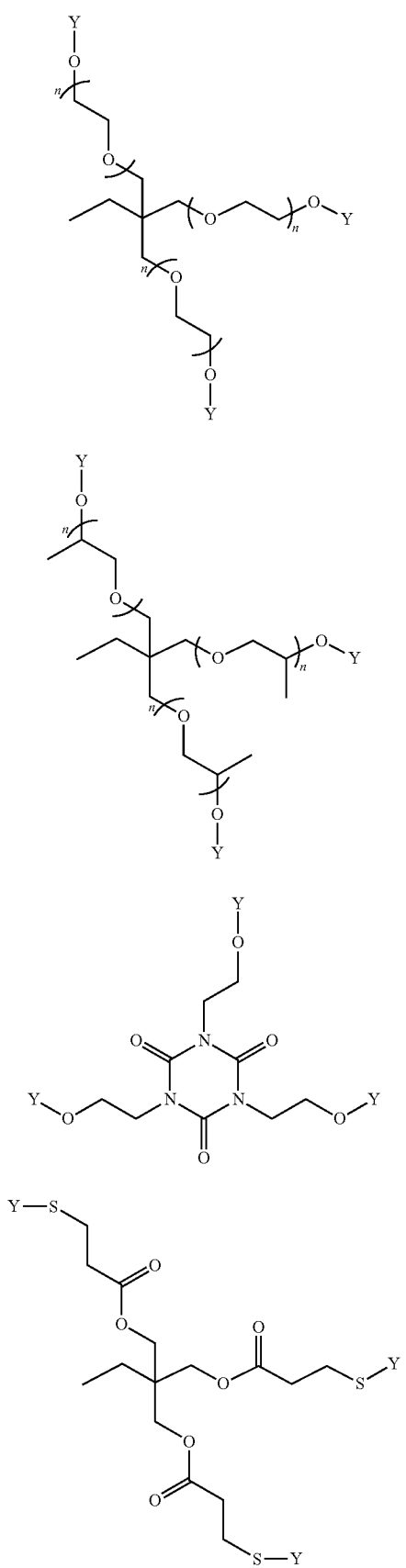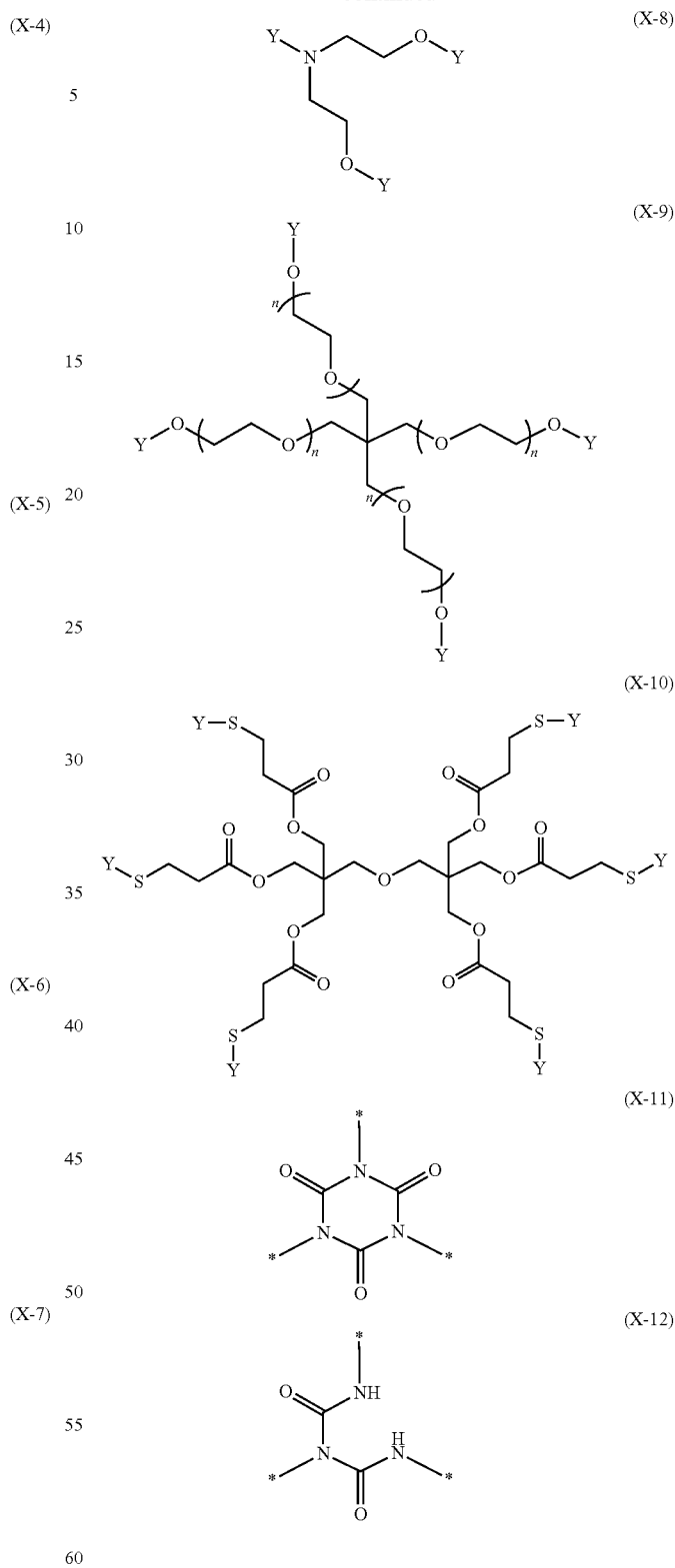
In Formula (X-1) to Formula (X-12), n represents an integer of 1 to 200 (preferably an integer of 1 to 50, and more preferably an integer of 1 to 15).
In Formulas (X-1) to (X-10), Y represents (Y-1).
In Formula (X-11) to Formula (X-12), * represents a binding position to $R^1$, $R^2$, or $R^3$ in Structure (1).

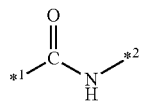

(Y-1)

In (Y-1), *¹ represents a binding position in which (Y-1) is bonded to S or O in (X-1) to (X-10), and *² represents a binding position in which (Y-1) is bonded to $R^1$, $R^2$, or $R^3$ in Structure (1).

In Structure (1), $R^1$, $R^2$, and $R^3$ each independently represent an aliphatic hydrocarbon group having 5 to 15 carbon atoms which may have a ring structure.

The aliphatic hydrocarbon group represented by $R^1$, $R^2$, and $R^3$ may have a substituent, and examples of the substituent include an aliphatic hydrocarbon group and a hydrophilic group to be described below, provided that the substituent does not include a group containing an aromatic ring.

$R^1$, $R^2$, and $R^3$ preferably each independently represent a group represented by any one of (R-1) to (R-8). In (R-1) to (R-8), * represents a binding position.

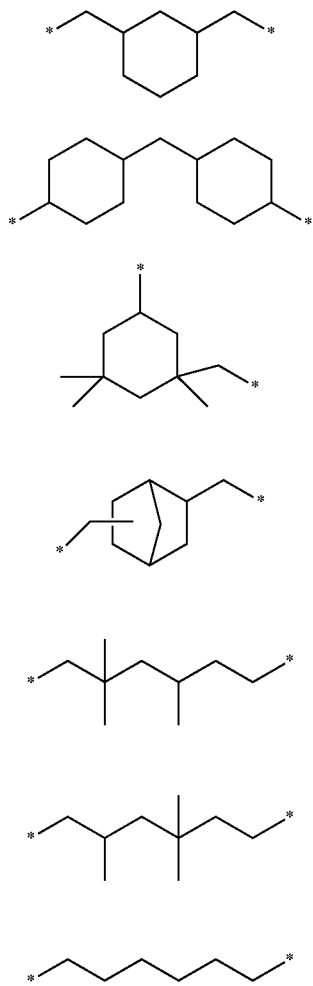

(R-1)

(R-2)

(R-3)

(R-4)

(R-5)

(R-6)

(R-7)

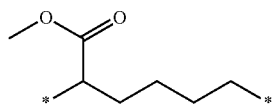

(R-8)

A content rate of Structure (1) in the shell is preferably 8% by mass to 100% by mass with respect to a total mass of the shell.

With the content rate of Structure (1) being 8% by mass or more, the weather fastness of the microcapsule becomes excellent, and the formation of the coarse particles is more suppressed in a case of manufacturing the microcapsule.

From the same viewpoint, the content rate of Structure (1) is more preferably 25% by mass to 100% by mass, and even more preferably 50% by mass to 100% by mass.

The shell preferably contains, as Structure (1), at least one structure selected from Structure (2), Structure (3), or Structure (4), from the viewpoint of ease of manufacturing the microcapsule.

Structure (2)

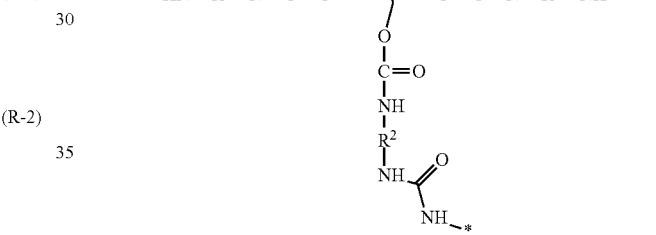

In Structure (2), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and each of the aliphatic hydrocarbon groups represented by $R^1$, $R^2$, and $R^3$ has the same definition as each of the aliphatic hydrocarbon groups represented by $R^1$, $R^2$, and $R^3$ in Structure (1), and the preferable range thereof is also the same.

In Structure (2), * represents a binding position.

Structure (3)

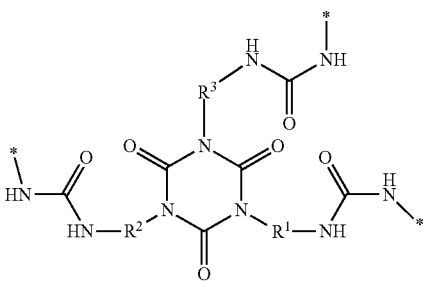

In Structure (3), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and each of the aliphatic hydrocarbon groups represented by $R^1$, $R^2$, and $R^3$ has the same definition as each of the aliphatic hydrocarbon groups represented by $R^1$, $R^2$, and $R^3$ in Structure (1), and the preferable range thereof is also the same.

In Structure (3), * represents a binding position.

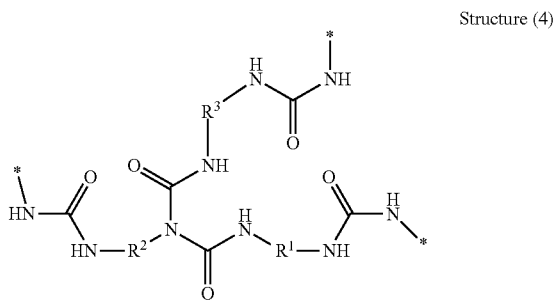

Structure (4)

In Structure (4), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and each of the aliphatic hydrocarbon groups represented by R, $R^2$, and $R^3$ has the same definition as each of the aliphatic hydrocarbon groups represented by $R^1$, $R^2$, and $R^3$ in Structure (1), and the preferable range thereof is also the same.

In Structure (4), * represents a binding position.

Specific examples of Structure (1) to Structure (4) include structures shown in Table 1.

TABLE 1

| Structure (1) | | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

~Formation of Structure (1)~

The three-dimensional cross-linked structure containing Structure (1) in the shell can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the microcapsule is preferably a product formed by allowing a reaction between a tri- or higher functional isocyanate compound and water.

A total amount of the urethane bond and the urea bond contained in 1 g of the shell having the three-dimensional cross-linked structure is preferably 1 mmol/g to 10 mmol/g, more preferably 1.5 mmol/g to 9 mmol/g, and even more preferably 2 mmol/g to 8 mmol/g.

—Tri- or Higher Functional Isocyanate Compound—

The tri- or higher functional isocyanate compound is a compound having three or more isocyanate groups in a molecule. As this compound, it is possible to use a compound synthesized by a method which will be described later and a known compound. As the tri- or higher functional isocyanate compound, an isocyanate compound represented by at least General Formula (A) (hereinafter, will also be referred to as aliphatic isocyanate) is used.

Examples of the known compound include the compounds described in "Polyurethane Resin Handbook" (edited by Keiji Iwata, published from NIKKAN KOGYO SHIMBUN, LTD. (1987)).

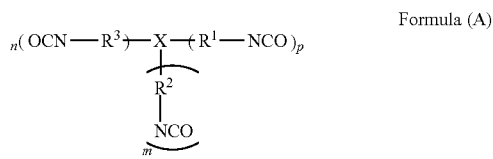

Formula (A)

X, $R^1$, $R^2$, $R^3$, p, m, and n in General Formula (A) have the same definition as X, $R^1$, $R^2$, $R^3$, p, m, and n in Structure (1) described above, and the preferable aspect thereof is also the same.

The compound represented by General Formula (A) is preferably a compound derived from a difunctional isocyanate compound (a compound having two isocyanate groups in a molecule). The tri- or higher functional isocyanate compound is preferably an isocyanate compound derived from at least one kind of compound selected from isophorone diisocyanate, hexamethylene diisocyanate, trimethylhexamethylene diisocyanate, 1,3-bis(isocyanatomethyl)cyclohexane, and dicyclohexylmethane 4,4'-diisocyanate.

The phrase "derived from" means that a structure derived from the difunctional isocyanate compound is contained using the above difunctional isocyanate compound as a raw material.

In addition, as the tri- or higher functional isocyanate compound, for example, a compound having three or more isocyanate groups in a molecule such as an isocyanate compound (adduct type) caused to have three or more functional groups, and a trimer of a difunctional isocyanate compound (an isocyanurate type or a biuret type), is also preferable as an adduct product (an adduct type) of a difunctional isocyanate compound (that is, a compound having two isocyanate groups in a molecule) and a tri- or higher functional compound having three or more active hydrogen groups in a molecule such as polyol, polyamine, or polythiol.

These tri- or higher functional isocyanate compounds may be a mixture containing a plurality of compounds.

—Adduct Type—

The tri- or higher functional isocyanate compound of the adduct-type is preferably a compound represented by General Formula (A1) or General Formula (A2).

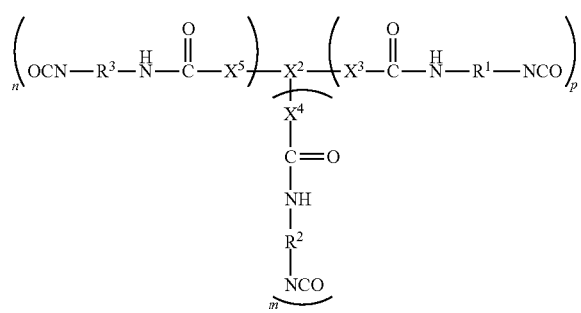

Formula (A1)

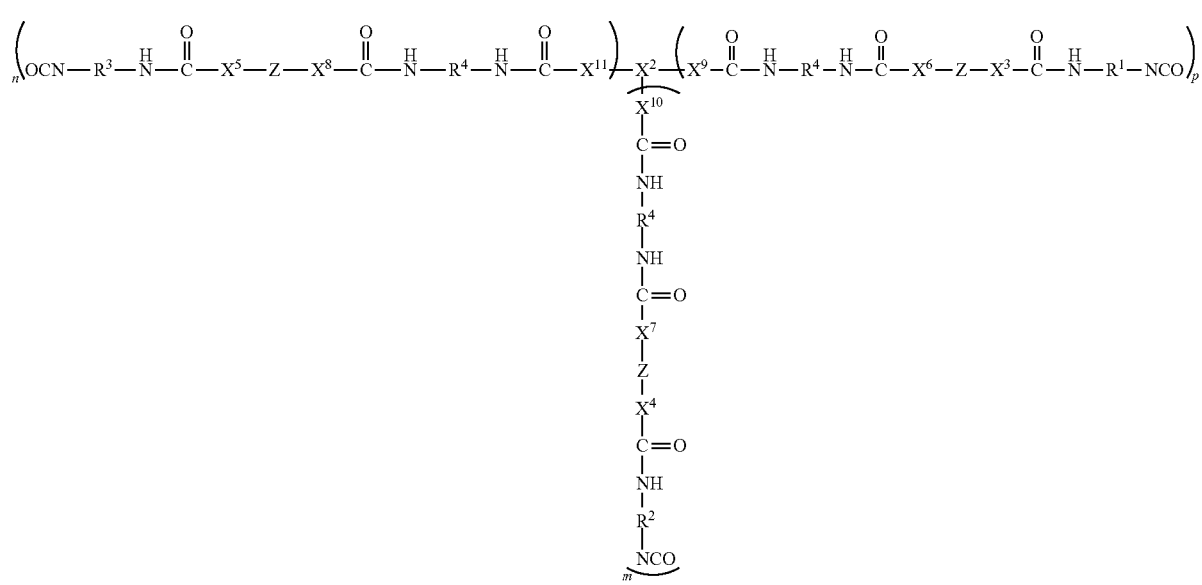

Formula (A2)

In General Formula (A1) and General Formula (A2), $X^2$ represents a (p+m+n)-valent organic group, provided that an organic group having an aromatic ring is excluded from the organic group represented by $X^2$. Each of p, m, and n is equal to or greater than 0, and p+m+n equals 3 or greater. p+m+n is preferably 3 to 10, more preferably 3 to 8, and even more preferablvy 3 to 6.

In General Formula (A1) and General Formula (A2), $X^3$ to $X^{11}$ each independently represent O, S, or NH, and O or S is preferable, and O is more preferable.

In General Formula (A2), Z represents a divalent organic group, provided an organic group having an aromatic ring is excluded from the divalent organic group represented by Z.

In General Formula ((A1)) and General Formula (A2), $X^2$ is preferably a (p+m+n)-valent organic group formed by linking at least two groups selected from the group consisting of an aliphatic hydrocarbon group which may have a ring structure, —NH—, >N—, —C(=O)—, —O—, and —S—.

In a case where $X^2$ in Formula ((A1)) and Formula (A2) is an aliphatic hydrocarbon group that may have a ring structure, examples of the ring structure include an alicyclic structure.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

In General Formula ((A1)) and General Formula (A2), the (p+m+n)-valent organic group represented by $X^2$ is preferably a group represented by any one of Formulas (X2-1) to (X2-10).

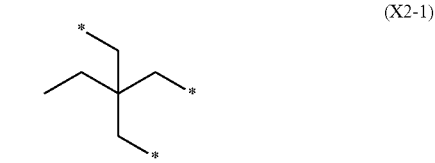

(X2-1)

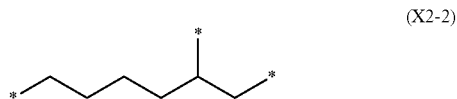

(X2-2)

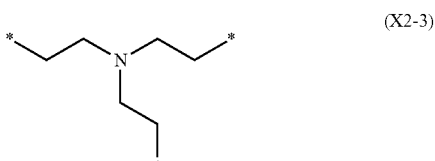

(X2-3)

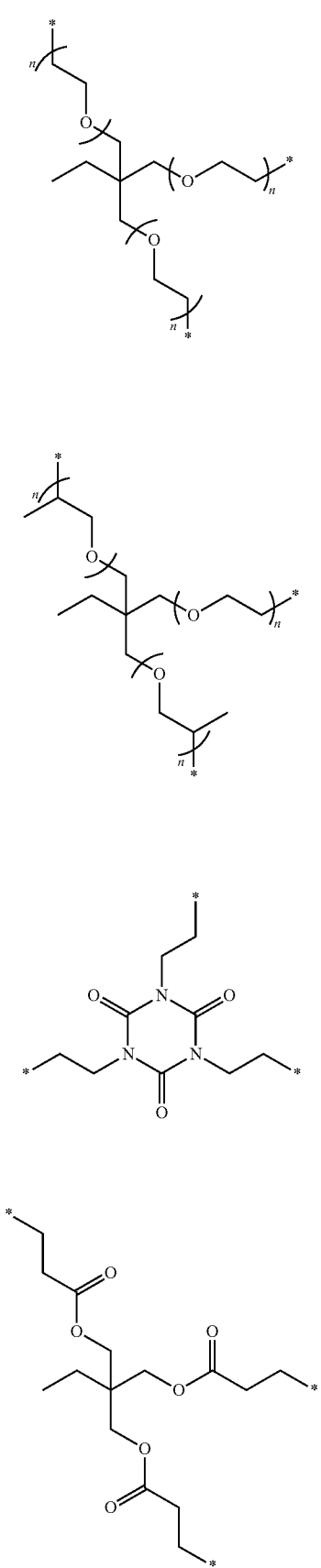

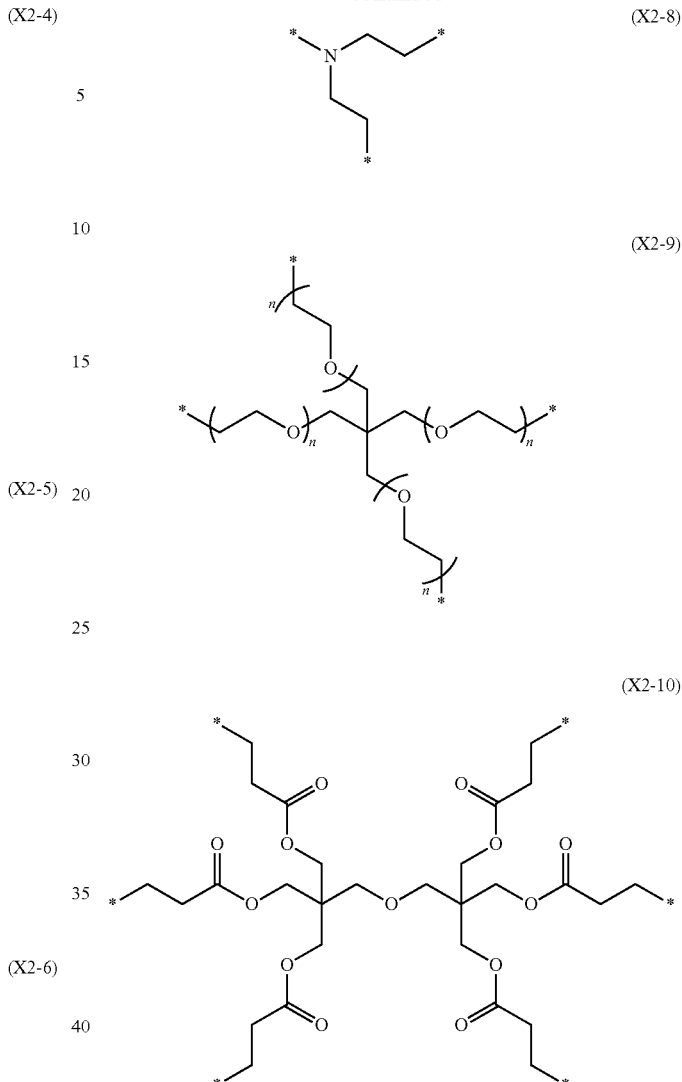

In Formula (X2-1) to Formula (X2-10), n represents an integer of 1 to 200. n preferably represents an integer of 1 to 50, more preferably represents an integer of 1 to 15, and particularly preferably represents an integer of 1 to 8.

In Formula (X2-1) to Formula (X2-10), * represents a binding position.

In Formula (A2), the divalent organic group represented by Z is preferably an aliphatic hydrocarbon group, a group having a polyoxyalkylene structure, a group having a polycaprolactone structure, a group having a polycarbonate structure, or a group having a polyester structure.

The aliphatic hydrocarbon group represented by Z may be a linear aliphatic hydrocarbon group, a branched aliphatic hydrocarbon group, or a cyclic aliphatic hydrocarbon group.

The number of carbon atoms in the aliphatic hydrocarbon group represented by Z is preferably 2 to 30.

In General Formula ((A1)) and General Formula (A2), $R^1$, $R^2$, and $R^3$ have the same definitions as $R^1$, $R^2$, and $R^3$ of Structure (1).

In General Formula (A1) and General Formula (A2), $R^4$ represents an aliphatic hydrocarbon group which may have a ring structure, provided that an aliphatic hydrocarbon group having an aromatic ring is excluded from the aliphatic hydrocarbon group represented by $R^4$, and $R^4$ more preferably represents a group selected from the groups represented by (R-1) to (R-8) described above.

In General Formula ((A1)) and General Formula (A2), $R^1$, $R^2$, $R^3$, and $R^4$ each independently more preferably represent any one of a group (R-3) derived from isophorone diisocyanate (IPDI), a group (R-7) derived from hexamethylene diisocyanate (HDI), a group (R-5) derived from trimethylhexamethylene diisocyanate (TMIDI), a group (R-1) derived from 1,3-bis(isocyanatomethyl)cyclohexane, and a group (R-2) derived from dicyclohexylmethane 4,4'-diisocyanate.

As the compound represented by General Formula (A1), a compound represented by General Formula (B) is preferable.

Formula (B)

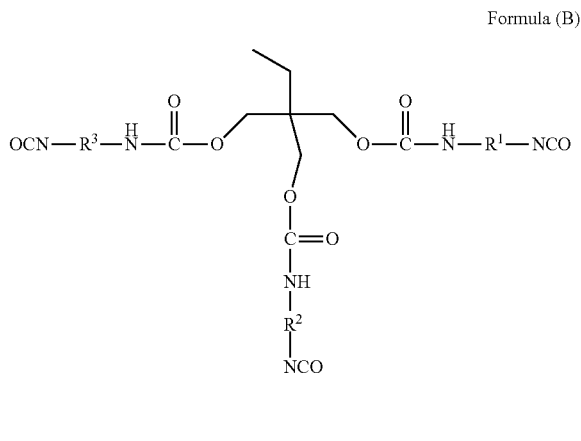

In General Formula (B), $R^1$, $R^2$, and $R^3$ have the same definition as $R^1$, $R^2$, and $R^3$ in Structure (1), and the preferable aspect thereof is also the same.

The adduct-type tri- or higher functional isocyanate compound can be synthesized by allowing a reaction between a compound, which will be described later, having three or more active hydrogen groups in a molecule with a difunctional isocyanate compound which will be described later. In the present specification, the active hydrogen group means a hydroxyl group, a primary amino group, a secondary amino group, and a mercapto group.

The adduct-type tri- or higher functional isocyanate compound can be obtained by, for example, heating (50° C. to 100° C.) a compound having three or more active hydrogen groups in a molecule and a difunctional isocyanate compound in an organic solvent while stirring, or by stirring the above compounds at a low temperature (0° C. to 70° C.) while adding a catalyst such as stannous octanoate thereto (Synthesis Scheme 1 shown below).

Generally, as the difunctional isocyanate compound reacted with the compound having three or more active hydrogen groups in a molecule, a difunctional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the difunctional isocyanate compound is preferably 60% to 500%, more preferably 60% to 300%, and even more preferably 80% to 200% of the number of moles of the active hydrogen groups.

—Synthesize Scheme 1—

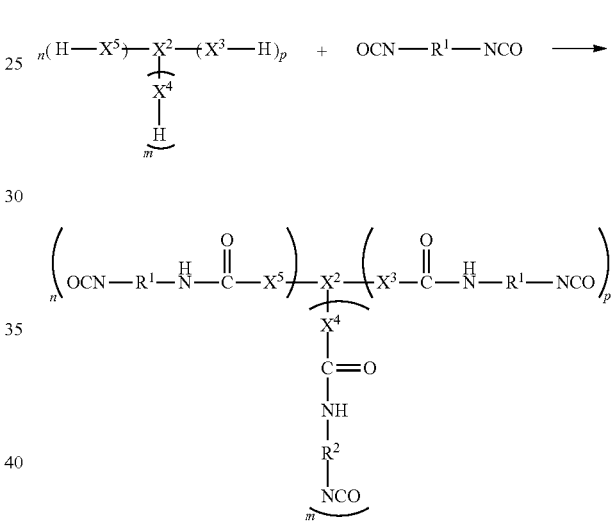

Furthermore, the adduct-type tri- or higher functional isocyanate compound can also be obtained by synthesizing an adduct (a prepolymer) of a compound having two active hydrogen groups in a molecule and a difunctional isocyanate compound and then allowing the prepolymer to react with a compound having three or more active hydrogen groups in a molecule (Synthesis Scheme 2 shown below).

—Synthesize Scheme 2—

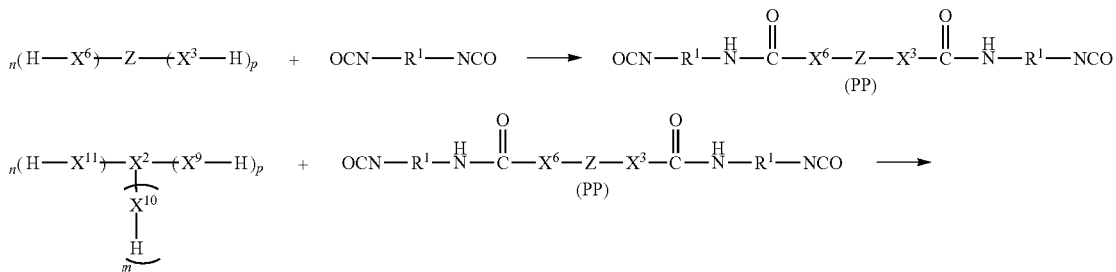

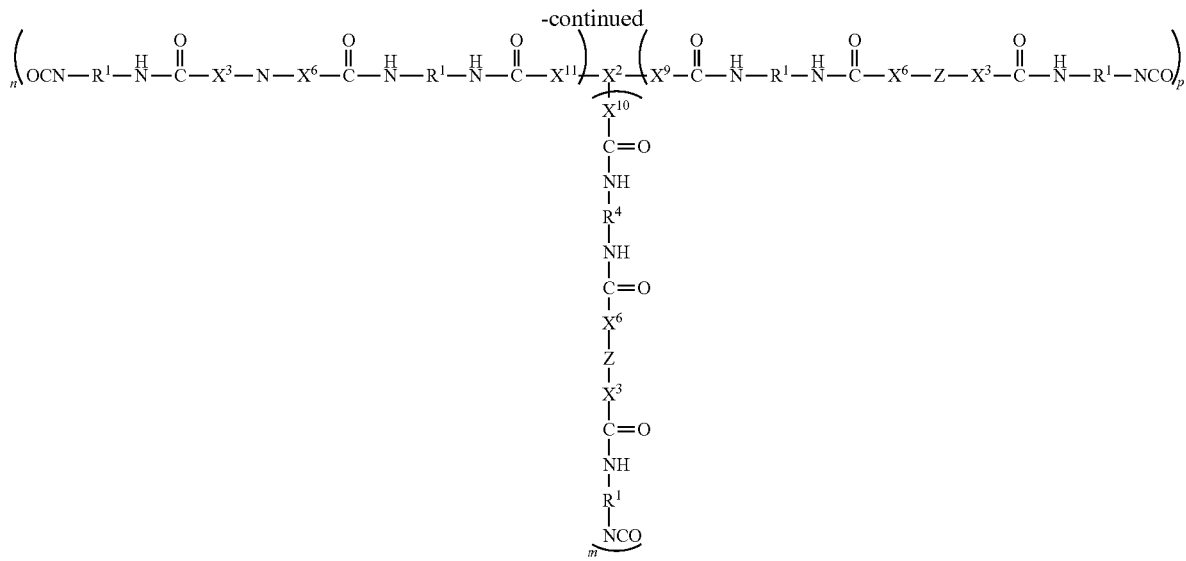

Examples of the difunctional isocyanate compound include a difunctional aliphatic isocyanate compound, and the like.

Specific examples of the difunctional isocyanate compound include isophorone diisocyanate (IPDI), trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, and the like.

Among these di- or higher functional isocyanate compounds, compounds having structures represented by (I-1) to (I-8) shown below are preferable.

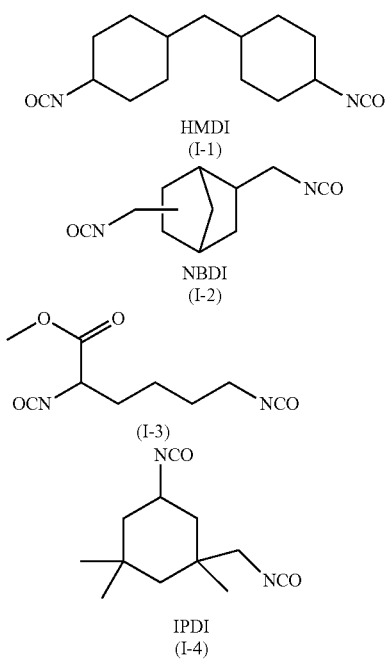

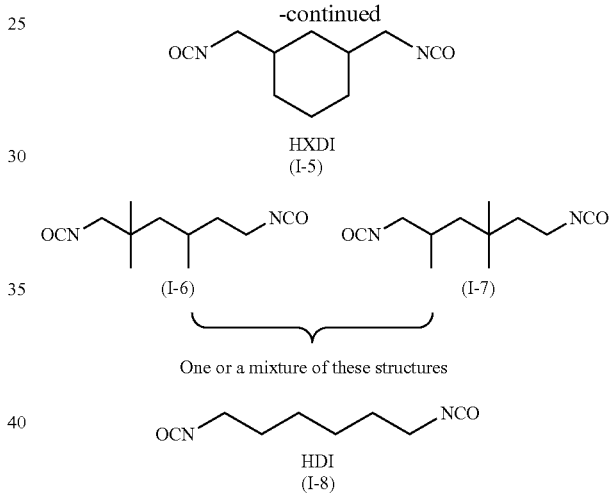

Among these difunctional isocyanate compounds, at least one kind selected from isophorone diisocyanate (IPDI), hexamethylene diisocyanate (HDI), trimethylhexamethylene diisocyanate (TMHDI), 1,3-bis(isocyanatomethyl)cyclohexane (HXDI), and dicyclohexylmethane-4,4'-diisocyanate (HMDI) is preferable.

As the difunctional isocyanate compound, difunctional isocyanate compounds derived from the above compounds can also be used. Examples thereof include DURANATE (registered trademark) D101, D201, A101 (manufactured by Asahi Kasei Corporation) and the like.

The compound having three or more active hydrogen groups in a molecule is a compound having three or more groups, each of which is at least one kind of group selected from a hydroxyl group, a primary amino group, a secondary amino group, and a mercapto group, in a molecule. Examples of the compound include compounds having structures represented by (H-1) to (H-10) shown below. In the following structures, n represents an integer selected from 1 to 100.

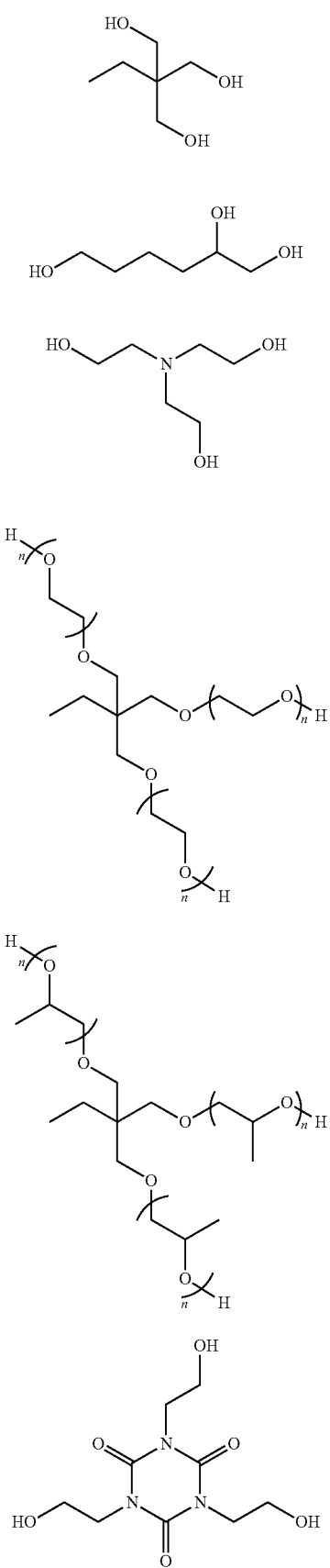
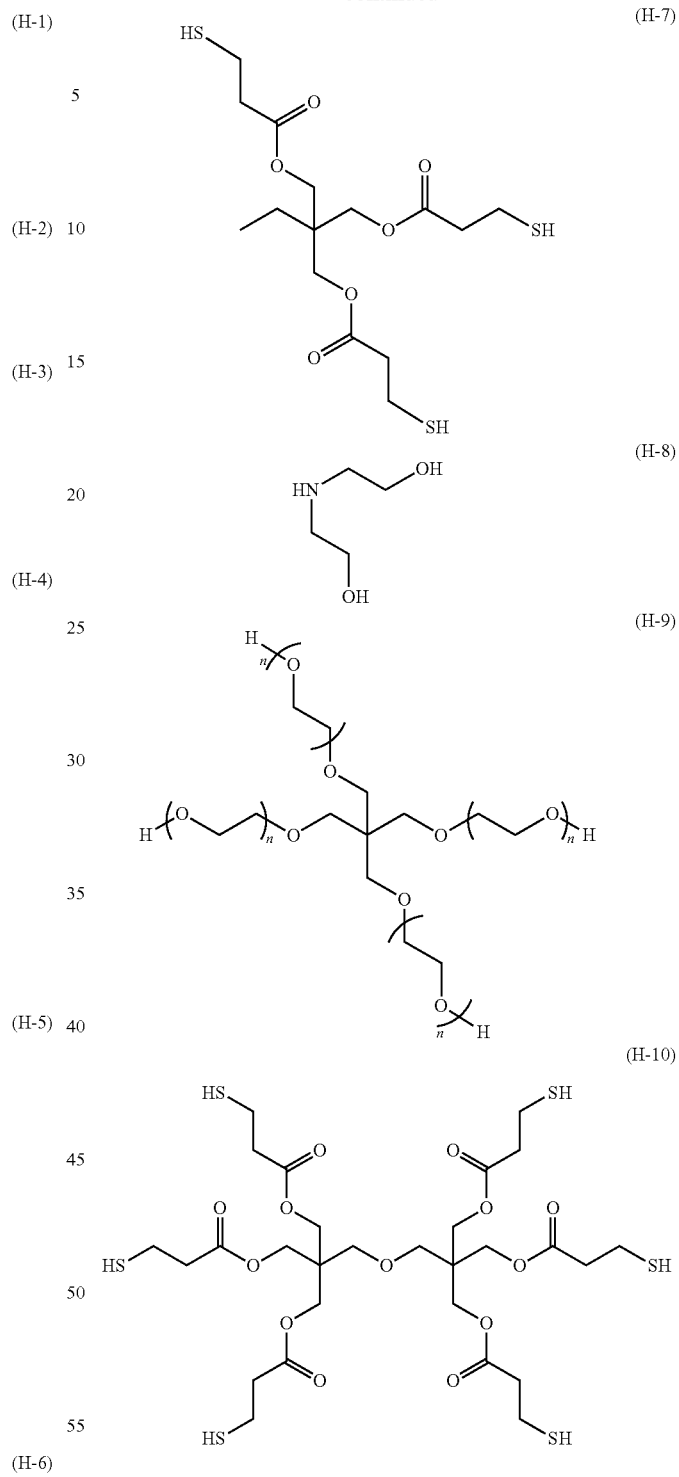

As the adduct-type tri- or higher functional isocyanate compound, a commercially available product on the market may be used.

Examples of the commercially available product include TAKENATE (registered trademark) D-120N, D-140N, and D-160N (manufactured by Mitsui Chemicals, Inc.), CORONATE (registered trademark) HL and HX (manufactured by Nippon Polyurethane Industry Co., Ltd.), P301-75E (manufactured by Asahi Kasei Corporation.), and the like.

Among these adduct-type tri- or higher functional isocyanate compounds, at least one kind selected from D-120N, D-140N, and D-160N (manufactured by Mitsui Chemicals, Inc.) is more preferable.

—Isocyanurate Type and Biuret Type—

As the compound represented by General Formula (A), a compound represented by General Formula (C) or General Formula (D) is preferable. The compound represented by General Formula (C) is an isocyanurate type and the compound represented by General Formula (D) is a biuret type.

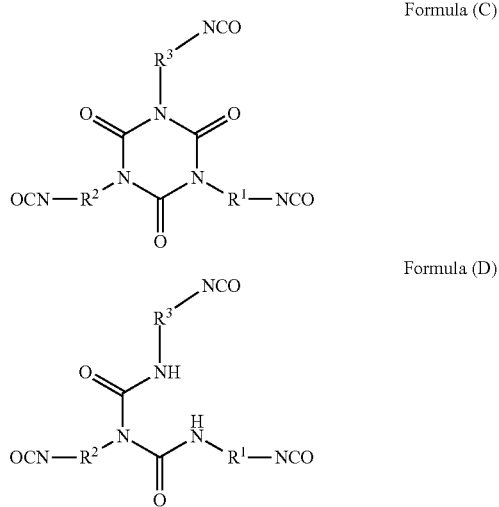

In General Formula (B) and General Formula (D), $R^1$, $R^2$, and $R^3$ have the same definition as $R^1$, $R^2$, and $R^3$ in Structure (1), and the preferable aspect thereof is also the same.

In General Formula (C) and General Formula (D), $R^1$, $R^2$, and $R^3$ each independently more preferably represent a group (R-3) derived from isophorone diisocyanate (IPDI), a group (R-7) derived from hexamethylene diisocyanate (HDI), a group (R-5) derived from trimethylhexamethylene diisocyanate (TMHDI), a group (R-1) derived from 1,3-bis (isocyanatomethyl)cyclohexane, and a group (R-2) derived from dicyclohexylmethane 4,4'-diisocyanate.

In addition, as the isocyanurate-type tri- or higher functional isocyanate compound, commercially available products may also be used. Examples thereof include D-127N, D-170N, D-170HN, D-172N, and D-177N (manufactured by Mitsui Chemicals, Inc.), SUMIDUR N3300 an DES-MODUIR (registered trademark) N3600, N3900, and Z4470BA (manufactured by Sumika Bayer Urethane Co., Ltd.), CORONATE (registered trademark) HX and HK (manufactured by Nippon Polyurethane Industry Co., Ltd.), DURANATE (registered trademark) TPA-100, TKA-100, TSA-100, TSS-100, TLA-100, and TSE-100 (manufactured by Asahi Kasei Corporation.), and the like.

As the biuret-type tri- or higher functional isocyanate compound, commercially available products may also be used. Examples thereof include D-165N and NP 1100 (manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation.), and the like.

Among these tri- or higher functional isocyanate compounds of the biuret-type and the isocyanurate-type, DURANATE (registered trademark) 24A-100 (manufactured by Asahi Kasei Corporation.), D-127N (manufactured by Mitsui Chemicals, Inc.), TKA-100, TPA-100, TSA-100, and TSS-100 (manufactured by Asahi Kasei Corporation.) are more preferable.

The content (unit: mmol/g) of the isocyanate group per 1 g of the tri- or higher functional isocyanate compound is preferably 1 mmol/g to 10 mmol/g, more preferably 1.5 mmol/g to 8 mmol/g, and even more preferably 2 mmol/g to 6 mmol/g.

For obtaining the content of the isocyanate group, the isocyanate compound of interest is dissolved in dehydrated toluene, an excess di-n-butylamine solution is then added thereto so as to cause a reaction, and the remaining di-n-butylamine solution is subjected to back titration by using hydrochloric acid. From the titration amount at an inflection point on the titration curve, the content of the isocyanate group can be calculated.

More specifically, the content of the isocyanate group can be calculated by the method described below.

By using a potentiometric titrator (AT-510, manufactured by KYOTO ELECTRONICS MANUFACTURING CO., LTD.) and a 1 mol/L aqueous hydrochloric acid solution, neutralization titration is performed at 25° C. by the blank measurement and the sample measurement described below. From the obtained titration amounts Z1 and Z2, the content of the isocyanate group can be calculated from Equation (N).

$$\text{Content of isocyanate group (mmol/g)} = (Z1-Z2)/(W \times Y) \quad \text{Equation (N)}$$

In Equation (N), Z1 represents the titration amount of a blank, Z2 represents the titration amount of a sample, W represents the solid content of the sample, and Y represents the mass of the sample.

~Blank Measurement~

10 mL of dehydrated toluene, 10.0 mL of a 2 mol/L di-n-butylamine solution, and 50 mL of isopropyl alcohol are put into a 100 mL beaker and mixed together, thereby preparing a mixed liquid. For the mixed liquid, neutralization titration is performed using a 1 mol/L hydrochloric acid solution. The inflection point on the titration curve is taken as the end point, and the titration amount Z1 (mL) to the end point is determined.

~Sample Measurement~

A sample (an isocyanate compound) Yg with W % by mass of solid content is collected and put into a 100 mL beaker, 20 mL of dehydrated toluene is added to the beaker, and the sample is dissolved, thereby preparing a solution. 10.0 mL of a 2 mol/L di-n-butylamine solution is added to and mixed with the solution, and then the solution is left to stand for 20 minutes or longer. 50 mL of isopropyl alcohol is added to the solution having been left to stand. Thereafter, neutralization titration is performed using a 1 mol/L hydrochloric acid solution, the inflection point on the titration curve is taken as an end point, and the titration amount Z2 (mL) to the end point is determined.

(Water or Compound Having Two or More Active Hydrogen Groups)

The microcapsules are preferably manufactured by reacting the aforementioned tri- or higher functional isocyanate compound with water or a compound having two or more active hydrogen groups.

As a compound to be reacted with the tri- or higher functional isocyanate compound, generally, water is used. By allowing the tri- or higher functional isocyanate compound to react with water, a three-dimensional cross-linked structure having a urea bond is formed.

Examples of the compound to be reacted with the tri- or higher functional isocyanate compound other than water include a compound having two or more active hydrogen groups. Examples of the compound having two or more active hydrogen groups include a compound having a hydroxyl group (—OH), an amino group (—NH), and a thiol group (—SH) in the molecule, and the like. Specific examples thereof include a polyfunctional alcohol, a polyfunctional amine having a hydrogen atom on a nitrogen atom, a polyfunctional thiol, and the like.

Specific examples of the polyfunctional alcohol include propylene glycol, glycerin, trimethylolpropane, and the like.

Specific examples of the polyfunctional amine include diethylene triamine, tetraethylene pentamine, lysine, and the like.

Specific examples of the polyfunctional thiol include 1,3-propanedithiol, 1,2-ethanedithiol, and the like.

One kind of these compounds may be used alone, or two or more kinds thereof may be used in combination.

The compound having two or more active hydrogen groups also includes the aforementioned compound having three or more active hydrogen groups in the molecule.

(Structure Other than Structure (1))

The shell may contain other structures such as a structure derived from an isocyanate compound having an aromatic ring, in addition to Structure (1).

—Structure Derived from Isocyanate Compound Having Aromatic Ring—

As the isocyanate compound (aromatic isocyanate compound) by which a structure derived from an isocyanate compound having an aromatic ring can be formed, a known compound can be used. Examples of the aromatic isocyanate compound include the tri- or higher functional aromatic isocyanate compound.

Examples of the compounds known as such a compound include the compounds described in "Polyurethane Resin Handbook" (edited by Keiji Iwata, published from NIKKAN KOGYO SHIMBUN, LTD. (1987)).

The aromatic isocyanate compound is preferably a compound derived from a difunctional isocyanate compound (a compound having two isocyanate groups in a molecule).

Examples the aromatic isocyanate compound include an isocyanate compound derived from m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, and the like.

The term "derived" means that the above compounds are used as raw materials, and hence the isocyanate compound has a structure derived from the raw materials.

As the aromatic isocyanate compound, a commercially available product on the market may be used. Examples of the commercially available product include D-110N and D-101A (manufactured by Mitsui Chemicals, Inc.), and the like.

In the shell, as a ratio of the structure derived an isocyanate compound having an aromatic ring to Structure (1), 100:0 to 1:99 is preferable, 100:0 to 10:90 is more preferable, 100:0 to 30:70 is even more preferable, 100:0 to 60:40 is still more preferable, and 100:0 is most preferable on a mass basis.

(Hydrophilic Group of Shell)

The shell of the microcapsule has the three-dimensional cross-linked structure containing at least one hydrophilic group.

In a case where the shell has the hydrophilic group, dispersibility of the microcapsule in an aqueous medium is further improved. Therefore, in a case where the microcapsule is used for ink, jetting properties and dispersion stability of an ink composition can be further improved.

In addition, in a case where the microcapsule has the hydrophilic group in the shell, hydrophilicity of the microcapsule is improved, and therefore redispersibility becomes excellent.

The hydrophilic group is present in the shell as a part of the three-dimensional cross-linked structure.

Herein, "hydrophilic group is present as a part of the three-dimensional cross-linked structure" means that a covalent bond is formed between the hydrophilic group and a portion of the three-dimensional cross-linked structure other than the hydrophilic group. The hydrophilic group may be present in Structure (1) and may be present in a part other than Structure (1).

A covalent bond between the hydrophilic group and a portion other than the hydrophilic group of the three-dimensional cross-linked structure is preferably a urethane bond and a urea bond and is more preferably a urea bond.

A urea bond is less susceptible to hydrolysis than a urethane bond, and therefore the hydrophilic group introduced into the shell via a urea bond is present in a state of being more firmly bonded to the three-dimensional cross-linked structure of the shell, compared to the hydrophilic group introduced into the shell via a urethane bond. Therefore, the aqueous dispersion including the microcapsule in which the hydrophilic group contributing to the dispersibility is introduced into the shell via a urea bond, is excellent in the dispersion stability of the microcapsule, particularly the dispersion stability for a long period of time (that is, storage stability).

Examples of the hydrophilic group present in the shell include an anionic group, a nonionic group, and the like. More specific examples thereof include a carboxylic acid group, a salt of a carboxylic acid group, a phosphonic acid group, a salt of a phosphonic acid group, a phosphate ester group, salt of a phosphate ester group, a phosphoric acid group, a salt of a phosphoric acid group, a sulfonic acid group, a salt of a sulfonic acid group, a sulfate group, a salt of a sulfate group, a group having a polyether structure (for example, polyethylene oxide, polypropylene oxide, and the like), a group having a betaine structure, an ammonium group, a sulfonium group, a phosphonium group, and the like. In the present specification, "hydrophilic group" is distinguished from the above-described active hydrogen group (a hydroxyl group, a primary amino group, a secondary amino group, and a mercapto group). The salt of a carboxylic acid group, the salt of a sulfonic acid group, the salt of a sulfate group, the salt of a phosphonic acid group, and the salt of phosphoric acid group described above may be the salts formed by neutralization in the process of manufacturing the microcapsule. The shell of the microcapsule may have only one kind of the hydrophilic group or may have two or more kinds thereof.

The hydrophilic group introduced into the shell is preferably at least one kind selected from a group having a polyether structure, a carboxylic acid group, and a salt of a carboxylic acid group.

In the microcapsule of the present invention, the three-dimensional cross-linked structure containing the neutralized acid group preferably contains a structure selected from a structure represented by Formula (E) and a structure represented by Formula (F), from the viewpoint of the dispersion stability of the microcapsule.

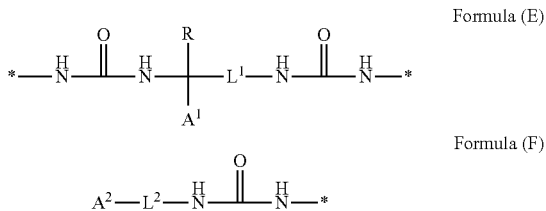

In Formula (E), $A^1$ represents a neutralized acid group, R represents a hydrogen atom or an alkyl group having 1 to 10 carbon atoms, and $L^1$ represents a divalent linking group. * represents a binding position.

In Formula (F), $A^2$ represents a neutralized acid group and $L^2$ represents a divalent linking group. * represents a binding position.

In Formula (E), the neutralized acid group represented by $A^1$ has the same meaning as a salt obtained by the above-described acid group being neutralized, and a preferable aspect thereof is also the same.

In Formula (E), the alkyl group having 1 to 10 carbon atoms represented by R may be a linear alkyl group or may be a branched alkyl group or may be an alkyl group having an alicyclic structure (for example, a cycloalkyl group).

Examples of the alkyl group having 1 to 10 carbon atoms represented by R include a methyl group, an ethyl group, a propyl group, a butyl group, a cyclohexyl group, and the like.

As R, a hydrogen atom or an alkyl group having 1 to 6 carbon atoms is preferable and a hydrogen atom is particularly preferable.

In Formula (E), a divalent linking group represented by $L^1$ is preferably a divalent group in which two or more groups selected from the group consisting of an alkylene group having 1 to 10 carbon atoms, or an alkylene group and a cycloalkylene group, are combined.

In Formula (E), the alkylene group having 1 to 10 carbon atoms represented by $L^1$ may be a linear alkylene group or may be a branched alkylene group or may be an alkylene group having an alicyclic structure (for example, a cycloalkylene group).

Examples of the alkylene group having 1 to 10 carbon atoms represented by $L^1$ include a methylene group, an ethylene group, a propylene group, a butylene group, a cyclohexylene group, and the like.

As $L^1$, an alkylene group having 1 to 10 carbon atoms is more preferable, and an alkylene group having 1 to 6 carbon atoms is even more preferable.

As a structure represented by Formula (E), a case in which $A^1$ is a carboxy group, R is a hydrogen atom, and $L^1$ is an alkylene group having 1 to 6 carbon atoms, is preferable.

The structure represented by Formula (E) can be formed by using, for example, a compound having a hydrophilic group (for example, an c-amino acid, particularly preferably lysine) which will be described later.

$A^2$ and $L^2$ in Formula (F) each independently have the same definition as $A^1$ and $L^1$ in Formula (E), and the preferable aspect thereof is also the same.

The three-dimensional cross-linked structure more preferably contains the structure represented by Formula (E). In the aqueous dispersion of the present invention, the three-dimensional cross-linked structure containing a salt obtained by the acid group being neutralized contains the structure represented by Formula (E), thereby further improving the dispersion stability.

A method for introducing the hydrophilic group into the shell of the microcapsule will be described.

The introduction of a hydrophilic group into the shell may be performed by allowing a reaction between the aforementioned tri- or higher functional isocyanate compound, water or a compound having two or more active hydrogen groups, and a compound having a hydrophilic group.

The introduction of the hydrophilic group into the shell of the microcapsule may be carried out as follows. First, a di- or higher functional isocyanate compound is allowed to react with a compound having a hydrophilic group so as to manufacture an isocyanate compound into which the hydrophilic group is introduced, next, "the isocyanate compound into which the hydrophilic group is introduced" is allowed to react with a compound having two or more active hydrogen groups so as to manufacture a tri- or higher functional isocyanate compound into which the hydrophilic group is introduced, and next, "the tri- or higher functional isocyanate compound into which the hydrophilic group is introduced" is allowed to react with water or a compound having two or more active hydrogen groups.

—Compound Having Hydrophilic Group—

Examples of the compound having the hydrophilic group include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine). Specific examples of the compound having the hydrophilic group, other than a-amino acid are as below.

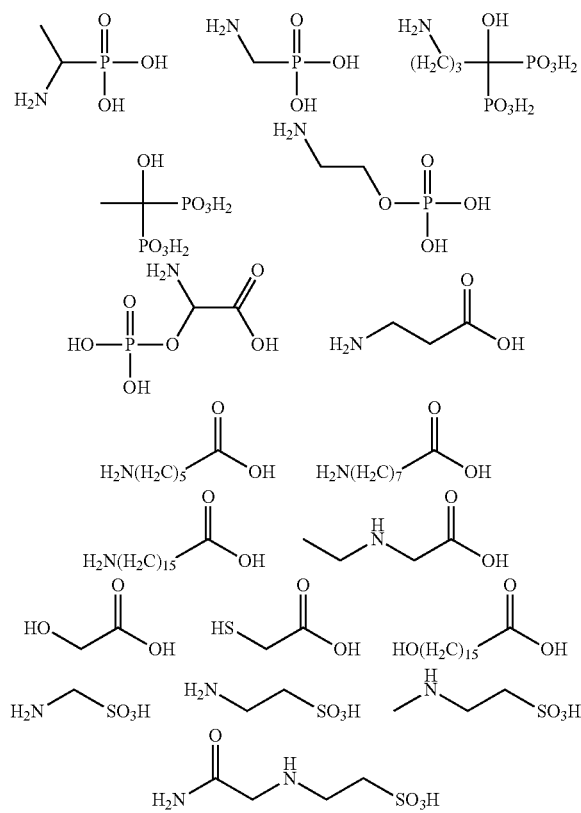

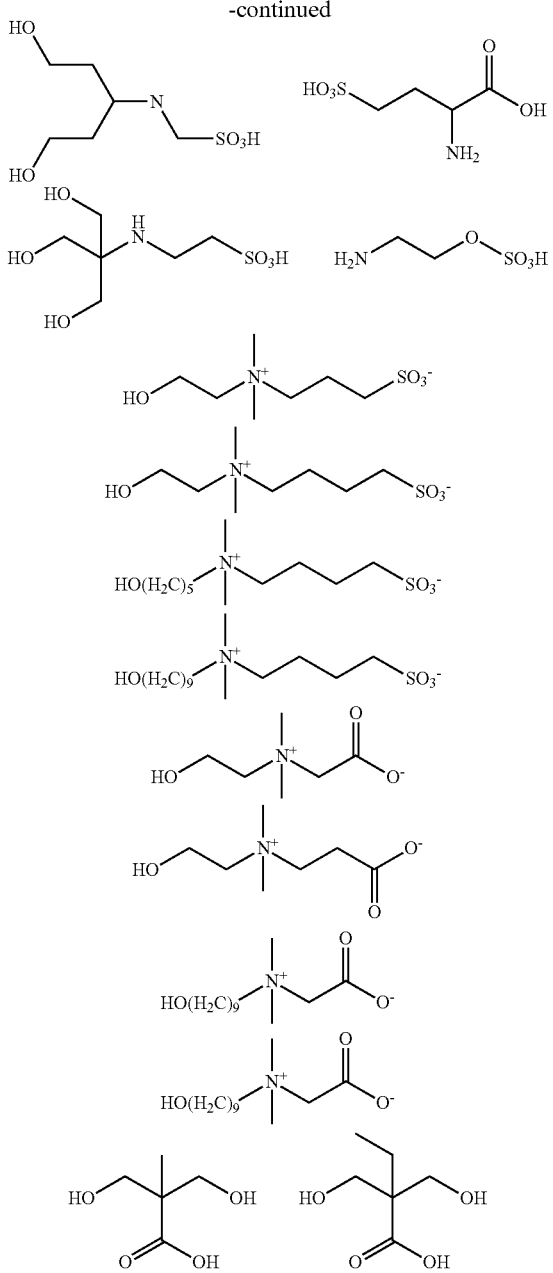

In a case where the compound having the anionic group is used as the compound having the hydrophilic group, the compound having the anionic group may be used by neutralizing at least some of the anionic group by using an inorganic base such as sodium hydroxide or potassium hydroxide; an organic base such as triethylamine, or the like.

Among the compound having the hydrophilic group, as a compound having a nonionic group, a compound having a polyether structure is preferable, and a compound having a polyoxyalkylene chain is more preferable.

Specific examples of the compound having a polyoxyalkylene chain include polyethylene oxide, polypropylene oxide, polytetramethylene oxide, polystyrene oxide, polycyclohexylene oxide, a polyethylene oxide-polypropylene oxide block copolymer, a polyethylene oxide-polypropylene oxide random copolymer, and the like.

Among these compounds having a polyoxyalkylene chain, polyethylene oxide, polypropylene oxide, and a poly- ethylene oxide-polypropylene oxide block copolymer are preferable, and polyethylene oxide is more preferable.

Furthermore, as the compound having a polyether structure, a polyethylene oxide monoether compound (examples of the monoether include monomethyl ether, monoethyl ether, and the like) and a polyethylene oxide monoester compound (examples of the monoester include a monoacetic acid ester, a mono(meth)acrylic acid ester, and the like) are also preferable.

—Isocyanate Compound into which Hydrophilic Group is Introduced—

In addition, as described above, for introducing a hydrophilic group into the shell, an isocyanate compound into which a hydrophilic group is introduced can also be used.

The isocyanate compound into which a hydrophilic group is introduced is preferably a reaction product between a compound having a hydrophilic group, isophorone diisocyanate (IPDI), hexamethylene diisocyanate (HDI), trimethylhexamethylene diisocyanate (TMHDI), 1,3-bis(isocyanatomethyl)cyclohexane (HXDI), or cyclohexylmethane-4,4'-diisocyanate (HMDI).

In a case where the group having a polyether structure is introduced into the shell as a hydrophilic group, as the isocyanate compound into which the hydrophilic group is introduced, an adduct of trimethylolpropane (TMP) and 1,3-bis(isocyanatomethyl)cyclohexane (HXDI) and polyethylene glycol monomethyl ether is preferably used.

In addition, in a case of introducing a carboxy group or a salt thereof into the shell as a hydrophilic group, as the isocyanate compound into which the hydrophilic group is introduced, it is preferable to use a reaction product (that is, isocyanate compound containing a carboxy group or a salt thereof) between 2,2-bis(hydroxymethyl)propionic acid (DMPA) or a salt of thereof and isophorone diisocyanate (IPDI).

As the salt of a carboxy group, a sodium salt, a potassium salt, a triethylamine salt, or a dimethylethanolamine salt is preferable, and a sodium salt or a triethylamine salt is more preferable.

In a case of using the compound having a hydrophilic group for introducing a hydrophilic group into the shell, an added amount of the compound having a hydrophilic group is preferably 0.1% by mass to 50% by mass, more preferably 0.1% by mass to 45% by mass, even more preferably 0.1% by mass to 40% by mass, even more preferably 1% by mass to 35% by mass, and even more preferably 3% by mass to 30% by mass, with respect to the total solid content of the microcapsule.

(Polymerizable Group Capable of being Contained in Shell)

The microcapsule has the polymerizable group in at least one of the shell or the core.

The microcapsule has the polymerizable group, which makes it possible that by irradiation with active energy ray, microcapsules adjacent to each other are bonded to each other so as to form a cross-linked structure, and therefore an image having a high level of cross-linking properties and excellent film hardness can be formed.

The microcapsule may have the polymerizable group by the form in which the polymerizable group is introduced into the three-dimensional cross-linked structure of the shell or may have the polymerizable group by the form in which the polymerizable compound (that is, the compound having the polymerizable group) is contained in the core. In addition, the microcapsule may have the polymerizable group by both forms.

A method for introducing the polymerizable group into the shell of the microcapsule will be described.

Examples of the method for introducing the polymerizable group into the shell of the microcapsule include a method in which in a case where of forming the three-dimensional cross-linked structure having at least one bond selected from a urethane bond and a urea bond, the above-described tri- or higher functional isocyanate compound, water or the above-described compound having two or more active hydrogen groups, and a polymerizable compound as a compound for introducing a polymerizable group are allowed to react with each other; a method in which in a case of manufacturing the above-described tri- or higher functional isocyanate compound, the above-described di- or higher functional isocyanate compound is allowed to react with a polymerizable compound as a compound for introducing a polymerizable group, and the isocyanate compound into which the polymerizable group is introduced in advance is allowed to react with water or the above-described compound having two or more active hydrogen groups; and a method in which in a case of manufacturing a microcapsule, a polymerizable compound as a compound for introducing a polymerizable group is dissolved in an oil-phase component together with components constituting the microcapsule, and a water-phase component is added to and mixed with the oil-phase component, followed by emulsification.

Examples of the polymerizable compound used for introducing a polymerizable group into the microcapsule include a compound which has at least one active hydrogen group and has an ethylenically unsaturated bond on at least one terminal thereof.

The compound which has at least one active hydrogen group and has an ethylenically unsaturated bond on at least one terminal thereof can be represented by Structural Formula (a).

$$L^1 Lc_m Z_n \quad \text{(a)}$$

In Structural Formula (a), $L^1$ represents an (m+n)-valent linking group, m and n each independently represent an integer selected from 1 to 100, Lc represents a monovalent ethylenically unsaturated group, and Z represents an active hydrogen group.

$L^1$ is preferably an aliphatic group having a valency of 2 or higher, a heterocyclic group having a valency of 2 or higher, —O—, —S—, —NH—, —N<, —CO—, —SO—, —SO$_2$—, or a combination of these.

m and n each independently preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, a methacryloyl group, and the like.

Z is preferably OH, SH, NH, or NH$_2$, more preferably OH or NH$_2$, and even more preferably OH.

Examples of the compound which has at least one active hydrogen group and has an ethylenically unsaturated bond on at least one terminal thereof will be shown below, but the present invention is not limited to the structures. n in the compounds (a-3) and (a-12) represents an integer selected from 1 to 90, for example.

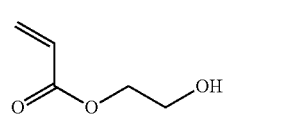

(a-1)

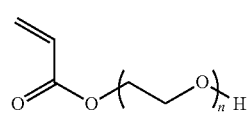

(a-3)

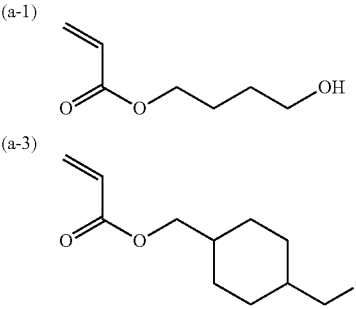

(a-2)

(a-4)

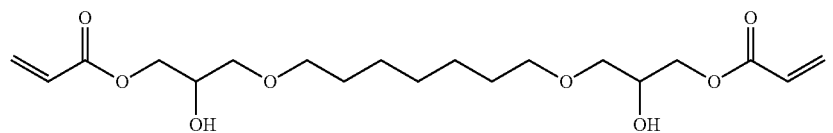

(a-5)

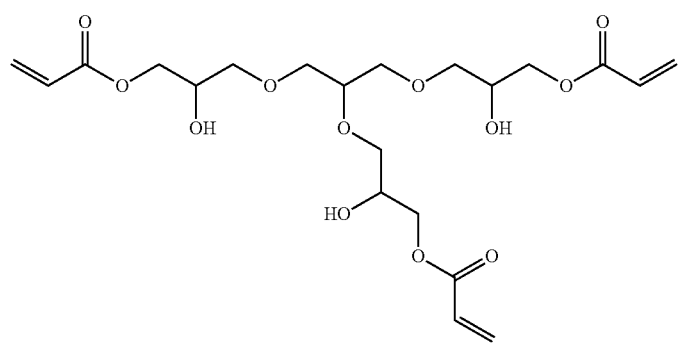

(a-6)

DA-314

-continued
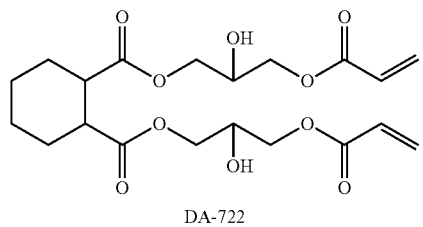
DA-722 (a-7)
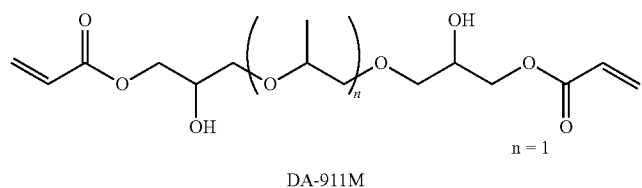
n = 1
DA-911M (a-8)
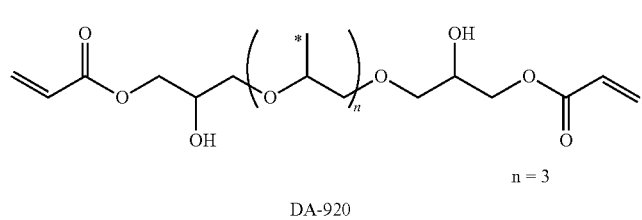
n = 3
DA-920 (a-9)
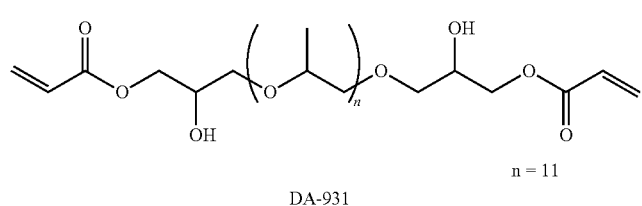
n = 11
DA-931 (a-10)
(a-11) (a-12)
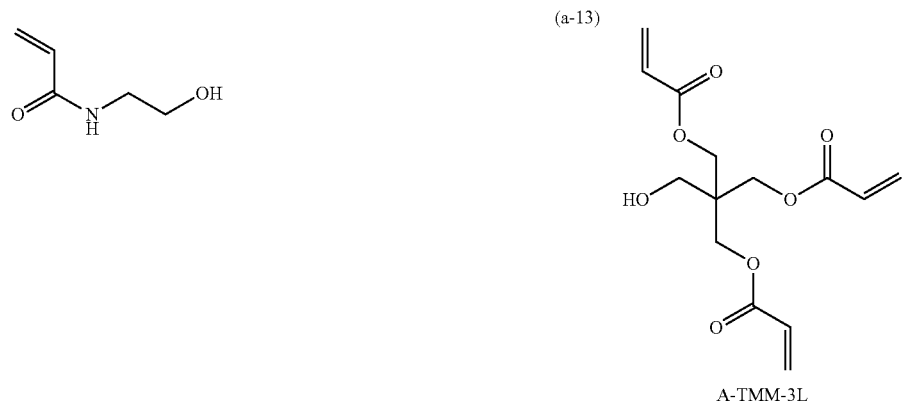
(a-13)
A-TMM-3L (a-14)

-continued

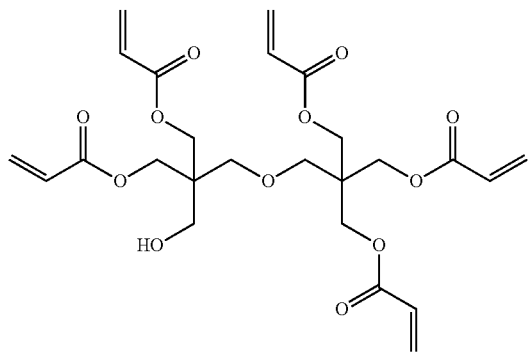

SR399E (a-15)

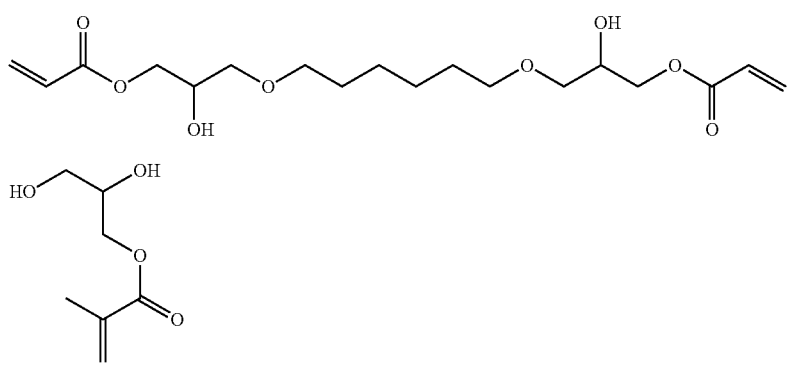

(a-16)

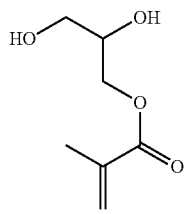

(a-17)

As the compound which has at least one active hydrogen group and has an ethylenically unsaturated bond on at least one terminal thereof, commercially available products may also be used. Examples thereof include acrylates such as hydroxyethyl acrylate (manufactured by OSAKA ORGANIC CHEMICAL INDUSTRY LTD), 4-hydroxybutyl acrylate and 1,4-cyclohexanedimethanol monoacrylate (manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), and AP-800 (n=13) (manufactured by NOF CORPORATION), and DENACOL (registered trademark) ACRYLATE DA-212, DA-314, DA-722, DA-911M, DA-920, and DA-931 (manufactured by Nagase ChemteX Corporation), methacrylates such as 2-hydroxyethyl methacrylate (manufactured by KYOEISHA CHEMICAL Co., LTD), and BLEMMER (registered trademark) PE-90 (n=2), PE-200 (n=4.5), PE-350 (n=8), PP-1000 (N=4 to 6), PP-500 (n=9), and PP-800 (n=13) (manufactured by NOF CORPORATION), acrylamide (manufactured by KJ Chemicals Corporation), and the like.

Among these compounds which have at least one active hydrogen group and have an ethylenically unsaturated bond on at least one terminal thereof, hydroxyethyl acrylate (manufactured by OSAKA ORGANIC CHEMICAL INDUSTRY LTD), AE-400 (n=10) and AP-400 (n=6) (manufactured by NOF CORPORATION), DENACOL (registered trademark) ACRYLATE DA-212 (manufactured by Nagase ChemteX Corporation), and PP-500 (n=9) (manufactured by NOF CORPORATION) are preferable.

The introduction of a polymerizable group into the microcapsule can be performed, for example, in a manner shown in Synthesis Scheme 3 described below in which an isocyanate compound into which a polymerizable group is introduced is prepared by reacting the isocyanate group of the tri- or higher functional isocyanate compound with the active hydrogen group of the compound which has at least one active hydrogen group and has an ethylenically unsaturated bond on at least one terminal thereof, and the prepared isocyanate compound into which a polymerizable group is introduced is reacted with the aforementioned compound having two or more active hydrogen groups.

—Synthesize Scheme 3—

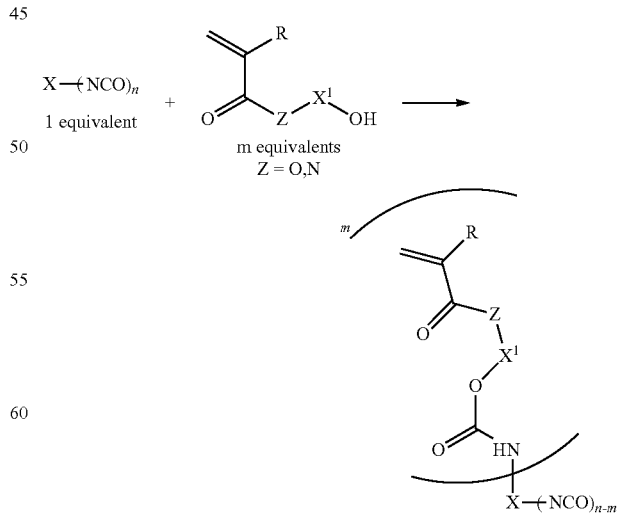

The compound which has at least one active hydrogen group and has an ethylenically unsaturated bond on at least one terminal thereof, may be used alone, or two or more kinds thereof may be used in combination.

The active hydrogen group of the compound which has one active hydrogen group and an isocyanate group of the tri- or higher functional isocyanate compound and has an ethylenically unsaturated bond on at least one terminal thereof, has at least one active hydrogen group. A reaction is preferably performed with an amount in which the number of moles of the active hydrogen group of the compound which has an ethylenically unsaturated bond on at least one terminal thereof, is 1% to 30% of the number of moles of the isocyanate group of the tri- or higher functional isocyanate compound, the reaction is more preferably performed with an amount in which the number of moles is 2% to 25%, and the reaction is even more preferably performed with an amount in which the number of moles is 3% to 20%.

[Core of Microcapsule]

The microcapsule includes the core which is in the interior of the shell.

Components to be contained in the core of the microcapsule are not particularly limited.

The core may contain components such as a polymerizable compound, a photopolymerization initiator, and a sensitizer, which are appropriately combined. In addition, the core may contain other components in the aqueous dispersion which will be described below.

In the microcapsule, it is preferable that the core contains the polymerizable compound from the viewpoint of improving curing sensitivity of the film and film hardness.

As the polymerizable compound capable of being contained in the core of the microcapsule, a photopolymerizable compound that is polymerized and cured by irradiation with active energy rays (will also be simply referred to as "light"), or a thermally polymerizable compound that is polymerized and cured by heating or irradiation with infrared rays, is preferable. As the photopolymerizable compound, a radically polymerizable compound which is capable of radical polymerization and has an ethylenically unsaturated bond is preferable.

The core preferably contains the photopolymerization initiator from the viewpoint of improving sensitivity with respect to active energy rays, and preferably contains the sensitizer from viewpoint of accelerating decomposition of the photopolymerization initiator by irradiation with active energy rays. Particularly, the core more preferably contains the radically polymerizable compound and the photopolymerization initiator, and even more preferably contains the radically polymerizable compound, the photopolymerization initiator, and the sensitizer from viewpoint of improving film hardness.

(Polymerizable Compound)

The core of the microcapsule preferably contains the polymerizable compound (that is, the compound having a polymerizable group). In a case where the core contains the polymerizable compound, one kind of the polymerizable compound may be used alone, or two or more kinds thereof may be used in combination.

The core containing the polymerizable compound is advantageous from the viewpoint of improving curing sensitivity of the film and film hardness. Particularly, a case in which the core contains two or more polymerizable compounds and contains the di- or lower functional polymerizable compound and the tri- or higher functional polymerizable compound, is preferable because it becomes possible that film hardness is compatible with adhesiveness.

In a case where the shell of the microcapsule does not have the polymerizable group, the core of the microcapsule contains the polymerizable compound, and therefore the polymerizable group of the polymerizable compound functions as a polymerizable group which is to be contained in the microcapsule.

A content of the polymerizable compound (total amount in a case where two or more thereof are contained) capable of being contained in the core of the microcapsule is preferably 30% by mass to 75% by mass, more preferably 35% by mass to 65% by mass, and even more preferably 35% by mass to 60% by mass with respect to the total solid content of the microcapsule, from the viewpoint of compatibility of adhesiveness and hardness of the film.

In the case where the polymerizable compound contains the di- or lower functional polymerizable compound and the tri- or higher functional polymerizable compound, a proportion of the di- or lower functional polymerizable compound is preferably 50% by mass to 90% by mass, more preferably 50% by mass to 80% by mass, and even more preferably 55% by mass to 65% by mass, with respect to a total mass of the di- or lower functional polymerizable compound and the tri- or higher functional polymerizable compound.

With the proportion of the di- or lower functional polymerizable compound being 50% by mass or more, adhesiveness becomes excellent. Meanwhile, with the proportion of the di- or lower functional polymerizable compound being 90% by mass or less, film harness becomes excellent.

The polymerizable compound capable of being contained in the core of the microcapsule may any one of a polymerizable monomer, a polymerizable oligomer, and a polymerizable polymer, but is preferably a polymerizable monomer from the viewpoint of bleeding out. Among these, more preferable polymerizable compound is a polymerizable monomer having photocuring properties (that is, photopolymerizable monomer), and a polymerizable monomer having thermosetting properties (that is, thermally polymerizable monomer).

The molecular weight of the polymerizable compound is, in terms of a weight-average molecular weight, preferably 100 to 100,000, more preferably 100 to 10,000, even more preferably 100 to 4,000, still more preferably 100 to 2,000, and particularly preferably 100 to 1,000.

The weight-average molecular weight is measured by gel permeation chromatography (GPC).

In the measurement by gel permeation chromatography (GPC), HLC (registered trademark)-8020 GPC (manufactured by Tosoh Corporation) may be used as a measurement device, three columns of TSKgel (registered trademark) Super Multipore HZ-H (4.6 mm ID x 15 cm, manufactured by Tosoh Corporation) may be used as columns, and tetrahydrofuran (THF) may be used as an eluent. Furthermore, GPC can be performed using a differential refractive index (RI) detector under the measurement conditions of a sample concentration of 0.45% by mass, a flow rate of 0.35 ml/min, a sample injection amount of 10 μL, and a measurement temperature of 40° C.

A calibration curve can be prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

—Polymerizable Monomer—

In a case where the polymerizable compound is a polymerizable monomer, the polymerizable monomer is favorable from the viewpoint of improving curing sensitivity of the film and film hardness.

Particularly, a case in which the core contains the di- or lower functional polymerizable monomer and the tri- or higher functional polymerizable monomer as a polymerizable compound, is preferable because film hardness and adhesiveness are further improved.

Examples of the polymerizable monomer capable of being contained in the core of the microcapsule (hereinafter, will also be referred to as internal polymerizable monomer) include a photopolymerizable monomer that is polymerized and cured by irradiation with light, or a thermally polymerizable monomer that is polymerized and cured by heating or irradiation with infrared rays.

In a case of containing the photopolymerizable monomer as the polymerizable compound, an aspect in which a photopolymerization initiator to be described later is contained is preferable. In addition, in a case of containing the thermally polymerizable monomer as the polymerizable compound, the photothermal conversion agent, the thermal curing accelerator, or an aspect in which the photothermal conversion agent and the thermal curing accelerator are contained, which will be described later is preferable.

<Photopolymerizable Monomer>

The photopolymerizable monomer can be selected from a polymerizable monomer having a radically polymerizable ethylenically unsaturated bond (a radically polymerizable monomer) and a polymerization monomer having a cationic polymerizable group that can be cationically polymerized (a cationic polymerizable monomer).

Examples of the radically polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

As the radically polymerizable monomer, a compound having an ethylenic unsaturated group and an ethylenically unsaturated group is preferable.

One kind of the radically polymerizable monomer may be used alone, or two or more kinds thereof may be used in combination.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxyethylhydrophthalic acid, ethoxydiethylene glycol acrylate, methoxydiethyleneglycol acrylate, methoxypolyethylene glycol acrylate, methoxypropylene glycol acrylate, 2-hydroxy-3-phenoxypropyl acrylate, vinyl ether acrylate, 2-acryloyloxyethyl succinic acid, 2-acryloyloxy phthalic acid, 2-acryloxyethyl-2-hydroxyethyl phthalic acid, lactone modified acrylate, acryloyl morpholine, acrylamide, and substituted acrylamides such as N-methylol acrylamide and diacetone acrylamide;

difunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxypineopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanuric acid triacrylate, e-caprolactone modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrlate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate;

difunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate; and the like.

Examples, of the styrene compound include styrene, p-methylstyrene, p-methoxystyrene, β-methylstyrene, p-methyl-β-methylstyrene, α-methylstyrene, and p-methoxy-β-methylstyrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinyl ethylacetamide, N-vinylpyrrole, N-vinylphenothiazine, N-vinylacetanilide, N-vinyl succinic acid imide, N-vinylphthalimide, N-vinylcaprolactam, and N-vinylimidazole.

Examples of other radically polymerizable monomers include N-vinyl amides such as allyl glycidyl ether, diallyl phthalate, triallyl trimellitate, and N-vinylformamide, and the like.

Among these radically polymerizable monomer, as the di- or lower functional radically polymerizable monomer, at least one kind selected from 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate, is preferable.

In addition, as the tri- or higher functional radically polymerizable monomer, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate, is preferable.

As a combination of the di- or lower functional radically polymerizable monomer and the tri- or higher functional radically polymerizable monomer, a combination of a di- or lower functional acrylate compound and a tri- or higher functional acrylate compound is preferable, a combination of a difunctional acrylate compound and a tri- or higher functional acrylate compound is even more preferable, a combination of a difunctional acrylate compound and a tri- to octa-acrylate compound is still more preferable, and a combination of a difunctional acrylate compound and a tri- to hexa-acrylate compound is yet more preferable.

Furthermore, the most preferable combination thereof is a combination of, as a difunctional acrylate compound, at least one kind selected from 1,6-hexanediol diacrylate (HDDA), 1,9-nonanediol diacrylate (NDDA), 1,10-decanediol diacrylate (DDDA), 3-methylpentadiol diacrylate (3 MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, and polypropylene glycol diacrylate, and, as a tri- to hexa-acrylate compound, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the cationic polymerizable monomer include an epoxy compound, a vinyl ether compound, and an oxetane compound.

As the cationic polymerizable monomer, a compound having at least one olefin, thioether, acetal, thioxane, thietane, aziridine, N, O, S, or P-heterocyclic ring, aldehyde, lactam, or a cyclic ester group is preferable.

One kind of the cationically polymerizable monomer may be used alone, or two or more kinds thereof may be used in combination.

Examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, alicyclic diepoxide, and the like.

Examples of the alicyclic diepoxide include a copolymer of an epoxide and a compound containing a hydroxyl group, such as glycol, polyol, and vinyl ether. Specific examples thereof include 3,4-epoxycyclohexylmethyl-3',4'-epoxycycloethylcarboxylate, bis(3,4-epoxyhexylmethyl)adipate, limonene diepoxide, and diglycidyl ester of hexahydrophthalic acid.

In addition, examples of other epoxy compounds include tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene, and the like.

Examples of the vinyl ether compound include di- or lower functional vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexane dimethanol monovinyl ether, phenyl vinyl ether, p-methylphenyl vinyl ether, p-methoxyphenyl vinyl ether, methyl vinyl ether, P-methyl vinyl ether, P-chloro iso vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexane dimethanol divinyl ether, 4-(vinyloxy)butyl benzoate, bis[4-(vinyloxy)butyl] adipate, bis[4-(vinyloxy)butyl] succinate, 4-(vinyloxymethyl)cyclohexylmethyl benzoate, bis[4-(vinyloxy)butyl] isophthalate, bis[4-(vinyloxymethyl)cyclohexylmethyl] glutarate, 4-(vinyloxy)butyl steatite, bis[4-(vinyloxy)butyl] hexadiyl dicarbamate, bis[4-(vinyloxy)methyl]cyclohexyl] methyl]terephthalate, bis[4-(vinyloxy)methyl]cyclohexyl] methyl] isophthalate, bis[4-(vinyloxy)butyl](4-methyl-1,3-phenylene)-biscarbamate, bis[4-vinyloxy)butyl] (methylenedi-4,1-phenylene)biscarbamate, and 3-amino-1-propanol vinyl ether; and tri- or higher functional vinyl ether compounds such as tris[4-(vinyloxy)butyl]trimellitate.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, and 3,3-dimethyl-2-(p-methoxyphenyl)-oxetane.

In addition to the radically polymerizable monomers exemplified above, it is possible to use the commercially available products described in "Cross-linking Agent Handbook" edited by Shinzo Yamashita (1981, TAISEI-SHUPPAN CO., LTD.); "UV-EB Curing Handbook (raw materials)" edited by Kiyomi Kato (1985, Kobunshi Kankokai); "Application and Market of UV-EB Curing Technology" edited by RadTech Japan, p. 79, (1989, CMC); "Polyester Resin Handbook" written by Eichiro Takiyama, (1988, NIKKAN KOGYO SHIMBUN, LTD.) or to use radically polymerizable and cross-linkable monomers known in the technical field.

Furthermore, in addition to the cationic polymerizable monomers exemplified above, it is possible to use the compounds described in "Advances in Polymer Science" by J. V. Crivello et al., 62, pages 1 to 47 (1984), "Handbook of Epoxy Resins" by Lee et al., McGraw Hill Book Company, New York (1967), and "Epoxy Resin Technology" by P. F. Bruins et al. (1968).

In addition, as the photopolymerizable monomer, for example, the photocurable polymerizable monomers used in photopolymerizable compositions described in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A, and the like are known. These monomers can also be suitably used in the microcapsule.

In addition, as the photopolymerizable monomer, a commercially available product on the market may be used.

Examples of the commercially available product of the photopolymerizable monomer include AH-600 (difunctional), AT-600 (difunctional), UA-306H (hexafunctional), UA-306T (hexafunctional), UA-306I (hexafunctional), UA-510H (decafunctional), UF-8001G (difunctional), and DAUA-167 (difunctional) (manufactured by KYOEISHA CHEMICAL Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (manufactured by Sartomer Arkema Inc.), A-NOD-N (difunctional NDDA), A-DOD-N (difunctional DDDA), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (Shin-Nakamura Chemical Co., Ltd.), UV-7510B (trifunctional) (Nippon Synthetic Chemical Industry Co., Ltd.), KAYARAD DCPA-30 (hexafunctional) and KAYARAD DPEA-12 (hexafunctional) (Nippon Kayaku Co., Ltd.), and LIGHT ACRYLATE NPA (difunctional) and LIGHT ACRYLATE 3EG-A (difunctional) (KYOEISHA CHEMICAL Co., Ltd.).

In addition, as the polymerizable monomer, it is possible to suitably use the commercially available products such as neopentyl glycol propylene oxide adduct diacrylate (NPGPODA), SR531, SR285, and SR256 (manufactured by Sartomer Arkema Inc.), A-DHP (dipentaerythritol hexaacrylate, SHIN-NAKAMURA CHEMICAL CO., LTD.), ARONIX (registered trademark) M-156 (manufactured by TOAGOSEI CO., LTD.), V-CAP (manufactured by BASF SE), VISCOAT #192 (manufactured by OSAKA ORGANIC CHEMICAL INDUSTRY LTD), and the like.

<Thermally Polymerizable Monomer>

The thermally polymerizable monomer can be selected from the group of the polymerizable monomers capable of polymerization by heating or irradiation with infrared rays. Examples of thermally polymerizable monomer include compounds such as epoxy, oxetane, aziridine, azetidine, ketone, aldehyde, or blocked isocyanate.

Among the above examples, examples of the epoxy compound include di- or lower functional epoxy compounds such as 1,4-butanediol diglycidyl ether, 3-(bis(glycidyloxyrpethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, and alicyclic diepoxide;

tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene; and the like.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, 3,3-dimethyl-2-(p-methoxyphenyl)-oxetane, and the like.

Examples of the blocked isocyanate compound include a compound obtained by inactivating an isocyanate compound with a blocking agent (active hydrogen-containing compound).

As the isocyanate compound, for example, commercially available isocyanates such as hexamethylene diisocyanate, isophorone diisocyanate, toluyl diisocyanate, xylylene diisocyanate, hexamethylene diisocyanate trimer, trimethylhexylene diisocyanate, diphenylmethane diisocyanate, dicyclohexylmethane diisocyanate, hydrogenated xylylene diisocyanate, TAKENATE (registered trademark; Mitsui Chemicals, Inc.), DURANATE (registered trademark; Asahi Kasei Corporation), and Bayhydur (registered trademark; Bayer AG), or a di- or higher functional isocyanate obtained by combination thereof is preferable.

Examples of the blocking agent include lactam [for example, ε-caprolactam, δ-valerolactam, γ-butyrolactam, and the like], oxime [for example, acetoxime, methyl ethyl ketoxime (MEK oxime), methyl isobutyl ketoxime (MIBK oxime), cyclohexanone oxime, and the like], amines [for example, aliphatic amines (dimethylamine, diisopropylamine, di-n-propylamine, diisobutylamine, and the like), alicyclic amines (methylhexylamine, dicyclohexylamine, and the like), aromatic amines (aniline, diphenylamine, and the like)], aliphatic alcohols [for example, methanol, ethanol, 2-propanol, n-butanol, and the like], phenol and alkylphenol [for example, phenol, cresol, ethylphenol, n-propylphenol, isopropylphenol, n-butylphenol, octylphenol, nonylphenol, xylenol, diisopropylphenol, di-t-butylphenol, and the like], imidazole [for example, imidazole, 2-methylimidazole, and the like], pyrazole [for example, pyrazole, 3-methylpyrazole, 3,5-dimethylpyrazole, and the like], imine [for example, ethyleneimine, polyethyleneimine, and the like], active methylene [for example, dimethyl malonate, diethyl malonate, diisopropyl malonate, acetylacetone, methyl acetoacetate, ethyl acetoacetate, and the like], blocking agents disclosed in JP2002-309217A and JP2008-239890A, and a mixture of two or more kinds thereof. Among these, as the blocking agent, oxime, lactam, pyrazole, active methylene, and amine are preferable.

As the blocked isocyanate compound, commercially available products on the market may be used, and for example, Trixene (registered trademark) BI7982, BI7641, BI7642, BI7950, BI7960, BI7991, and the like (Baxenden Chemicals ltd), and Bayhydur (registered trademark; Bayer AG) are suitably used. In addition, the group of compounds described in paragraph 0064 of WO2015/158654A is suitably used.

In a case of manufacturing the microcapsule, the polymerizable monomer is dissolved as an oil-phase component together with the components constituting the microcapsule, and a water-phase component is added to and mixed with the oil-phase component, followed by emulsification, and therefore the polymerizable monomer can be incorporated into the core of the microcapsule.

The molecular weight of the polymerizable monomer is, in terms of a weight-average molecular weight, preferably 100 to 4,000, more preferably 100 to 2,000, and even more preferably 100 to 1,000.

The weight-average molecular weight is measured by gel permeation chromatography (GPC).

The content of the internal polymerizable monomer in the total solid content of the microcapsule is preferably 0.1% by mass to 75% by mass, more preferably 0.5% by mass to 60% by mass, and even more preferably 1% by mass to 50% by mass. With the content within the above range, an image in which the cross-linking properties and the film hardness are favorable is obtained.

—Polymerizable Oligomer and Polymerizable Polymer—

A case in which the polymerizable compound is a polymerizable oligomer or a polymerizable polymer is advantageous from the viewpoints that cure shrinkage of the film is decreased and a deterioration in adhesiveness of the film to a recording medium is suppressed. In a case of containing the polymerizable oligomer or polymerizable polymer, which have photocuring properties, as the polymerizable compound, an aspect in which a photopolymerization initiator to be described later is contained is preferable. In addition, in a case of containing the polymerizable oligomer or polymerizable polymer, which have thermosetting properties, as the polymerizable compound, the photothermal conversion agent, the thermal curing accelerator, or an aspect in which the photothermal conversion agent and the thermal curing accelerator are contained, which will be described later is preferable.

Examples of the polymerizable oligomer and the polymerizable polymer include oligomers and polymers such as an acrylic resin, a urethane resin, polyester, polyether, polycarbonate, an epoxy resin, and polybutadiene.

In addition, examples thereof include resins such as epoxy acrylate, aliphatic urethane acrylate, aromatic urethane acrylate, and polyester acrylate may be used.

Among these, from the viewpoint of decreasing cure shrinkage, a resin which has a hard segment and a soft segment in combination and is capable of stress relaxation in a case of curing is preferable, and particularly, at least one oligomer or polymer selected from a urethane resin, a polyester resin, and an epoxy resin is more preferable.

As the polymerizable group, an ethylenically unsaturated group such as a (meth)acrylic group, a vinyl group, an allyl group, and a styryl group, an epoxy group, and the like are preferable, and from the viewpoint of polymerization reactivity, at least one group selected from a (meth)acrylic group, a vinyl group, and a styryl group is more preferable, and a (meth)acrylic group is particularly preferable.

The polymerizable oligomer and the polymerizable polymer may have only one kind of polymerizable group or have two or more kinds thereof.

These polymerizable groups can be introduced into polymers or oligomers by polymer reaction and copolymerization.

For example, by using a reaction between a polymer or an oligomer having a carboxy group on a side chain, and glycidyl methacrylate, or a reaction between a polymer or an oligomer having an epoxy group, and an ethylenically unsaturated group-containing carboxylic acid such as a methacrylic acid, the polymerizable groups can be introduced into polymers or oligomers. These groups may be used in combination.

As the polymerizable oligomer and the polymerizable polymer, a commercially available product on the market may be used.

Examples of the commercially available product of the polymerizable oligomer and the polymerizable polymer include acrylic resins such as (ACA) Z200M, (ACA) Z230AA, (ACA) Z251, and (ACA) Z254F (all of which are manufactured by DAICEL-ALLNEX LTD.), and HA7975D (Hitachi Chemical Co., Ltd.);

urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, and KRM 8528 (all of which are manufactured by DAICEL-ALLNEX LTD.), CN964, CN9012, CN968, CN996, CN975, and CN9782 (all of which are manufactured by Sartomer Arkema Inc.), UV-6300B, UV-7600B, UV-7605B, UV-7620EA, and UV-7630B (all of which are manufactured by Nippon Synthetic Chemical Industry Co., Ltd.), U-6HA, U-15HA, U-108A, U-200PA, and UA-4200 (all of which are manufactured by Shin-Nakamura Chemical Co., Ltd.), TL2300, HA4863, TL2328, TL2350, and HA7902-1 (all of which are manufactured by Hitachi Chemical Co., Ltd.), and 8UA-017, 8UA-239, 8UA-239H, 8UA-140, 8UA-585H, 8UA-347H, and 8UX-015A (all of which are manufactured by TAISEI FINE CHEMICAL CO., LTD.);

polyester resins such as CN294, CN2254, CN2260, CN2271E, CN2300, CN2301, CN2302, CN2303, and CN2304 (all of which are manufactured by Sartomer Arkema Inc.), and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are manufactured by DAICEL-ALLNEX LTD.);

polyether resins such as BLEMMER (registered trademark) ADE-400A and BLEMMER (registered trademark) ADP-400 (all of which are manufactured by NOF CORPORATION);

polycarbonate resins such as polycarbonate diol diacrylate (UBE INDUSTRIES, LTD.);

epoxy resins such as EBECRYL (registered trademark) 3708 (DAICEL-ALLNEX LTD.), CN120, CN120B60, CN120B80, and CN120E50 (all of which are manufactured by Sartomer Arkema Inc.), HA7851 (Hitachi Chemical Co., Ltd.), and EPICLON (registered trademark) 840 (DIC CORPORATION); and polybutadiene resins such as CN301, CN303, and CN307 (all of which are manufactured by Sartomer Arkema Inc.).

(Photopolymerization Initiator)

The core of the microcapsule may contain at least one photopolymerization initiator.

That is, the microcapsule may contain at least one photopolymerization initiator in the interior thereof.

In a case where the polymerizable group of the microcapsule is a photopolymerizable group (preferably a radically polymerizable group), the core of the microcapsule preferable contains at least one photopolymerization initiator. Particularly, in a case where the core of the microcapsule contains the photopolymerizable compound (more preferably a radically polymerizable compound), the core of the microcapsule preferably contains at least one photopolymerization initiator.

With the core containing the photopolymerization initiator, sensitivity with respect to active energy rays increases, and therefore an image having excellent film hardness is obtained.

Furthermore, in a case where the microcapsule contains a photopolymerization initiator in the interior thereof, it is possible to use a photopolymerization initiator which cannot be readily used in the related art because the photopolymerization initiator has high sensitivity but exhibits low dispersibility or solubility in water. Therefore, in a case where the microcapsule is adopted in the aqueous dispersion, a highly sensitive aqueous dispersion can be realized compared to the aqueous dispersion of the related art. In addition, the microcapsule contains the photopolymerization initiator in the interior thereof. As a result, a range of choice of the photopolymerization initiators to be used broadens, and hence a range of choice of the light source to be used also broadens. Consequently, the curing sensitivity can be further improved compared to the related art.

As the photopolymerization initiator capable of being contained in the interior of the core of the microcapsule (hereinafter, referred to as an internal photopolymerization initiator as well), known photopolymerization initiators can be appropriately selected.

The photopolymerization initiator is a compound generating a radical or a cation, which is a polymerization initiating species, by absorbing light (that is, active energy rays).

As the photopolymerization initiator, a known compound can be used. Preferable examples of the photopolymerization initiator include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

As the photopolymerization initiator, the core may contain one kind of the compounds (a) to (m), or two or more kinds thereof in combination.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77-117, and the like.

More preferable examples of the compounds include the α-thiobenzophenone compound described in JP1972-6416B (JP-S47-6416B), the benzoin ether compound described in JP1972-3981B (JP-S47-3981B), the a-substituted benzoin compound described in JP1972-22326B (JP-S47-22326B), the benzoin derivative described in JP1972-23664B (JP-S47-23664B), the aryolphosphonic acid ester described in JP1982-30704A (JP-S57-30704A), the dialkoxybenzophenone described in JP1985-26483B (JP-S60-26483B), the benzoin ethers described in JP1985-26403B (JP-S60-26403B) and JP1987-81345A (JP-S62-81345A), the α-aminobenzophenones described in JP1989-34242B (JP-H01-34242B), U.S. Pat. No. 4,318,791A, and EP0284561A1, the p-di(dimethylaminobenzoyl)benzene described in JP1990-211452A (JP-H02-211452A), the thio-substituted aromatic ketone described in JP1986-194062A (JP-S61-194062A), the acylphosphine sulfide described in JP1990-9597B (JP-H02-9597B), the acylphosphine described in JP1990-9596B (JP-H02-9596B), the thioxanthones described in JP1988-61950B (JP-S63-61950B), the coumarins described in JP1984-42864B (JP-S59-42864B), the compound described in WO2015/158745A, and the like.

Furthermore, the photopolymerization initiator described in JP2008-105379A or JP2009-114290A is also preferable.

Examples of the commercially available product of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO (all of which are manufactured by BASF SE), ESACURE (registered trademark) KTO37, KTO46, KIP150, and EDB (all of which are manufactured by Lamberti S.p.A.), H-Nu (registered trademark) 470 and 470X (all of which are manufactured by Spectra Group Limited, Inc.), Omnipol 9210 (manufactured by IGM Resins B. V), SpeedCure 7040 (manufactured by Lambson Limited), and the like.

Among these photopolymerization initiators, as the photopolymerization initiator, from the viewpoint of sensitivity to UV light, at least one compound selected from (a) carbonyl compound and (b) acylphosphine oxide compound is more preferable, and specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2-hydroxy-2-methyl-1-phenyl-propan-1-one (for example, IRGACURE (registered trademark) 1173 manufactured by BASF SE), 2,4,6-trimethylbenzoyl-diphenyl-phosphine oxide (for example, DAROCUR (registered trademark) TPO, LUCIRIN (registered trademark) TPO (all of which are manufactured by BASF SE)), and the like.

Among these, from the viewpoint of suitability for LED light, as the photopolymerization initiator, (b) acylphosphine oxide compound is preferable, and a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide) is more preferable.

In a case of manufacturing the microcapsule, the photopolymerization initiator is dissolved as an oil-phase component together with the components constituting the microcapsule, a water-phase component is added to and mixed with the oil-phase component, followed by emulsification, and therefore the internal photopolymerization initiator can be incorporated into the core of the microcapsule.

The content of the photopolymerization initiator with respect to the total solid content of the microcapsule is preferably 0.1% by mass to 25% by mass, more preferably 0.5% by mass to 20% by mass, and even more preferably 1% by mass to 15% by mass.

(Sensitizer).

The core of the microcapsule may contain at least one sensitizer.

In a case where the core contains at least one photopolymerization initiator, the core preferably contains at least one sensitizer.

In a case where the core of the microcapsule contains the sensitizer, the decomposition of the photopolymerization initiator by the irradiation with active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acylcoumarin derivative, terphenyl, styryl ketone, 3-(aroylmethylene)thiazolyl, camphorquinone, eosin, rhodamine, erythrosine, and the like.

Furthermore, as the sensitizer, the compound represented by General Formula (i) described in JP2010-24276A and the compound represented by General Formula (described in JP1994-107718A (JP-H06-107718A) can also be suitably used.

Furthermore, the compounds described in WO2015/158745A, specifically tertiary aliphatic amines (for example, methyldiethanolamine, dimethylethanolamine, triethanolamine, triethylamine, and N-methylmorpholine); aromatic amines (for example, amyl para dimethylaminobenzoate, 2-butoxyethyl 4-(dimethylamino)benzoate, 2-(dimethylamino)ethyl benzoate, ethyl 4-(dimethylamino)benzoate, and 2-ethylhexyl 4-(dimethylamino)benzoate); (meth)acrylated amines (for example, dialkylaminoalkyl (meth)acrylate (such as diethylaminoethyl acrylate) and N-alkylmorpholine (meth)acrylate (such as N-alkylmorpholine acrylate)), and the like can be suitably used.

Among the above compounds, as the sensitizer, from the viewpoints of the suitability for LED light and the reactivity with the photopolymerization initiator, at least one selected from thioxanthone; isopropylthioxanthone, and benzophenone is preferable, at least one selected from thioxanthone and isopropylthioxanthone is more preferable, and isopropylthioxanthone is even more preferable.

In a case where the core of the microcapsule contains a sensitizer, the aqueous dispersion may contain one kind of sensitizer singly or two or more kinds of sensitizers in combination.

In a case where the core of the microcapsule contains the sensitizer, a content of the sensitizer is preferably 0.1% by mass to 25% by mass, more preferably 0.5% by mass to 20% by mass, and even more preferably 1% by mass to 15% by mass, with respect to the total solid content of the microcapsule.

(Photothermal Conversion Agent)

In the case where the core of the microcapsule contains the thermally polymerizable compound as a polymerizable compound (preferably a thermally polymerizable monomer), the core may contain at least one photothermal conversion agent.

The photothermal conversion agent is a compound which absorbs light such as infrared rays (that is, active energy rays) and generates heat so as to polymerize and cure the thermally polymerizable compound. As the photothermal conversion agent, a known compound can be used.

As the photothermal conversion agent, an infrared ray absorbent is preferable. Examples of the infrared ray absorbent include polymethylindolium, indocyanine green, a polymethine coloring agent, a croconium coloring agent, a cyanine coloring agent, a merocyanine coloring agent, a squarilium coloring agent, a chalcogenopyrylo arlidene coloring agent, a metal thiolate complex coloring agent, a bis(chalcogenopyrylo)polymethine coloring agent, an oxyindolizine coloring agent, a bisaminoallyl polymethine coloring agent, an indolizine coloring agent, a pyrylium coloring agent, a quinoid coloring agent, a quinone coloring agent, a phthalocyanine coloring agent, a naphthalocyanine coloring agent, an azo coloring agent, an azomethine coloring agent, carbon black, and the like.

In a case of manufacturing the microcapsule, the photothermal conversion agent is dissolved as an oil-phase component together with the components constituting the microcapsule, a water-phase component is added to and mixed with the oil-phase component so as to emulsify the obtained mixture, and therefore the photothermal conversion agent can be incorporated into the core of the microcapsule.

The photothermal conversion agent may be used alone or two or more kinds thereof may be used in combination.

The content of the photothermal conversion agent is preferably 0.1% by mass to 25% by mass, more preferably 0.5% by mass to 20% by mass, and even more preferably 1% by mass to 15% by mass, with respect to the total solid content of the microcapsule.

(Thermal Curing Accelerator)

In the case where the core of the microcapsule contains the thermally polymerizable compound as a polymerizable compound (preferably a thermally polymerizable monomer), the core may contain at least one thermal curing accelerator.

The thermal curing accelerator is a compound that catalytically promotes the thermal curing reaction of the thermally polymerizable compound (preferably a thermally polymerizable monomer).

As the thermal curing accelerator, a known compound can be used. As the thermal curing accelerator, an acid or a base, and a compound that generates an acid or a base by heating are preferable, and examples thereof include a carboxylic acid, a sulfonic acid, a phosphoric acid, an aliphatic alcohol, phenol, aliphatic amine, aromatic amine, imidazole (for example, 2-methylimidazole), pyrazole, and the like.

In a case of manufacturing the microcapsule, the thermal curing accelerator is mixed with the components constituting the microcapsule and dissolved as an oil-phase, a water-phase is added to and mixed with the oil-phase so as to emulsify the obtained mixture, and therefore the thermal curing accelerator can be incorporated into the core of the microcapsule.

The thermal curing accelerator may be used alone, or two or more kinds thereof may be used in combination.

The content of the thermal curing accelerator is preferably 0.1% by mass to 25% by mass, more preferably 0.5% by mass to 20% by mass, and even more preferably 1% by mass to 15% by mass, with respect to the total solid content of the microcapsule.

~Physical Properties of Microcapsule~

A volume average particle diameter of the microcapsule is preferably 0.01 μm to 5 μm, more preferably 0.05 μm to 5 μm, even more preferably 0.5 μm to 5 μm, and particularly preferably 0.5 μm to 1 μm from the viewpoint of the dispersibility of the microcapsule in a case where the aqueous dispersion is adopted.

The volume average particle diameter of the microcapsule can be measured by a light scattering method. In the present specification, as the volume average particle diameter, a value measured using a wet-type particle size distribution measurement apparatus, LA-960 (manufactured by HORIBA, Ltd.) is used.

In addition, in the microcapsule, the number of particles having a particle diameter of 0.5 μm to 5 μm in the aqueous dispersion liquid is preferably 10,000 or less per unit volume, and more preferably 5,000 or less, from the viewpoints of a planar shape in a case of adopting the microcapsule in the aqueous dispersion, and jetting properties in a case of using an ink jet method.

The number of particles having a particle diameter of 0.5 µm to 5 µm in the aqueous dispersion liquid per unit volume can be measured with a flow particle image analyzer FPIA-3000.

—Usage of Microcapsule—

The usage of the microcapsule is not particularly limited, and for example, ink (particularly, ink jet ink), a coating agent (functional coating agent), an adhesive, a paint, and the like can be used.

<Aqueous Dispersion>

The aqueous dispersion contains the above-described microcapsule of the present disclosure and water. The aqueous dispersion may further contain a colorant.

The aqueous dispersion containing the microcapsule makes the formation of the film possible, thereby obtaining the film in which coarse particles are less and weather fastness is excellent.

The usage of the aqueous dispersion is not particularly limited, and for example, ink (particularly, ink jet ink), a coating agent (functional coating agent), an adhesive, a paint, and the like can be used.

The aqueous dispersion is preferably used as an ink and is more preferably used as an ink jet ink.

[Microcapsule]

As the microcapsule, the above-described microcapsule of the present disclosure is used.

In the microcapsule, at least one of the shell or the core has the polymerizable group, it is possible that the microcapsules adjacent to each other are bonded to each other, and therefore a film can be formed.

In the microcapsule, the shell has the three-dimensional cross-linked structure containing the hydrophilic group and Structure (1). With the three-dimensional cross-linked structure containing the hydrophilic group, the dispersibility of the microcapsule in water becomes excellent, and the planar shape and the jetting properties become excellent in a case of the form of the ink jet ink. With the three-dimensional cross-linked structure containing Structure (1), the microcapsule becoming coarse particles is suppressed, thereby obtaining the film having excellent weather fastness.

The solid content of the microcapsule is preferably contained by 1% by mass to 50% by mass, more preferably contained by 3% by mass to 40% by mass, and even more preferably contained by 5% by mass to 30% by mass with respect to the total mass of the aqueous dispersion, from the viewpoints of dispersibility and ease of film formation.

A content of the microcapsules is also a value including solid components such as a polymerizable compound, a photopolymerization initiator, a sensitizer, a photothermal conversion agent, and a thermal curing accelerator, which can be contained in the core of the microcapsule.

The total solid content of the microcapsule is preferably 50% by mass or more, more preferably 60% by mass or more, even more preferably 70% by mass or more, still more preferably 80% by mass or more, and particularly preferably 85% by mass or more, with respect to the total solid content of the aqueous dispersion. An upper value of the total solid content of the microcapsule may be, with respect to the total solid content of the aqueous dispersion, 100% by mass, and preferably 99% by mass or less and more preferably 95% by mass or less in a case where the aqueous dispersion contains solid components other than the microcapsule.

The term "total solid content" of the aqueous dispersion refers to a total amount from which a dispersion medium in the aqueous dispersion (water and the like) is excluded.

—Internal Content Rate—

The internal content rate (% by mass) of the polymerizable compound means the amount of the polymerizable compound contained in the core of the microcapsule (that is, the polymerizable compound contained in the interior of the microcapsule) with respect to the total amount of the polymerizable compounds in the aqueous dispersion in a case where the aqueous dispersion is prepared, and refers to a value obtained as below. Hereinafter, the polymerizable compound will be described with reference to an example.

—Method for Measuring Internal Content Rate (% by mass) of Polymerizable Compound—

The operation described below is performed under the condition of a liquid temperature of 25° C.

In a case where the aqueous dispersion does not contain a colorant, the operation described below is performed using the aqueous dispersion as it is. In a case where the aqueous dispersion contains the colorant, first, the colorant is removed from the aqueous dispersion by centrifugation, and then the operation described below is performed on the aqueous dispersion from which the pigment has been removed.

First, an aqueous dispersion which is a measurement target of the internal content rate (% by mass) of the polymerizable compound is prepared, and from the aqueous dispersion, two samples (hereinafter, referred to as "sample 1" and "sample 2") of the same mass are collected.

Tetrahydrofuran (THF) having a mass 100 times the mass of the total solid content in the sample 1 is added to and mixed with the sample 1, thereby preparing a diluted solution. The obtained diluted solution is subjected to centrifugation under the conditions of 80,000 rpm and 40 minutes. The supernatant (hereinafter, referred to as "supernatant 1") generated by the centrifugation is collected. It is considered that by this operation, all of the polymerizable compound contained in the sample 1 is extracted into the supernatant 1. The mass of the polymerizable compound contained in the collected supernatant 1 is measured by liquid chromatography (for example, a liquid chromatography device manufactured by Waters Corporation). The obtained mass of the polymerizable compound is taken as "total amount of polymerizable compound".

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the polymerizable compound that was not contained in the interior of the microcapsule in the sample 2 (that is, the free polymerizable compound) is extracted into the supernatant 2. The mass of the polymerizable compound contained in the collected supernatant 2 is measured by liquid chromatography (for example, a liquid chromatography device manufactured by Waters Corporation). The obtained mass of the polymerizable compound is taken as "amount of the free polymerizable compound".

Based on the "total amount of polymerizable compound" and the "amount of free polymerizable compound" described above, the internal content rate (% by mass) of the polymerizable compound is calculated according to the equation shown below.

Internal content rate (% by mass) of polymerizable compound=((total amount of polymerizable compound−amount of free polymerizable compound)/total amount of polymerizable compound)×100

In a case where the aqueous dispersion contains two or more polymerizable compounds, internal content rates of all of the two or more polymerizable compounds may be obtained with a total amount of these two or more polymerizable compounds taken as "total amount of polymerizable compound" and a total free amount of the two or more polymerizable compounds taken as "amount of free polymerizable compound", and an internal content rate of any one of the polymerizable compound may be obtained with an amount of any one of the polymerizable compound taken as "total amount of polymerizable compound" and a free amount of any one of the polymerizable compound taken as "amount of free polymerizable compound".

Whether or not the components other than the polymerizable compound are contained in the interior of the microcapsule can be checked by the same method as the method for investigating whether or not the polymerizable compound is contained in the interior of the gel particles.

Here, for a compound having a molecular weight equal to or greater than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

An internal content rate (% by mass) of the photopolymerization initiator can be measured by the method same as that of the internal content rate of the polymerizable compound.

The internal content rate of the photopolymerization initiator in the aqueous dispersion is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass, from the viewpoint of curing sensitivity of the film.

In a case where the aqueous dispersion contains two or more kinds of photopolymerization initiators, it is preferable that the internal content rate of at least one kind of photopolymerization initiator is within the above-described range.

An internal content rate (% by mass) of the photothermal conversion agent can be measured by the method same as that of the internal content rate of the polymerizable compound.

An internal content rate (% by mass) of the thermal curing accelerator can be measured by the method same as that of the internal content rate of the polymerizable compound.

[Water]

The aqueous dispersion contains water.

An amount of water is not particularly limited. Among these, a content of water is preferably 10% by mass to 99% by mass, more preferably 20% by mass to 95% by mass, even more preferably 30% by mass to 90% by mass, and still more preferably 50% by mass to 90% by mass.

[Colorant]

The aqueous dispersion may contain at least one kind of colorant.

In a case where the aqueous dispersion contains a colorant, it is preferable that the aqueous dispersion contains the colorant in the exterior of the microcapsule.

The colorant is not particularly limited and can be used by being arbitrarily selected from known coloring materials such as a pigment, a water-soluble dye, and a dispersed dye. It is more preferable that the aqueous dispersion contains a pigment among the above colorants, because the pigment has high weather fastness and excellent color reproducibility.

The pigment is not particularly limited and can be appropriately selected according to the purpose. Examples thereof include known organic pigments and inorganic pigments, resin particles stained with a dye, commercially available pigment dispersions, and surface-treated pigments (for example, those obtained by dispersing a pigment in water, a liquid compound, an insoluble resin, or the like as a dispersion medium and pigments of which the surface is treated with a resin, a pigment derivative, or the like).

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In a case where a pigment is used as a colorant, if necessary, a pigment dispersant may be used at the time of preparing the pigment particles.

In addition, examples of the pigment include commercially available pigment dispersions, and surface-treated pigments (those obtained by treating pigment surfaces with a dispersant such as a resin, a pigment derivative, and the like, and a self-dispersing pigment having a hydrophilic group on a particle surface, and the like). Furthermore, as the pigment, pigment dispersions on the market may be used.

Among these, as the pigment, a pigment of which a pigment surface is treated with a resin having a hydrophilic group, and a self-dispersing pigment having a hydrophilic group on a particle surface are preferably used. As the hydrophilic group, an anionic group (a carboxy group, a phosphoric acid group, a sulfo group, and the like) is preferable.

In the present specification, the term "self-dispersing pigment" refers to a pigment and the like which is obtained by, to a pigment surface, directly linking or indirectly bonding a plurality of hydrophilic functional groups and/or a salt thereof (hereinafter will also be referred to as "dispersibility imparting group") via an alkyl group, an alkyl ether group, an aryl group, and the like, and which exhibits at least one of water dispersibility or water solubility under absence of a dispersant for dispersing the pigment and the like so as to be able to maintain a dispersion state in the aqueous dispersion (for example, an ink).

For example, generally, an ink containing the self-dispersing pigment as a colorant does not necessarily contain a dispersant that is to be contained to disperse the pigment, and therefore is advantageous in that foaming caused by deterioration of an anti-foaming property due to the dispersant occurs less, leading to easy preparation of an ink having excellent jetting stability.

Examples of the dispersibility imparting group bonded to the surface of the self-dispersing pigment include —COOH, —CO, —OH, —SO$_3$H, —PO$_3$H$_2$, and quaternary ammonium, and salts thereof. In regard to the bonding of the dispersibility imparting group, the pigment subjected to a physical treatment or a chemical treatment so as to bond (graft) an active species having the dispersibility imparting group or the dispersibility imparting group to the pigment surface. Examples of the physical treatment include a vacuum plasma treatment and the like. Examples of the chemical treatment include a wet oxidation method in which the pigment surface is oxidized with an oxidizing agent in water, a method in which a carboxy group is bonded via a phenyl group by bonding p-aminobenzoic acid to the pigment surface, and the like.

Preferable examples of the self-dispersing pigment include a self-dispersing pigment which is surface-treated by oxidation treatment using a hypohalous acid and/or a salt of a hypohalous acid as an oxidizing agent or oxidation treatment using ozone as an oxidizing agent.

As the self-dispersing pigment, a commercially available product may be used.

Examples of the commercially available product of the self-dispersing pigment include MICROJET CW-1 (trade name; Orient Chemical Industries Co., Ltd.), CAB-O-JET (registered trademark) 200, CAB-O-JET (registered trademark) 300, and CAB-O-JET (registered trademark) 450C (trade name; Cabot Corporation), and the like.

In a case where a pigment is used as a colorant, if necessary, a pigment dispersant may be used at the time of preparing the pigment particles.

Regarding the coloring material such as a pigment and the pigment dispersant, paragraphs "0180" to "0200" in JP2014-040529A can be referred to as appropriate.

A content of the colorant in the aqueous dispersion can be appropriately selected and is preferably 0.1% by mass to 30% by mass and more preferably 0.5% by mass to 20% by mass with respect to the total mass of the aqueous dispersion.

[Surfactant]

The aqueous dispersion may contain at least one surfactant. The surfactant used in the aqueous dispersion is distinguished from a surfactant used in a case of manufacturing the microcapsule.

In a case where the aqueous dispersion of the present disclosure contains the surfactant, wettability of the aqueous dispersion to a recording medium is improved.

Examples of the surfactant include a nonionic surfactant, a cationic surfactant, an anionic surfactant, and the like, all of which may be used as the surfactant. From the viewpoint of suppressing water-dispersible foam, a content of anionic surfactant is preferably 1% by mass or less with respect to the total mass of the aqueous dispersion.

In addition, in a case where the aqueous dispersion contains the colorant, the content of anionic surfactant is preferably 1% by mass or less with respect to a total mass of the aqueous dispersion. In the above case, a case where the content of anionic surfactant is 1% by mass or less is particularly advantageous in that in a case where an aqueous dispersion liquid is combined with a pigment dispersion having an anionic dispersing group, it is possible to suppress a phenomenon in which an ion concentration in a system increases due to the anionic surfactant, leading to a decrease in a degree of ionization in the anionic pigment dispersant and thus a decrease in the dispersibility of the pigment. From the same viewpoint thereof, the content of anionic surfactant is preferably 0.5% by mass or less, more preferably 0.1% by mass or less, and even more preferably 0% by mass (not containing anionic surfactant).

Examples of the surfactant include a higher fatty acid salt, alkyl sulfate, alkyl ester sulfate, alkyl sulfonate, alkylbenzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, amine oxide, and the like.

From the viewpoint of the dispersibility of the microcapsule, the surfactant is preferably alkyl sulfate having an alkyl chain length of 8 to 18, more preferably at least one kind of surfactant selected from sodium dodecyl sulfate (SDS, alkyl chain length: 12) and sodium cetyl sulfate (SCS, alkyl chain length: 16), and even more preferably sodium cetyl sulfate (SCS).

Examples of surfactants other than the above-described surfactant include those described in JP1987-173463A (JP-S62-173463A) and JP1987-183457A (JP-S62-183457A). Examples of other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

In addition, examples of the surfactant include an organic fluoro compound.

The organic fluoro compound is preferably hydrophobic. Examples of the organic fluoro compound include a fluorine-based surfactant, an oil-like fluorine-based compound (for example, fluorine oil), a solid-like fluorine compound resin (for example tetrafluoroethylene resin), and those described in JP1982-9053B (JP-S57-9053B) (the eighth column to the seventeenth column) and JP1987-135826A (JP-S62-135826A).

[Other Components]

If necessary, the aqueous dispersion may contain other components in addition to the components described above. Hereinafter, the other components will be described below.

(Polymerization Inhibitor)

In the aqueous dispersion, from the viewpoint of increasing storage stability, a polymerization inhibitor may be added.

Examples of the polymerization inhibitor include p-methoxyphenol, quinones such as hydroquinone and methoxybenzoquinone, phenothiazine, catechols, alkyl phenols, alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, and the like, and p-methoxyphenol, catechols, and quinones are preferable, and hydroquinone, benzoquinone, p-methoxyphenol, TEMPO, TEMPOL, cupferron A1, tris(N-nitroso-N-phenylhydroxylamine)aluminum salt, and the like are particularly preferable.

(Ultraviolet Absorber)

An ultraviolet absorber may be used in the aqueous dispersion from the viewpoints of improving weather fastness of the obtained image and preventing fading.

Examples of the ultraviolet absorber include known ultraviolet absorbers such as a benzotriazole-based compound, a benzophenone-based compound, a triazine-based compound, a benzoxazole-based compound, and the like.

(Organic Solvent)

The organic solvents may be added to the aqueous dispersion in order to improve adhesiveness to a recording medium.

Alcohols (for example, methanol, ethanol, propanol, isopropanol, butanol, isobutanol, sec-butanol, tert-butanol, pentanol, hexanol, cyclohexanol, benzyl alcohol, and the like)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, 2-methylpropanediol, and the like)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, and the like)

Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, and the like)

Amides (for example, formamide, N,N-dimethylformamide, N,N-dimethylacetamide, and the like)

Heterocyclic rings (for example, 2-pyrrolidone, N-methyl-2-pyrrolidone, cyclohexyl pyrrolidone, 2-oxazolidone, 1,3-dimethyl-2-imidazolidinone, y-butyrolactone, and the like)

Sulfoxides (for example, dimethyl sulfoxide, and the like)

Sulfones (for example, sulfolane, and the like)

Others (urea, acetonitrile, acetone, and the like)

It is preferable that 0.1% by mass to 5% by mass of the organic solvent is added with respect to the whole aqueous dispersion.

(Photopolymerization Initiator Capable of being Contained in the Exterior of Microcapsule)

The aqueous dispersion may contain the photopolymerization initiator in the exterior of the microcapsule.

The aqueous dispersion containing the photopolymerization initiator in the exterior of the microcapsule makes effective improvement of a polymerization reaction between the microcapsules possible, and therefore the film having further strong film hardness can be formed. Furthermore, crosslinking proceeds with high efficiency even with respect to active energy rays (light) having low exposure illuminance (for example, 40 mJ/cm$^2$ to 70 mJ/cm$^2$).

Examples of the photopolymerization initiator capable of being contained in the exterior of the microcapsule include the same photopolymerization initiator as above-described photopolymerization initiator contained in the interior of the microcapsule.

As the photopolymerization initiator capable of being contained in the exterior of the microcapsule, a water-soluble or water-dispersible photopolymerization initiator is preferable. From this viewpoint, examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, and IRGACURE (registered trademark) 500 (all of which are manufactured by BASF SE), the acylphosphine oxide compound described in WO2014/095724A, the photopolymerization initiator described in WO86/05778A, and the like.

The term "water-soluble" refers to a property in which in a case where the resin is dried for 2 hours at 105° C., the amount of the resin dissolving in 100 g of distilled water having a temperature of 25° C. exceeds 1 g.

Furthermore, the term "water-dispersible" refers to a property in which the resin is water-insoluble but is dispersed in water. The term "water-insoluble" herein refers to a property in which in a case where the resin is dried for 2 hours at 105° C., the amount of the resin dissolving in 100 g of distilled water having a temperature of 25° C. is equal to or smaller than 1 g.

(Polymerizable Compound Capable of being Contained in the Exterior of Microcapsule)

The aqueous dispersion may contain the polymerizable compound in the exterior of the microcapsule.

The aqueous dispersion containing the polymerizable compound in the exterior of the microcapsule makes effective improvement of a polymerization reaction between the microcapsules possible, and therefore the film having further strong film hardness can be formed. Furthermore, crosslinking proceeds with high efficiency even with respect to active energy rays (light) having low exposure illuminance (for example, 40 mJ/cm$^2$ to 70 mJ/cm$^2$).

In a case where the aqueous dispersion contains the polymerizable compound in the exterior of the microcapsule, it is preferable that the above-described photopolymerization initiator is further contained in the exterior of the microcapsule, and therefore the film having further strong film hardness can be formed.

Examples of the polymerizable compound capable of being contained in the exterior of the microcapsule include radically polymerizable compounds such as a compound having an ethylenically unsaturated group, acrylonitrile, styrene, unsaturated polyester, unsaturated polyether, unsaturated polyamide, and unsaturated urethane.

Among these, as the polymerizable compound capable of being contained in the exterior of the microcapsule, a compound having an ethylenically unsaturated group is preferable, and a compound having a (meth)acryloyl group is particularly preferable. Furthermore, as the polymerizable compound capable of being contained in the exterior of the microcapsule, a water-soluble or a water-dispersible polymerizable compound is preferable.

Examples of the polymerizable compound capable of being contained in the exterior of the microcapsule include radically polymerizable compounds such as a compound having an ethylenically unsaturated group, acrylonitrile, styrene, unsaturated polyester, unsaturated polyether, unsaturated polyamide, and unsaturated urethane.

Among these, as the polymerizable compound capable of being contained in the exterior of the microcapsule, a compound having an ethylenically unsaturated group is preferable, and a compound having a (meth)acryloyl group is particularly preferable.

Furthermore, as the polymerizable compound capable of being contained in the exterior of the microcapsule, a water-soluble or a water-dispersible polymerizable compound is preferable.

The term "water-soluble" used for the polymerizable compound capable of being contained in the exterior of the microcapsule has the same meaning as the term "water-soluble" used for the "photopolymerization initiator capable of being contained in the exterior of the microcapsule" described above, and the term "water-dispersible" used for the polymerizable compound capable of being contained in the exterior of the microcapsule has the same meaning as the term "water-dispersible" used for the "photopolymerization initiator capable of being contained in the exterior of the microcapsule" described above.

From the viewpoint of the water solubility or the water dispersibility, as the aforementioned polymerizable compound, a compound having at least one kind of structure selected from an amide structure, a polyethylene glycol structure, a polypropylene glycol structure, a carboxy group, and a salt of a carboxy group is preferable.

From the viewpoint of the water solubility or the water dispersibility, as the polymerizable compound capable of being contained in the exterior of the microcapsule, for example, at least one kind of compound selected from (meth)acrylic acid, sodium (meth)acrylate, potassium (meth)acrylate, N,N-dimethylacrylamide, N,N-diethylacrylamide, morpholine acrylamide, N-2-hydroxyethyl (meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, polypropylene glycol di(meth)acrylate, compounds represented by General Formulas (a) to (d), and ethoxylated trimethylolpropane triacrylate (for example, SR9035 manufactured by Sartomer Arkema Inc.) is preferable, and at least one kind of compound selected from (meth)acrylic acid, N,N-dimethylacrylamide, N-2-hydroxyethyl (meth)acrylamide, 2-hydroxyethyl (meth)acrylate, glycerin monomethacrylate, N-[tris(3-acryloylaminopropyloxymethylene)methyl]acrylamide, diethylene glycol bis(3-acryloylaminopropyl)ether, polyethylene glycol di(meth)acrylate, polypropylene glycol di(meth)acrylate, compounds represented by General Formulas (a) to (d), and ethoxylated trimethylolpropane triacrylate (for example, SR9035 manufactured by Sartomer Arkema Inc.) is more preferable.

General Formula (a)

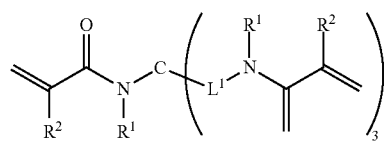

General Formula (b)

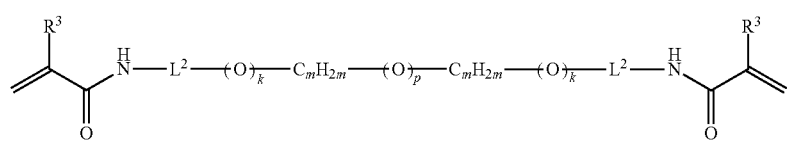

General Formula (C)

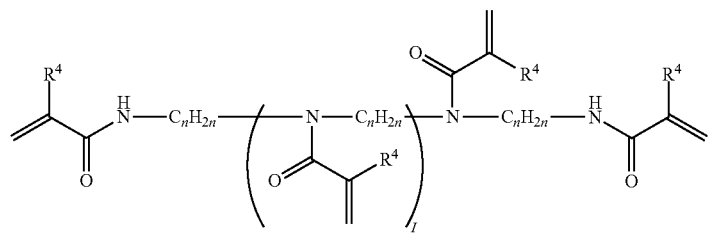

General Formula (d)

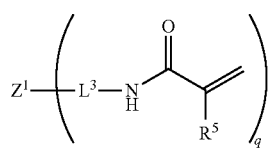

In General Formula (a), a plurality of $R^1$'s each independently represent a hydrogen atom, an alkyl group, an aryl group or a heterocyclic group, a plurality of $R^2$'s each independently represent a hydrogen atom or a methyl group, and a plurality of $L^1$'s each independently represent a single bond or a divalent linking group.

In General Formula (b), a plurality of $R^3$'s each independently represent a hydrogen atom or a methyl group, a plurality of $L^2$'s each independently represent an alkylene group having 1 to 8 carbon atoms, a plurality of k's and p each independently represent 0 or 1, and a plurality of m's each independently represent an integer of 0 to 8, provided that at least one of k's or p is 1.

In General Formula (c), a plurality of $R^4$'s each independently represent a hydrogen atom or a methyl group, a plurality of n's each independently represent an integer of 1 to 8, l represents an integer of 0 or 1.

In General Formula (d), $Z^1$ represents a residue obtained by removing q hydrogen atoms from the hydroxyl group of the polyol, q represents an integer of 3 to 6, a plurality of $R^5$'s each independently represent a hydrogen atom or a methyl group, and a plurality of $L^3$'s each independently represent an alkylene group having 1 to 8 carbon atoms.

Specific examples of the compounds represented by General Formula (a) to General Formula (d) include compounds represented by the following AM-1 to AM-4.

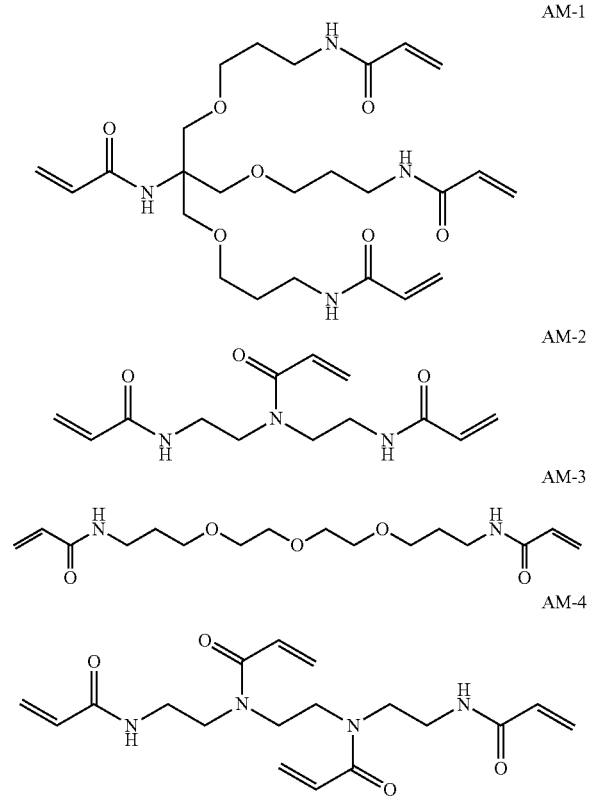

The above AM-1 to AM-4 can be synthesized by a method described in JP5591858B.

(Water-Soluble Resin or Water-Dispersible Resin Capable of being Contained in the Exterior of Microcapsule)

A structure of the water-soluble resin or the water-dispersible resin capable of being contained in the exterior of the microcapsule is not particularly limited and may be an arbitrary structure. Examples of the structure of the water-soluble resin or the water-dispersible resin capable of being contained in the exterior of the microcapsule include structures such as a chain structure, a branched structure, a star structure, a cross-linked structure, and a network structure.

The term "water-soluble" used for the water-soluble resin capable of being contained in the exterior of the microcapsule has the same meaning as the term "water-soluble" used for the "photopolymerization initiator capable of being contained in the exterior of the microcapsule" described above, and the term "water-dispersible" used for the water-dispersible resin capable of being contained in the exterior of the microcapsule has the same meaning as the term "water-dispersible" used for the "photopolymerization initiator capable of being contained in the exterior of the microcapsule" described above.

In addition, the water-soluble resin or the water-dispersible resin is preferably a resin having a functional group selected from a carboxy group, a salt of a carboxy group, a sulfo group, a salt of a sulfo group, a sulfate group, a salt of a sulfate group, a phosphonic acid group, a salt of a phosphonic acid group, a phosphoric acid group, a salt of a phosphoric acid group, an ammonium base, a hydroxyl group, a carboxylic acid amide group, and an alkyleneoxy group.

As a countercation of the aforementioned salt, an alkali metal cation such as sodium or potassium, an alkali earth metal cation such as calcium or magnesium, an ammonium cation, or a phosphonium cation is preferable, and an alkali metal cation is particularly preferable.

As an alkyl group contained in the ammonium group of the ammonium base, a methyl group or an ethyl group is preferable.

As a counteranion of the ammonium base, a halogen anion such as chlorine or bromine, a sulfate anion, a nitrate anion, a phosphate anion, a sulfonate anion, a carboxylate anion, or a carbonate anion is preferable, and a halogen anion, a sulfonate anion, or a carboxylate anion is particularly preferable.

As a substituent on a nitrogen atom of the carboxylic acid amide group, an alkyl group having 8 or less carbon atoms is preferable, and an alkyl group having 6 or less carbon atoms is particularly preferable.

The resin having an alkyleneoxy group preferably has an alkyleneoxy chain formed of repeating alkyleneoxy groups. The number of alkyleneoxy groups contained in the alkyleneoxy chain is preferably 2 or greater, and particularly preferably 4 or greater.

—Preferable Physical Properties of Aqueous Dispersion—

In a case where the temperature of the aqueous dispersion is set at a range of 25° C. to 50° C., the viscosity of the aqueous dispersion is preferably 3 mPa·s to 15 mPa·s, and more preferably 3 mPa·s to 13 mPa·s. Particularly, as the aqueous dispersion, it is preferable that the viscosity of the aqueous dispersion at 25° C. is 50 mPa·s or less. In a case where the viscosity of the aqueous dispersion is within the above range, in a case of adopting the aqueous dispersion for ink jet recording, a high level of jetting stability can be realized.

As the viscosity of the aqueous dispersion, a value measured using a viscometer (VISCOMETER TV-22, manufactured by TOKI SANGYO CO., LTD) is used.

<Method for Manufacturing Aqueous Dispersion>

The method for manufacturing an aqueous dispersion of the present disclosure is not particularly limited, as long as the above-described aqueous dispersion can be manufactured.

As the method for manufacturing an aqueous dispersion of the present disclosure, from the viewpoint of easily obtaining the above-described aqueous dispersion, a method for manufacturing an aqueous dispersion of the present embodiment which will be described below is preferable.

A method for manufacturing the aqueous dispersion of the present embodiment (hereinafter, will also be referred to as "the manufacturing method of the present embodiment) includes a preparation step of mixing an oil-phase component that contains a compound represented by General Formula (A), at least one compound of an isocyanate compound having a polymerizable group or a polymerizable compound, and an organic solvent, with a water-phase component that contains water and a compound having a hydrophilic group, and emulsifying and dispersing the mixture so as to prepare an aqueous dispersion.

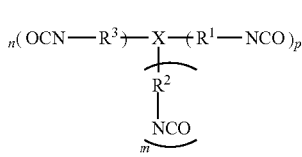

Formula (A)

In General Formula (A), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from the organic group represented by X, in General Formula (A), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in General Formula (A), each of p, m, and n is equal to or greater than 0, and p+m+n equals 3 or greater.

All of the polymerizable group in the isocyanate compound into which the polymerizable group is introduced, and the polymerizable group in the polymerizable compound may be the photopolymerizable groups (for example, radically polymerizable groups), or may be the thermally polymerizable groups.

The oil-phase component preferably contains at least one of the isocyanate compound into which the photopolymerizable group (for example, the radically polymerizable group) is introduced, or the photopolymerizable compound (for example, the radically polymerizable compound), or contains at least one of the isocyanate compound into which the thermally polymerizable group is introduced, or the thermally polymerizable compound.

In the case where the oil-phase component preferably contains at least one of the isocyanate compound into which the photopolymerizable group (for example, the radically polymerizable group) is introduced, or the photopolymerizable compound (for example, the radically polymerizable compound), the oil-phase component preferably further contains the photopolymerization initiator.

[Preparation Step]

The preparation step is a step of mixing the oil-phase component that contains the compound represented by General Formula (A), at least one compound of the tri- or higher functional isocyanate compound having the polymerizable group or the polymerizable compound, and the organic solvent, with the water-phase component that contains water and the compound having the hydrophilic group, and emulsifying and dispersing the mixture so as to prepare an aqueous dispersion.

As described above, the oil-phase component and the water-phase component are mixed so as to be emulsified and dispersed, and therefore the above-described microcapsule of the present disclosure can be formed.

The oil-phase component used in the preparation step contains the compound represented by General Formula (A), at least one compound of the tri- or higher functional isocyanate compound having the polymerizable group or the polymerizable compound, and the organic solvent.

The water-phase component used in the preparation step contains water and the compound having the hydrophilic group.

In the preparation step, the oil-phase component and the water-phase component are mixed and the obtained mixture emulsified, thereby forming the microcapsule including the shell that has the three-dimensional cross-linked structure containing the hydrophilic group and Structure (1) and including the core that is in the interior of the shell, in which at least one of the shell or the core has the polymerizable group. The formed microcapsule is a dispersoid in the manufactured aqueous dispersion.

Meanwhile, water in the water-phase component is a dispersion medium in produced the aqueous dispersion.

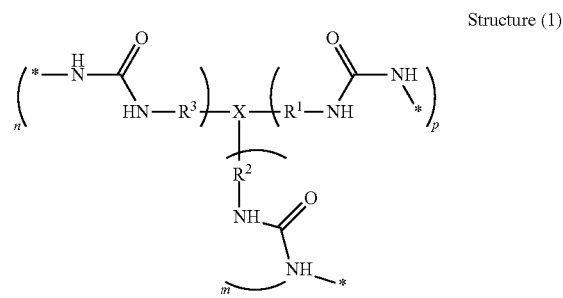

Structure (1)

In structure (1), X, $R^1$, $R^2$, $R^3$, *, p, m, and n are as described above.

In more details regarding the formation of the shell, the compound represented by General Formula (A) is allowed to react with water so that the three-dimensional cross-linked structure containing a urea bond is formed, thereby obtaining the three-dimensional cross-linked structure containing Structure (1). A case in which the compound represented by General Formula (A), the compound having the polymerizable group, or the compound having the hydrophilic group has a urethane bond means that a urethane bond is also contained in the three-dimensional cross-linked structure of the shell.

In addition, a neutralizer is added to water phase, and a hydrophilic group of the compound having the hydrophilic group may be neutralized by the neutralizer. The compound having the hydrophilic group also relates to the reaction for forming the shell, and therefore a case in which the hydrophilic group is neutralized means that the neutralized hydrophilic group (for example, a salt of an acid group in a case where the hydrophilic group is the acid group) is introduced into the three-dimensional cross-linked structure of the shell. A salt of the neutralized hydrophilic group is excellent for the effect of dispersing the microcapsule in water. A degree of neutralization of the hydrophilic group can be adjusted according to an amount of neutralizer, and the like.

Examples of the neutralizer include sodium hydroxide, potassium hydroxide, triethanolamine, and the like.

In a case where the oil-phase component contains the isocyanate compound having the polymerizable group, the isocyanate compound having the polymerizable group also relates to the reaction for forming the shell, and therefore the polymerizable group is introduced into the shell (that is, the shell having the polymerizable group is formed).

The case where the oil-phase component contains the polymerizable compound, means that the polymerizable compound is contained in the core.

Examples of the organic solvent contained in the oil-phase component include ethyl acetate, methyl ethyl ketone, and the like.

It is preferable that at least some of the organic solvent is removed during the formation process of the microcapsule or after the formation of the microcapsule.

The detailed description of the compound represented by General Formula (A), which is contained in the oil-phase component is as described above.

The detailed description of the isocyanate compound having the polymerizable group, which is contained in the oil-phase component, and the polymerizable compound is as described above.

If necessary, the oil-phase component may contain other components in addition to the aforementioned components.

Examples of the other components include the above-described photopolymerization initiator, the above-described sensitizer, the above-described photothermal conversion agent, the above-described thermal curing accelerator, and the like.

The photopolymerization initiator, the sensitizer, the photothermal conversion agent, or the thermal curing accelerator can be contained in the core of the microcapsule by being incorporated into the oil-phase component.

The detailed description of the compound having the hydrophilic group, which is contained in the water-phase component is as described above.

If necessary, the water-phase component may contain other components in addition to the aforementioned components.

Examples of the other components include the surfactants described above.

In the manufacture method of the present embodiment, a total amount (hereinafter will also be referred to as "total solid content") obtained by subtracting an amount of the organic solvent and the water from an amount of the oil-phase component and the water-phase component, corresponds to a total solid content of the microcapsule manufactured.

The amount of the compound represented by General Formula (A) in the oil-phase component is not particularly limited, and for example, is preferably 10% by mass to 100% by mass, more preferably 30% by mass to 100% by mass, and even more preferably 60% by mass to 100% by mass with respect to the above total solid content.

In a case where the oil-phase component contains a photopolymerization initiator, the amount of the photopolymerization initiator in the oil-phase component is not particularly limited and is preferably 0.1% by mass to 25% by mass with respect to the amount of the total solid content, for example.

In a case where the oil-phase component contains an isocyanate compound having the polymerizable group, the amount of the polymerizable compound in the oil-phase component is not particularly limited and is preferably 0.1% by mass to 75% by mass with respect to the amount of the total solid content, for example.

In a case where the oil-phase component contains a polymerizable compound, the amount of the polymerizable compound in the oil-phase component is not particularly limited and is preferably 0.1% by mass to 75% by mass with respect to the amount of the total solid content, for example.

The amount of the organic solvent is not particularly limited and is appropriately set according to the type and amount of the components contained in the oil-phase component and the like.

The amount of the compound having the hydrophilic group in the water-phase component is not particularly limited and is preferably 0.01% by mass to 10% by mass with respect to the above total solid content, for example.

An amount of the neutralizer in the water-phase component is not particularly limited as long as the degree of neutralization of the hydrophilic group can be set to a desired value and is appropriately set according to the types of the compound having the hydrophilic group, which is contained in the water-phase component, an amount, and the like.

The amount of water is not particularly limited and is appropriately selected according to the type and amount of the components contained in the oil-phase component and the like.

The components contained in the oil-phase component need to be simply mixed together. All of the components may be mixed together at the same time, or the components may be mixed together by being divided into several groups.

A case of each component contained in the water-phase component is similar to the case of the oil-phase component, and as long as each component is mixed, all components may be mixed at once, or each component may be divided so as to be mixed separately.

The method for mixing the oil-phase component with the water-phase component is not particularly limited, and examples thereof include mixing by stirring.

A method for emulsifying the mixture obtained by mixing is not particularly limited and examples thereof include emulsification by an emulsification device (for example, a disperser and the like) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

The emulsification during the preparation step may be carried out while heating.

By carrying out the emulsification while heating, the reaction for forming the microcapsule by the emulsification can further effectively proceed. In addition, by carrying out the emulsification while heating, at least some of the organic solvent contained as the oil-phase component can be easily removed from the mixture.

The heating temperature in the case of carrying out the emulsification while heating (that is, reaction temperature) is preferably 35° C. to 70° C. and more preferably 40° C. to 60° C.

In addition, the preparation step may have an emulsification stage of emulsifying a mixture (at a temperature of lower than 35° C., for example), and a heating stage of heating the emulsion obtained in the emulsification stage (at a temperature of 35° C. or higher, for example).

According to the aspect in which the preparation step has the emulsification stage and the heating stage, the shell having firmer three-dimensional cross-linked structure is formed, and therefore it is possible to manufacture the aqueous dispersion by which a film having excellent hardness can be formed.

In the aspect in which the preparation step has the emulsification stage and the heating stage, preferable ranges of a heating temperature and a heating time in the heating stage are respectively the same as preferable ranges of a heating temperature and a heating time in a case of carrying out the emulsification while heating.

In addition to the above-described manufacturing method of the present embodiment (hereinafter, will also be referred to as "the manufacturing method of the first embodiment"), the aqueous dispersion can be manufactured by methods (1) to (3), for example.

Examples thereof include (1) A manufacturing method including a preparation step of mixing the oil-phase component that contains the compound represented by General Formula (A), at least one compound of the isocyanate compound having the polymerizable group or the polymerizable compound, the compound having the hydrophilic group, the neutralizer, and the organic solvent, with the water-phase component that contains water, and emulsifying and dispersing the mixture so as to prepare an aqueous dispersion (hereinafter, will also be referred to as "the manufacturing method of the second embodiment"), (2) A manufacturing method including a preparation step of mixing the oil-phase component that contains the compound represented by General Formula (A), at least one compound of the isocyanate compound having the polymerizable group or the polymerizable compound, the compound having the hydrophilic group, and the organic solvent, with the water-phase component that contains water and the neutralizer, and emulsifying and dispersing the mixture so as to prepare an aqueous dispersion (hereinafter, will also be referred to as "the manufacturing method of the third embodiment"), and (3) A manufacturing method including a preparation step of mixing the oil-phase component that contains the compound represented by General Formula (A), at least one compound of the isocyanate compound having the polymerizable group or the polymerizable compound, the neutralizer, and the organic solvent, with the water-phase component that contains water and the compound having the hydrophilic group, and emulsifying and dispersing the mixture so as to prepare an aqueous dispersion (hereinafter, will also be referred to as "the manufacturing method of the fourth embodiment").

In any one of the manufacture methods of the second to fourth embodiments, in the preparation step, as same as the case of the manufacture method of the first embodiment, the oil-phase component and the water-phase component are mixed and the obtained mixture emulsified, thereby forming the microcapsule including the shell that has the three-dimensional cross-linked structure containing the hydrophilic group and Structure (1) and including the core that is in the interior of the shell, in which at least one of the shell or the core has the polymerizable group. The formed microcapsule is a dispersoid in the manufactured aqueous dispersion, and water in the water-phase component is a dispersion medium in the manufactured aqueous dispersion.

As the manufacture method of the aqueous dispersion of the present invention, from the viewpoint of effectively causing a neutralization reaction of the hydrophilic group of the compound having the hydrophilic group to proceed, it is preferable that the compound having the hydrophilic group and the neutralizer are contained in the same phase, and it is more preferable that both the compound having the hydrophilic group and the neutralizer are contained as the water-phase components.

In the manufacture methods of the second and third embodiments, the amount of the compound having the hydrophilic group in the oil-phase component is not particularly limited, and for example, is preferably 0.01% by mass to 10% by mass with respect to the above total solid content.

In the manufacture methods of the fourth embodiments, the amount of the compound having the hydrophilic group in the water-phase component is not particularly limited, and for example, is preferably 0.01% by mass to 10% by mass with respect to the above total solid content.

In the manufacture methods of the second and fourth embodiments, an amount of the neutralizer in the oil-phase component or the water-phase component is not particularly limited as long as the degree of neutralization of the hydrophilic group can be set to a desired value, and is appropriately set according to the types of the compound having the hydrophilic group, which is contained in the oil-phase component or the water-phase component, an amount, and the like. The same applies to an amount of the neutralizer in the water-phase component in the manufacture method of the third embodiment.

[Other Steps]

The manufacture method of the present embodiment may include steps other than the preparation step as necessary.

Examples of those other steps include a step of adding other components described above.

Those other components to be added are as described above as other components that can be contained in the aqueous dispersion.

<Image Forming Method>

An image forming method is not particularly limited as long as an image can be formed by using the above-described aqueous dispersion.

As an image forming method, an image forming method of the present embodiment which is to be described later is preferable from the viewpoint that an image in which a planar shape is favorable and weather fastness is excellent can be formed on a recording medium.

The image forming method of the present embodiment includes an application step of applying the above-described aqueous dispersion of the present invention onto the recording medium.

According to the image forming method of the present embodiment, an image formed on the recording medium has excellent weather fastness.

The image forming method of the present embodiment may include, for example, a curing step in addition to the application step.

[Application Step]

Hereinafter, an application step in the image forming method will be described.

The application step is not limited as long as the application step is a step of applying the aqueous dispersion onto the recording medium.

As an aspect in which the aqueous dispersion is applied onto the recording medium, an aspect in which the aqueous dispersion is applied onto the recording medium by an ink jet method is particularly preferable.

In the image forming method, an ink jet recording device used in a case of adopting the application step of the ink jet method is not particularly limited, and a known ink jet recording device by which an intended resolution is achieved can be arbitrary selected and used. That is, any of known ink jet recording devices including commercially available products can jet the aqueous dispersion onto a recording medium in the image forming method.

Examples of the ink jet recording device include a device including an ink supply system, a temperature sensor, and heating means.

The ink supply system includes, for example, a base tank containing the aqueous dispersion, supply piping, an ink supply tank disposed immediately before an ink jet head, a filter, and a piezo-type ink jet head. The piezo-type ink jet head can be driven such that it can jet multi-sized dots preferably having a size of 1 pl to 100 pl and more preferably having a size of 8 pl to 30 pl, preferably at a resolution of 320 dots per inch (dpi)×320 dpi to 4,000 dpi x 4,000 dots per inch (dpi), more preferably at a resolution of 400 dpi×400 dpi to 1,600 dpi x 1,600 dpi, and even more preferably at a resolution of 720 dpi×720 dpi. dpi represents the number of dots per 2.54 cm (1 inch).

In the application step, it is desirable that the jetted aqueous dispersion has a constant temperature, and therefore the ink jet recording device preferably includes a means for stabilizing a temperature of the aqueous dispersion. As parts required to have a constant temperature, piping from an ink tank (intermediate tank in a case where there is the intermediate tank) to an injection surface of a nozzle, and all members are the targets thereof. That is, heat insulation and warming can be performed on parts from an ink supplying tank to an ink jet head.

A method for controlling the temperature is not particularly limited, and for example, it is preferable that a plurality of temperature sensors are provided on each of piping parts so as to control heating according to a flow rate of the aqueous dispersion and environment temperature. The temperature sensor can be provided in the vicinity of the nozzle of the ink supplying tank and the ink jet head. In addition, it is preferable that a head unit to be heated is thermally shielded or insulated so that the main device is not affected by temperature from the outside air. In order to shorten a startup time of a printer which is required for heating or to reduce the loss of thermal energy, it is preferable to perform thermal insulation from other parts and to reduce the heat capacity of the entire heating unit.

The recording medium is not particularly limited, and a recording medium known as a support or a recording material can be used. Examples of the recording medium include paper, paper on which plastic (for example, polyethylene, polypropylene, polystyrene, and the like) is laminated, a metal plate (for example, aluminum, zinc, copper, and the like), a plastic film (for example, films of a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, and the like), a plastic film or paper on which the aforementioned metal is laminated or vapor-deposited, and the like.

Among these, a plastic substrate such as polyvinyl chloride, polyethylene terephthalate, and polyethylene is preferable, a polyvinyl chloride resin substrate is more preferable, and a polyvinyl chloride resin sheet or film is even more preferable, because the aqueous dispersion of the present embodiment of the present invention has excellent adhesiveness and thus can be suitably used with respect to a nonabsorbent recording medium as a recording medium.

As the recording medium, a substrate other than the plastic substrate may be used.

Examples of the substrate other than the plastic substrates include a textile substrate.

Examples of a material of the textile substrate include natural fibers such as cotton, silk, hemp, and wool; chemical fibers such as viscose rayon and reocell; synthetic fibers such as polyester, polyamide, and acryl; a mixture of at least two types selected from the group consisting of the natural fibers, the chemical fibers, and the synthetic fibers; and the like.

As the textile substrate, a textile substrate disclosed in paragraphs 0039 to 0042 of WO2015/158592A may be used.

[Curing Step]

Hereinafter, a curing step in the image forming method will be described.

The curing step is not limited as long as the curing step is a step of applying active energy rays (light) or heat to the aqueous dispersion applied onto the recording medium.

By applying active energy rays (light) or heat to the aqueous dispersion, the cross-linking reaction between the microcapsules in the aqueous dispersion proceeds, the image is fixed, and hence the film hardness of the image and the like can be improved.

As the curing step, a step of curing the aqueous dispersion by radiating active energy rays (light) thereto (hereinafter, "curing step A") is preferable in a case where the aqueous dispersion contains the photopolymerizable compound (and preferably the photopolymerization initiator), and a step of curing the aqueous dispersion by radiating heat or infrared rays thereto (hereinafter, "curing step B") is preferable in a case where the aqueous dispersion contains the thermally polymerizable compound as a curing component.

(Curing Step A)

The curing step A is a step of irradiating the aqueous dispersion applied onto the recording medium with active energy rays so as to cure the aqueous dispersion. In the curing step A, by irradiating the aqueous dispersion applied onto the recording medium with active energy rays, the cross-linking reaction between the microcapsules in the aqueous dispersion proceeds, the image is fixed, and hence the film hardness of the image and the like can be improved.

Examples of the active energy rays that can be used in the curing step A include ultraviolet rays (UV light), visible rays, electron beams, and the like. Among these, ultraviolet rays (UV light) is preferable.

The peak wavelength of the active energy rays (light) depends on an absorption property of a sensitizer that is used as necessary, but is preferably 200 nm to 405 nm, more preferably 220 nm to 390 nm, and even more preferably 220 nm to 385 nm, for example.

In a case where the photopolymerization initiator and the sensitizer are not used in combination, the peak wavelength is preferably 200 nm to 310 nm and more preferably 200 nm to 280 nm, for example.

At the time of the irradiation with the active energy rays (light), it is suitable to perform the irradiation with the illuminance of the exposure surface of 10 mW/cm$^2$ to 2,000 mW/cm$^2$ for example, and preferably 20 mW/cm$^2$ to 1,000 mW/cm.

As the source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting device.

Among the semiconductor ultraviolet light-emitting devices, a light emitting diode (LED) (preferably UV-LED) and a laser diode (LD) (preferably UV-LD) are compact, have long service life and high efficiency, and incur low costs, and thus are expected as a light source.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where a sensitizer and a photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having wavelength of 355 nm, 365 nm, 385 nm, 395 nm, or 405 nm is most preferable.

In the curing step A, it is suitable that the aqueous dispersion applied onto the recording medium is irradiated with such active energy rays for 0.01 seconds to 120 seconds, preferably 0.1 seconds to 90 seconds, for example.

As the irradiation conditions and the basic irradiation method, the irradiation conditions and the irradiation method disclosed in JP1985-132767A (JP-S60-132767A) can also be applied. Specifically, a method in which a light source is provided on both sides of a head unit including an ink jet device and the head unit as well as the light source are scanned by a so-called shuttle method, or a method in which the irradiation is performed by a separate light source that is not associated with driving, is preferable. The irradiation with the active energy rays is performed at a certain time interval (for example, 0.01 seconds to 120 seconds and preferably 0.01 seconds to 60 seconds) after an ink lands and is dried by heating.

(Curing Step B)

The curing step B in which heat or infrared rays are radiated to the aqueous dispersion applied onto the recording medium so as to cure the aqueous dispersion, may be provided. By radiating heat or infrared rays to the aqueous dispersion applied onto the recording medium so as to thermally cure the aqueous dispersion, the cross-linking reaction of the thermally curable group in the microcapsules in the aqueous dispersion proceeds, the image is fixed, and hence the film hardness of the image and the like can be improved.

As heating means for carrying out the heating is not particularly limited, and examples thereof include a heat drum, hot air, an infrared lamp, an infrared LED, an infrared heater, a heat oven, a heat plate, an infrared laser, an infrared dryer, and the like. Among these, from the viewpoint of being able to thermally curing the aqueous dispersion efficiently, a light emitting diode (LED) having an emission wavelength in near infrared rays to far infrared rays, which has a maximum absorption wavelength in a wavelength range of 0.8 μm to 1.5 μm or 2.0 μm to 3.5 μm, a heater radiating near infrared rays to far infrared rays, a laser having an oscillation wavelength in near infrared rays to far infrared rays, or a dryer radiating near infrared rays to far infrared rays is preferable.

The heating temperature in a case of heating is preferably 40° C. or higher, more preferably 40° C. to 200° C., and even more preferably 100° C. to 180° C. The heating temperature refers to a temperature of the ink composition on the recording medium and can be measured by a thermograph using an infrared thermographic apparatus H2640 (manufactured by Nippon Avionics Co., Ltd.).

The heating time can be appropriately set in consideration of the heating temperature, the compositions of the aqueous dispersion, a printing rate, and the like.

In addition, the curing step B for taking charge of thermally curing the aqueous dispersion applied onto the recording medium may have a heating and drying step in combination, which will be described below.

[Heating and Drying Step]

If necessary, the image forming method may additionally include a heating and drying step between the application step and the curing step.

In the heating and drying step, it is preferable that water and a water-soluble organic solvent that is used in combination if necessary, are evaporated from the aqueous dispersion jetted onto the recording medium by using heating means, such that the image is fixed.

A step of drying of the jetted aqueous dispersion by heating for fixing (that is, a heating and drying step) will be described.

A heating means is not limited as long as the heating means can dry water and a water-soluble organic solvent to be used in combination if necessary, but a heating drum, hot air, an infrared lamp, a heat oven, heat plate heating, and the like can be used.

The heating temperature is preferably equal to or higher than 40° C., more preferably about 40° C. to 150° C., and even more preferably about 40° C. to 80° C. The drying and heating time can be appropriately set in consideration of compositions of the aqueous dispersion to be used and a printing rate.

If necessary, the aqueous dispersion fixed by heating is further optically fixed by being irradiated with the active energy rays in the curing step. As described above, in the curing step, it is preferable that the aqueous dispersion is fixed by UV light.

EXAMPLES

Hereinafter, the embodiment of the present invention will be more specifically described based on examples, but the embodiment of the present invention is not limited to the examples as long as the gist of the present invention is maintained. Unless otherwise specified, "part" is on a mass basis.

[Manufacturing of Aqueous Dispersion]

Example 1

—Preparation of Oil-Phase Component—

9.59 g of TAKENATE D-120N (isocyanate compound represented by General Formula (B), Mitsui Chemicals, Inc.), 4.2 g of SR833S (difunctional polymerizable compound, Sartomer Arkema Inc.), 2.8 g of SR399E (pentafunctional polymerizable compound, Sartomer Arkema Inc.), and 0.48 g of IRGACURE (registered trademark) 819 (photopolymerization initiator, BASF SE) were dissolved in 26 g of ethyl acetate, and therefore an oil-phase component was obtained.

—Preparation of Water-Phase Component—

1.0 g of lysine (compound having a carboxy group as a hydrophilic group) and 0.25 g of OLFINE E1010 (compound having a polyethylene oxide group as a hydrophilic group, Nissin Chemical co., ltd.) were dissolved in 50 g of distilled water, and therefore a water-phase component was obtained.

The oil-phase component was mixed with the water-phase component, the obtained mixture was emulsified and dispersed using a homogenizer for 12 minutes at 12,000 rpm, and therefore an emulsion was obtained.

The obtained emulsion was added to 25 g of distilled water and stirred for 30 minutes at room temperature and then stirred for 4 hours at 45° C., such that the ethyl acetate was distilled off.

Thereafter, the mixture was further stirred at 50° C. for 24 hours and diluted with distilled water so that the concentration of solid contents of the aqueous dispersion having the obtained microcapsule 1 (MC1) became 20% by mass, and therefore an aqueous dispersion was obtained.

The microcapsule 1 included the shell having the three-dimensional cross-linked structure containing the hydrophilic group and Structure (2); and the core having the polymerizable compound (compound having the polymerizable group) and the photopolymerization initiator.

Example 2

—Preparation of Oil-Phase Component—

5.75 g of TAKENATE D-120N (isocyanate compound represented by General Formula (B), Mitsui Chemicals, Inc.), 3.84 g of TAKENATE D-110N (isocyanate compound derived from xylene diisocyanate, Mitsui Chemicals, Inc.), 4.2 g of SR833S (difunctional polymerizable compound, Sartomer Arkema Inc.), 2.8 g of SR399E (pentafunctional polymerizable compound, Sartomer Arkema Inc.), and 0.48 g of IRGACURE (registered trademark) 819 (photopolymerization initiator, BASF SE) were dissolved in 26 g of ethyl acetate, and therefore an oil-phase component was obtained.

—Preparation of Water-Phase Component—

1.0 g of lysine (compound having a carboxy group as a hydrophilic group) and 0.25 g of OLFINE E1010 (compound having a polyethylene oxide group as a hydrophilic group, Nissin Chemical co., ltd.) were dissolved in 50 g of distilled water, and therefore a water-phase component was obtained.

The oil-phase component was mixed with the water-phase component, the obtained mixture was emulsified and dispersed using a homogenizer for 12 minutes at 12,000 rpm, and therefore an emulsion was obtained.

The obtained emulsion was added to 25 g of distilled water and stirred for 30 minutes at room temperature and then stirred for 4 hours at 45° C., such that the ethyl acetate was distilled off.

Thereafter, the mixture was further stirred at 50° C. for 24 hours and diluted with distilled water so that the concentration of solid contents of the aqueous dispersion having the obtained microcapsule 2 (MC2) became 20% by mass, and therefore an aqueous dispersion was obtained.

The microcapsule 2 included the shell having the three-dimensional cross-linked structure containing the hydrophilic group and Structure (2); and the core having the polymerizable compound (compound having the polymerizable group) and the photopolymerization initiator.

Examples 3 to 7

Aqueous dispersions having a microcapsule 3 (MC3) to a microcapsule 7 (MC7) were prepared in the same manner as in Example 2 except that a mass ratio of TAKENATE D-120N to TAKENATE D-110N was changed to a mass ratio shown in Table 2. A total mass of TAKENATE D-120N and TAKENATE D-110N was the same as that of Example 2.

Example 8

An aqueous dispersion having a microcapsule 8 (MC8) was prepared in the same manner as in Example 2 except that 3.83 g of TAKENATE D-110N was changed to 3.83 g of TAKENATE D-101A (isocyanate compound derived from tolylene diisocyanate, Mitsui Chemicals, Inc.).

Examples 9 to 13

Aqueous dispersions having a microcapsule 9 (MC9) to a microcapsule 13 (MC13) were prepared in the same manner as in Example 8 except that a mass ratio of TAKENATE D-120N to TAKENATE D-101A was changed to a mass ratio shown in Table 2. A total mass of TAKENATE D-120N and TAKENATE D-101A was the same as that of Example 8.

Examples 14 and 15 and Examples 17 to 20

Aqueous dispersions having a microcapsule 14 (MC14), a microcapsule 15 (MC15), and a microcapsule 17 (MC17) to microcapsule 20 (MC20) were prepared in the same manner as in Example 1 except that 9.59 g of TAKENATE D-120N was changed to an isocyanate compound shown in Table 2. A total mass of a solid content of the isocyanate compound was the same as the total mass of a solid content of TAKENATE D-120N and TAKENATE D-101A of Example 1.

Example 16

An aqueous dispersion having a microcapsule 16 (MC16) was prepared in the same manner as in Example 2 except that 5.75 g of TAKENATE D-120N was changed to 0.72 g of DURANATE TKA-100 (isocyanate compound represented by General Formula (C), Asahi Kasei Corporation), and the amount of TAKENATE D-110N was changed from 3.84 g to 8.63 g.

Example 21

—Preparation of Oil-Phase Component—

9.59 g of TAKENATE D-120N (isocyanate compound represented by General Formula (B), Mitsui Chemicals, Inc.), 4.2 g of SR833S (difunctional polymerizable compound, Sartomer Arkema Inc.), 2.8 g of SR399E (pentafunctional polymerizable compound, Sartomer Arkema Inc.), 0.48 g of IRGACURE (registered trademark) 819 (photopolymerization initiator, BASF SE), and 0.08 g of 2-isopropylthioxanthone (ITX) (sensitizer) were dissolved in 26 g of ethyl acetate, and therefore an oil-phase component was obtained.

—Preparation of Water-Phase Component—

1.0 g of lysine (compound having a carboxy group as a hydrophilic group) and 0.25 g of OLFINE E1010 (compound having a polyethylene oxide group as a hydrophilic group, Nissin Chemical co., ltd.) were dissolved in 50 g of distilled water, and therefore a water-phase component was obtained.

The oil-phase component was mixed with the water-phase component, the obtained mixture was emulsified and dispersed using a homogenizer for 12 minutes at 12,000 rpm, and therefore an emulsion was obtained.

The obtained emulsion was added to 25 g of distilled water and stirred for 30 minutes at room temperature and then stirred for 4 hours at 45° C., such that the ethyl acetate was distilled off.

Thereafter, the mixture was further stirred at 50° C. for 24 hours and diluted with distilled water so that the concentration of solid contents of the aqueous dispersion having the obtained microcapsule 21 (MC21) became 20% by mass, and therefore an aqueous dispersion was obtained.

The microcapsule 21 included the shell having the three-dimensional cross-linked structure containing the hydrophilic group and Structure (2); and the core having the polymerizable compound (compound having the polymerizable group), the photopolymerization initiator, and the sensitizer.

Example 22

—Preparation of Oil-Phase Component—

9.59 g of TAKENATE D-120N (isocyanate compound represented by General Formula (B), Mitsui Chemicals, Inc.), 4.2 g of SR833S (difunctional polymerizable compound, Sartomer Arkema Inc.), 2.8 g of SR399E (pentafunctional polymerizable compound, Sartomer Arkema Inc.), 0.48 g of Omnipol 9210 (photopolymerization initiator, IGM Resins B. V.), 0.48 g of SpeedCure 7040 (photopolymerization initiator, Lambson Limited), and 0.16 g of SpeedCure 7010 (sensitizer, Lambson Limited) were dissolved in 26 g of ethyl acetate, and therefore an oil-phase component was obtained.

—Preparation of Water-Phase Component—

1.0 g of lysine (compound having a carboxy group as a hydrophilic group) and 0.25 g of OLFINE E1010 (compound having a polyethylene oxide group as a hydrophilic group, Nissin Chemical co., ltd.) were dissolved in 50 g of distilled water, and therefore a water-phase component was obtained.

The oil-phase component was mixed with the water-phase component, the obtained mixture was emulsified and dispersed using a homogenizer for 12 minutes at 12,000 rpm, and therefore an emulsion was obtained.

The obtained emulsion was added to 25 g of distilled water and stirred for 30 minutes at room temperature and then stirred for 4 hours at 45° C., such that the ethyl acetate was distilled off.

Thereafter, the mixture was further stirred at 50° C. for 24 hours and diluted with distilled water so that the concentration of solid contents of the aqueous dispersion having the obtained microcapsule 22 (MC22) became 20% by mass, and therefore an aqueous dispersion was obtained.

The microcapsule 22 included the shell having the three-dimensional cross-linked structure containing the hydrophilic group and Structure (2); and the core having the polymerizable compound (compound having the polymerizable group), the photopolymerization initiator, and the sensitizer.

Example 23

—Preparation of Oil-Phase Component—

6.40 g of the following isocyanate compound having a polyethylene oxide group (isocyanate compound having a hydrophilic group), 5.14 g of the following isocyanate compound having a carboxy group (isocyanate compound having a hydrophilic group), 2.75 g of TAKENATE D-120N (isocyanate compound represented by General Formula (B), Mitsui Chemicals, Inc.), 1.83 g of TAKENATE D-110N (isocyanate compound derived from xylene diisocyanate, Mitsui Chemicals, Inc.), 4.2 g of SR833S (difunctional polymerizable compound, Sartomer Arkema Inc.), 2.8 g of SR399E (pentafunctional polymerizable compound, Sartomer Arkema Inc.), and 0.48 g of IRGACURE (registered trademark) 819 (photopolymerization initiator, BASF SE) were dissolved in 26 g of ethyl acetate, and therefore an oil-phase component was obtained.

—Preparation of Water-Phase Component—

0.08 g of sodium hydroxide was dissolved in 50 g of distilled water, and therefore a water-phase component was prepared.

The oil-phase component was mixed with the water-phase component, the obtained mixture was emulsified and dispersed using a homogenizer for 12 minutes at 12,000 rpm, and therefore an emulsion was obtained.

The obtained emulsion was added to 25 g of distilled water and stirred for 30 minutes at room temperature and then stirred for 4 hours at 45° C., such that the ethyl acetate was distilled off.

Thereafter, the mixture was further stirred at 50° C. for 24 hours and diluted with distilled water so that the concentration of solid contents of the aqueous dispersion having the obtained microcapsule 23 (MC23) became 20% by mass, and therefore an aqueous dispersion was obtained.

The microcapsule 23 included the shell having the three-dimensional cross-linked structure containing the hydrophilic group and Structure (2); and the core having the polymerizable compound (compound having the polymerizable group) and the photopolymerization initiator.

[Synthesis of Isocyanate Compound Having Carboxy Group]

45 g of 2,2-bis(hydroxymethyl)propionic acid (DMPA), 223.72 g of isophorone diisocyanate (IPDI), and 499.05 g of ethyl acetate (AcOEt) were put into a three-neck flask and heated to 50° C. Then, 0.7677 g of NEOSTANN U-600 was added thereto and reacted for 3 hours, thereby obtaining an ethyl acetate solution of 35% by mass of a solid content of an isocyanate compound having a carboxy group (isocyanate compound having a hydrophilic group).

[Synthesis of Isocyanate Compound Having Polyethylene Oxide Group]

100 g of D-120N, 75 g of polyethylene glycol (repeating number=90), and 125 g of ethyl acetate were put into a three-neck flask and heated to 70° C. Then, 0.3 g of NEOSTANN U-600 was added thereto and reacted for 3 hours, thereby obtaining 50% by mass of an ethyl acetate solution of an isocyanate compound having a polyethylene oxide group (isocyanate compound having a hydrophilic group).

Example 24

An aqueous dispersion having a microcapsule 24 (MC24) was prepared in the same manner as in Example 23 except that 1.83 g of TAKENATE D-110N was changed to 1.83 g of TAKENATE D-101A.

Example 25

An aqueous dispersion having a microcapsule 25 (MC25) was prepared in the same manner as in Example 1 except that OLFINE E1010 was not formulated.

Example 26

An aqueous dispersion having a microcapsule 26 (MC26) was prepared in the same manner as in Example 1 except that 1.0 g of lysine was changed to 1.0 g of malic acid.

Example 27

An aqueous dispersion having a microcapsule 27 (MC27) was prepared in the same manner as in Example 1 except that in Example 1, SR833S and SR399E used for the preparation of the oil-phase component were changed to Trixene™ BI 7982 (thermally polymerizable monomer; blocked isocyanate; Baxenden Chemicals Ltd) in which propylene glycol monomethyl ether was distilled off under reduced pressure at 2.67 kPa (20 torr) and IRGACURE 819 was not used.

A mass of BI 7982 used in Example 27 was the same mass as the total mass of SR833S and SR399E of Example 1.

Hereinafter, "Trixene™ BI 7982 in which propylene glycol monomethyl ether was distilled off under reduced pressure at 2.67 kPa (20 torr) at 60° C." will also be referred to as "BI 7982".

Example 28

An aqueous dispersion having a microcapsule 28 (MC28) was prepared in the same manner as in Example 14 except that in Example 14, SR833S and SR399E used for the preparation of the oil-phase component were changed to BI 7982, and IRGACURE 819 was not used.

A mass of BI 7982 used in Example 28 was the same mass as the total mass of SR833S and SR399E of Example 14.

Example 29

An aqueous dispersion having a microcapsule 29 (MC29) was prepared in the same manner as in Example 20 except that in Example 20, SR833S and SR399E used for the preparation of the oil-phase component were changed to BI 7982, and IRGACURE 819 was not used.

A mass of BI 7982 used in Example 29 was the same mass as the total mass of SR833S and SR399E of Example 20.

Example 30

An aqueous dispersion having a microcapsule 30 (MC30) was prepared in the same manner as in Example 1 except that in Example 1, SR833S and SR399E used for the preparation of the oil-phase component were changed to EPICLON™ 840 (thermally polymerizable oligomer having an epoxy group, DIC CORPORATION; hereinafter, will also be referred to as "EP840"), and IRGACURE 819 was changed to 2-methylimidazole (thermal curing accelerator).

A mass of EP840 used in Example 30 was the same mass as the total mass of SR833S and SR399E of Example 1.

A mass of 2-methylimidazole used in Example 20 was the same mass as that of IRGACURE 819 of Example 1.

Comparative Example 1

An aqueous dispersion having a comparative microcapsule 1 (comparative MC1) was prepared in the same manner as in Example 1 except that 9.59 g of TAKENATE D-110N which is the isocyanate compound derived from xylene diisocyanate was used without using TAKENATE D-120N which is the isocyanate compound represented by General Formula (B), and the amount of SR399E was changed from 2.8 g to 7.0 g without using SR833S (difunctional polymerizable compound, Sartomer Arkema Inc.).

Comparative Example 2

An aqueous dispersion having a comparative microcapsule 2 (comparative MC2) was prepared in the same manner as in Example 1 except that 9.59 g of TAKENATE D-101A which is the isocyanate compound derived from tolylene diisocyanate was used without using TAKENATE D-120N which is the isocyanate compound represented by General Formula (B), and the amount of SR399E was changed from 2.8 g to 7.0 g without using SR833S (difunctional polymerizable compound, Sartomer Arkema Inc.).

Comparative Example 3

An aqueous dispersion having a comparative microcapsule 3 (comparative MC3) was prepared in the same manner as in Comparative Example 1 except that in Comparative Example 1, SR399E used for the preparation of the oil-phase component was changed to BI 7982, and IRGACURE 819 was not used.

A mass of BI 7982 used in Comparative Example 3 was the same mass as the mass of SR399E of Comparative Example 1.

<Checking Whether Microcapsule Aqueous Dispersion Contains Microcapsule Having Polymerizable Group>

Whether the microcapsule aqueous dispersions of Examples 1 to 30 obtained above contains a microcapsule was checked by the following method. The operation described below was performed under the condition of a liquid temperature of 25° C.

From the microcapsule aqueous dispersion obtained as above, a sample was collected. Tetrahydrofuran (THF) having a mass 100 times the mass of the total solid content (microcapsule in the present example) in the sample was added to and mixed with the collected sample, thereby preparing a diluted solution of the microcapsule aqueous dispersion. The obtained diluted solution was subjected to centrifugation (80,000 rpm, 40 minutes). After centrifugation, the presence or absence of a residue was checked by visual observation. In a case where a residue was checked, water was added to the residue, and the resultant was stirred for 1 hour by using a stirrer so as to redisperse the residue in water, thereby obtaining a redispersion. For the obtained redispersion, by using a wet-type particle size distribution measurement apparatus (LA-960, manufactured by HORIBA, Ltd.), the particle size distribution was measured by a light scattering method. In a case where the particle size distribution was checked by the operation described above, it was determined that the aqueous dispersion contained the microcapsule.

In addition, from the above result and the result of Fourier transform infrared spectroscopy (FT-IR), it was confirmed that all of the aqueous dispersions having the microcapsule actually contained the microcapsule having a polymerizable group (that is, it was confirmed that the microcapsule was actually a microcapsule having a polymerizable group).

<Checking Whether Core Contains Photopolymerization Initiator>

In the aqueous dispersion having the microcapsule of Examples 1 to 26 obtained as above, whether the core of the microcapsule contains the photopolymerization initiator was checked by measuring an internal content rate (%) of the photopolymerization initiator. The details thereof are as described below. The operation described below was performed under the condition of a liquid temperature of 25° C.

From the aqueous dispersion having the microcapsule, two samples (hereinafter, will be referred to as "sample 1A" and "sample 2A") having the same mass were collected.

Tetrahydrofuran (THF) having a mass 100 times the mass of the total solid content in the sample 1A was added to the sample 1A, thereby preparing a diluted solution. The obtained diluted solution was subjected to centrifugation under the condition of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator".

Furthermore, the sample 2A was subjected to centrifugation under the same condition as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator".

Based on "total amount of photopolymerization initiator" and "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

As the results, in all of the microcapsules, the internal content rates were 99% or higher, and therefore it was confirmed that the core contained the photopolymerization initiator.

<Checking Whether Core Contains Polymerizable Compound>

In the aqueous dispersions of Examples 1 to 30 obtained as above, whether the core of the microcapsule contains the polymerizable compound was checked by measuring an internal content rate (%) of the polymerizable compound.

Whether or not the polymerizable compound was contained was checked by the same method as the method used for checking whether the photopolymerization initiator was contained in the interior.

As the results, in all of the microcapsules, the internal content rates were 99% or higher, and therefore it was confirmed that the core contained the polymerizable compound. The internal content rate of the polymerizable compound referred herein is a value obtained by the total mass of the di- or lower functional polymerizable compound and the tri- or higher functional polymerizable compound in Examples 1 to 26, and is a value obtained by the mass of the thermally polymerizable monomer which is blocked isocyanate in Examples 27 to 30.

<Checking Whether Core Contains Sensitizer>

In the aqueous dispersions of Examples 21 and 22 obtained as above, whether the core of the microcapsule contains the sensitizer was checked by measuring an internal content rate (%) of the sensitizer.

Whether or not the sensitizer was contained was checked by the same method as the method used for checking whether the photopolymerization initiator was contained.

As the results, in all of the microcapsules of the aqueous dispersions having the microcapsules in which the sensitizer was used, the internal content rates were 99% or higher, and therefore it was confirmed that the core contained the sensitizer.

[Preparation of Ink Composition]

Using any one of the aqueous dispersions of Examples 1 to 30 and Comparative Examples 1 to 3, the respective components were mixed so as to have the following ink composition, and an ink composition of each of the examples was prepared.

—Composition of Ink Composition—

Each of the aqueous dispersions having the microcapsules of Examples 1 to 30 and Comparative Examples 1 to 3 82 parts Ink (Pro-jet Cyan APD1000 (FUJIFILM Imaging Colorants, Inc), colorant concentration: 14% by mass) 13 parts Fluorine-based surfactant (manufactured by DuPont, Capstone FS-31, solid content: 25% by mass) 0.3 parts 2-Methylpropanediol 4.7 parts <Evaluation>

By using the aqueous dispersion, and the aforementioned ink composition which is one aspect of the aqueous dispersion, the following evaluation was performed. The results are shown in Tables 2 and 3.

—Number of Coarse Particles—

With respect to the microcapsules in the aqueous dispersions (concentration of microcapsules: 20% by mass) of each of the examples and the comparative examples, the number of particles per 1 μL of the microcapsules having a particle diameter of 0.5 μm to 5 μm and the number of particles per 1 μL of the microcapsules having a particle diameter exceeding 5 μm were measured by using a flow particle image analyzer FPIA-3000. Based on the obtained measurement results, the number of coarse particles was evaluated according to the following evaluation standard. The evaluation results are shown in Table 2.

—Microcapsule of 0.5 μm to 5 μm—

A: The number of coarse particles was 0 or more and less than 5,000.

B: The number of coarse particles was 5,000 or more and less than 10,000.

C: The number of coarse particles was 10,000 or more and less than 30,000.

D: The number of coarse particles was 30,000 or more.

—Microcapsule of more than 5 μm—

A: The number of coarse particles was 0.

B: The number of coarse particles was 1 to 5.

C: The number of coarse particles was 6 to 10.

D: The number of coarse particles was 11 or more.

—Jetting Properties—

The ink composition (within a day at room temperature after the preparation) using the microcapsule aqueous dispersions of each of the examples and comparative examples was jetted from a head for 30 minutes by using an ink jet printer (SP-300V, manufactured by Roland DG Corporation), and after 5 minutes had elapsed from stopping of jetting, a solid image and a thin line were recorded on a recording medium (AVERY 400 GLOSS WHITE PERMANENT manufactured by AVERY DENNISON CORPORATION) by re-jetting. The obtained image (5 cm×5 cm) was observed, and visually evaluated according to the following evaluation standard.

Evaluation Standard

A: The generation of dead pixels was not observed, and an image of having excellent image quality was obtained.

B: Although the generation of a small number of dead pixels was observed, the dead pixels were unproblematic in image quality for practical use.

C: The generation of dead pixels was observed, and the dead pixels were problematic in image quality for practical use.

D: The jetting was not possible.

—Storage Stability of Ink Composition—

The obtained ink composition was sealed into a container and left to stand for 4 weeks at 60° C. Then, the same evaluation as the evaluation on jetting properties was carried out, and the ink composition was evaluated according to the same standards.

—Pencil Hardness—

(A) Pencil Hardness of Photocured Film

The ink composition using the microcapsule aqueous dispersions of Examples 1 to 26 and Comparative Examples 1 and 2 was applied onto a polystyrene (PS) sheet ("falcon hi impact polystyrene" manufactured by Robert Horne Company) prepared as a recording medium by using a No. 2 bar of K HAND COATER manufactured by RK PrintCoat Instruments Ltd so that the thickness became 12 μm, and therefore a coated film was formed. The moisture of the coated film formed was dried at 60° C. for 3 minutes, and therefore a dried film was obtained.

As an exposure light source, an experimental UV mini conveyor device CSOT (manufactured by Yuasa Power Supply Ltd.) was used which was equipped with an ozoneless metal halide lamp MAN 250L and in which a conveyor speed was set to be 9.0 m/min and an exposure intensity was set to be 2.0 W/cm², each of the dried film obtained as above was irradiated with active energy rays so as to cure the dried film, and therefore an evaluation sample having a cured film was obtained.

A pencil hardness test was performed on the surface of the cured film of each of the evaluation sample by using UNI (registered trademark) manufactured by MITSUBISHI PENCIL CO., LTD as a pencil, based on JIS K5600-5-4 (1999).

In the test results, the acceptable range of the pencil hardness is equal to or higher than HB, and it is preferable that the pencil hardness is equal to or higher than H. A printed matter having a pencil hardness of equal to or lower than B is not preferable, because an image is likely to be scratched in a case where the printed matter is handled.

(B) Pencil Hardness of Thermally Cured Film

The ink composition using the microcapsule aqueous dispersions of Examples 27 to 30 and Comparative Example 3 was applied onto a polystyrene (PS) sheet ("falcon hi impact polystyrene" manufactured by Robert Horne Company) prepared as a recording medium by using a No. 2 bar of K HAND COATER manufactured by RK PrintCoat Instruments Ltd so that the thickness became 10 μm, and therefore a coated film was formed. The coated film formed was dried by being heated for 3 minutes at 60° C. Subsequently, the coated film after the drying was put into an oven and heated at 160° C. for 5 minutes so as to cure the coated film, and therefore an evaluation sample having a cured film was obtained.

A pencil hardness test was performed on the surface of the cured film of each of the evaluation sample by using UNI (registered trademark) manufactured by MITSUBISHI PENCIL CO., LTD as a pencil, based on JIS K5600-5-4 (1999).

In the test results, the acceptable range of the pencil hardness is equal to or higher than HB, and it is preferable that the pencil hardness is equal to or higher than H. The cured film having a pencil hardness of equal to or lower than B is not preferable, because in a case of being handled, there is a possibility that scratches are generated.

—Weather Fastness Evaluation—

Each sample which is same as the evaluation sample used for the above pencil hardness evaluation was put into ACCELERATED WEATHERING TESTER (Q-Lab Corporation, QUV WEATHERING TESTER), and the following conditions 1 and 2 were repeated alternately until reaching 2,000 hours in total, and therefore weather fastness test was carried out. A gloss retention rate of the cured film of each of the evaluation samples after the weather fastness test was determined with the gloss of the cured film of each of the evaluation sample before being input into the tester set to 100%, and therefore the weather fastness was evaluated according to the following evaluation standard. The QUV tester was installed under an atmosphere of 23° C. and 55% RH.

Condition 1: Irradiation of illuminance 0.68 W/m² (UVA-340 ramp) at 60° C. for 8 hours Condition 2: No Irradiation, condensation at 50° C. for 4 hours Evaluation Standard A: The gloss retention rate of the cured film was 90% to 100%.

B: The gloss retention rate of the cured film was 80% or more and less than 90%.

C: The gloss retention rate of the cured film was 60% or more and less than 80%.

D: The gloss retention rate of the cured film was less than 60%.

—Adhesiveness Evaluation (Crosshatch Test)—

The crosshatch test was performed on each sample which is same as the evaluation sample used for the above pencil hardness evaluation by ISO 2409 (crosscut method), and therefore the adhesiveness was evaluated according to the following standard.

The symbol "%" that indicates lattice peeling in the following standards 0 to 5 is a proportion, which is expressed in percentage, of the number of lattices in which peeling was observed at 25 lattices formed by cut at right angles with 1 mm intervals.

Proportion (%) of peeled lattices=[(number of peeled lattices)/(total number of lattices)]×100

Evaluation Standard

0: The cut portion was smooth, and all lattices were not peeled off.

1: Small peeling was observed on the coated film at the intersection of the cuts. The part where peeling was observed was 5% or less of the total number of lattices.

2: Peeling was observed in at least one of the portion along the edge of the cut portion of the coated film and the intersection of the cuts. The part where peeling was observed exceeded 5% and was 15% or less of the total number of lattices.

3: Partial or complete peeling was observed along the edge of the cut portion of the coated film, or partial or complete peeling was observed in various portions of the lattices. The part where peeling was observed exceeded 15% and was 35% or less of the total number of lattices.

4: Partial or complete peeling was observed along the edge of the cut portion of the coated film, or partial or complete peeling was observed in various portions of the lattices. The part where peeling was observed exceeded 35% and was 65% or less of the total number of lattices.

5: The part where peeling was observed exceeded 65% of the total number of lattices.

In the above evaluation, it was evaluated that 0 to 1 are practically acceptable levels.

[Table 2]

TABLE 2

| | | Shell component | | | | | | | | | Core component Polymerizable compound | | | |
|---|---|---|---|---|---|---|---|---|---|---|---|---|---|---|
| | | Compound into which the hydrophilic group is introduced | | | Isocyanate compound | | | | | | Di- or lower functional polymerizable compound | | | |
| | | Hydrophilic group 1 (poly-ethylene oxide group) | Hydrophilic group (carboxy group) | | Aliphatic isocyanate compound | | | | Aromatic isocyanate compound | | | Number of functional groups | Molecular weight | Ratio*3 (% by mass) |
| | | | | | Name | Formed structure | Ratio*1 (% by mass) | Ratio*2 (% by mass) | Name | Ratio*2 (% by mass) | Name | | | |
| Example 1 | MC1 | OLFINE E1010 | Lysine | | D-120N Formula (B) | Structure (2) | 85.2 | 100 | D-110N (derived by XDI) | 0 | SR833SS | 2 | 304.4 | 60 |
| Example 2 | MC2 | OLFINE E1010 | Lysine | | D-120N Formula (B) | Structure (2) | 51.1 | 60 | D-110N (derived by XDI) | 40 | SR833SS | 2 | 304.4 | 60 |
| Example 3 | MC3 | OLFINE E1010 | Lysine | | D-120N Formula (B) | Structure (2) | 25.6 | 30 | D-110N (derived by XDI) | 70 | SR833SS | 2 | 304.4 | 60 |
| Example 4 | MC4 | OLFINE E1010 | Lysine | | D-120N Formula (B) | Structure (2) | 17.0 | 20 | D-110N (derived by XDI) | 80 | SR833SS | 2 | 304.4 | 60 |
| Example 5 | MC5 | OLFINE E1010 | Lysine | | D-120N Formula (B) | Structure (2) | 8.5 | 10 | D-110N (derived by XDI) | 90 | SR833SS | 2 | 304.4 | 60 |
| Example 6 | MC6 | OLFINE E1010 | Lysine | | D-120N Formula (B) | Structure (2) | 4.3 | 5 | D-110N (derived by XDI) | 95 | SR833SS | 2 | 304.4 | 60 |
| Example 7 | MC7 | OLFINE E1010 | Lysine | | D-120N Formula (B) | Structure (2) | 2.6 | 3 | D-110N (derived by XDI) | 97 | SR833SS | 2 | 304.4 | 60 |
| Example 8 | MC8 | OLFINE E1010 | Lysine | | D-120N Formula (B) | Structure (2) | 51.1 | 60 | D-101A (derived by TDI) | 40 | SR833SS | 2 | 304.4 | 60 |
| Example 9 | MC9 | OLFINE E1010 | Lysine | | D-120N Formula (B) | Structure (2) | 25.6 | 30 | D-101A (derived by TDI) | 70 | SR833SS | 2 | 304.4 | 60 |
| Example 10 | MC10 | OLFINE E1010 | Lysine | | D-120N Formula (B) | Structure (2) | 17.0 | 20 | D-101A (derived by TDI) | 80 | SR833SS | 2 | 304.4 | 60 |
| Example 11 | MC11 | OLFINE E1010 | Lysine | | D-120N Formula (B) | Structure (2) | 8.5 | 10 | D-101A (derived by TDI) | 90 | SR833SS | 2 | 304.4 | 60 |
| Example 12 | MC12 | OLFINE E1010 | Lysine | | D-120N Formula (B) | Structure (2) | 4.3 | 5 | D-101A (derived by TDI) | 95 | SR833SS | 2 | 304.4 | 60 |
| Example 13 | MC13 | OLFINE E1010 | Lysine | | D-120N Formula (B) | Structure (2) | 2.6 | 3 | D-101A (derived by TDI) | 97 | SR833SS | 2 | 304.4 | 60 |
| Example 14 | MC14 | OLFINE E1010 | Lysine | | D-127N Formula (C) | Structure (3) | 85.2 | 100 | D-110N (derived by XDI) | 0 | SR833SS | 2 | 304.4 | 60 |
| Example 15 | MC15 | OLFINE E1010 | Lysine | | D-160N Formula (B) | Structure (2) | 85.2 | 100 | D-110N (derived by XDI) | 0 | SR833SS | 2 | 304.4 | 60 |
| Example 16 | MC16 | OLFINE E1010 | Lysine | | TKA-100 Formula (C) | Structure (3) | 10.0 | 10 | D-110N (derived by XDI) | 90 | SR833SS | 2 | 304.4 | 60 |
| Example 17 | MC17 | OLFINE E1010 | Lysine | | TPA-100 Formula (C) | Structure (3) | 85.2 | 100 | D-110N (derived by XDI) | 0 | SR833SS | 2 | 304.4 | 60 |
| Example 18 | MC18 | OLFINE E1010 | Lysine | | TSA-100 Formula (C) | Structure (3) | 85.2 | 100 | D-110N (derived by XDI) | 0 | SR833SS | 2 | 304.4 | 60 |

TABLE 2-continued

| | Tri- or higher functional polymerizable compound | | | Core component | | | | | |
|---|---|---|---|---|---|---|---|---|---|
| | Name | Number of functional groups | Molecular weight | Ratio*3 (% by mass) | | | Photo-polymerization initiator | Sensitizer | |
| Example 19 | SR399E | 5 | 524.5 | 40 | MC19 | TSS-100 Formula (C) | Lysine | OLFINE E1010 | Structure (3) | 85.2 | 100 | D-110N (derived by XDI) |
| Example 20 | SR399E | 5 | 524.5 | 40 | MC20 | 24A-100 Formula (D) | Lysine | OLFINE E1010 | Structure (4) | 85.2 | 100 | D-110N (derived by XDI) |
| Example 21 | SR399E | 5 | 524.5 | 40 | MC21 | D-120N Formula (B) | Lysine | OLFINE E1010 | Structure (2) | 85.2 | 100 | D-101A (derived by TDI) |
| Example 22 | SR399E | 5 | 524.5 | 40 | MC22 | D-120N Formula (B) | Lysine | OLFINE E1010 | Structure (2) | 85.2 | 100 | D-110N (derived by XDI) |
| Example 23 | SR399E | 5 | 524.5 | 40 | MC23 | D-120N Formula (B) | Isocyanate compound having carboxy group | OLFINE E1010 | Structure (2) | 0.0 | 60 | D-101A (derived by TDI) |
| Example 24 | SR399E | 5 | 524.5 | 40 | MC24 | D-120N Formula (B) | Isocyanate compound having polyethylene oxide group | OLFINE E1010 | Structure (2) | 0.0 | 60 | D-110N (derived by XDI) |
| Example 25 | SR399E | 5 | 524.5 | 40 | MC25 | D-120N Formula (B) | Lysine | OLFINE E1010 | Structure (2) | 87.8 | 100 | D-110N (derived by XDI) |
| Example 26 | SR399E | 5 | 524.5 | 40 | MC26 | D-120N Formula (B) | Malic acid | OLFINE E1010 | Structure (2) | 85.2 | 100 | D-101A (derived by TDI) |
| Comparative Example 1 | SR399E | 5 | 524.5 | 40 | Comparative MC1 | — | Lysine | OLFINE E1010 | — | 0.0 | 0 | D-110N (derived by XDI) |
| Comparative Example 2 | SR399E | 5 | 524.5 | 40 | Comparative MC2 | — | Lysine | OLFINE E1010 | — | 0.0 | 0 | D-101A (derived by TDI) |

| | Evaluation result | | | | | | | |
|---|---|---|---|---|---|---|---|---|
| | Pencil hardness | Coarse particles | | Jetting properties | Weather fastness | Storage stability | Adhesiveness PS | |
| | | 0.5 μM to 5 μM | 0.5 μM or more | | | | | |
| Example 19 | H | A | A | SR833SS | A | A | A | 304.4 | 60 | 2 | 0 |
| Example 20 | H | A | A | SR833SS | A | A | A | 304.4 | 60 | 2 | 0 |
| Example 21 | H | B | A | SR833SS | A | A | A | 304.4 | 60 | 2 | 0 |
| Example 22 | H | A | A | SR833SS | A | A | A | 304.4 | 60 | 2 | 0 |
| Example 23 | H | B | A | SR833SS | A | A | A | 304.4 | 60 | 2 | 40 |
| Example 24 | H | B | A | SR833SS | A | A | A | 304.4 | 60 | 2 | 40 |
| Example 25 | H | A | A | SR833SS | A | A | A | 304.4 | 60 | 2 | 0 |
| Example 26 | H | A | A | SR833SS | A | A | A | 304.4 | 60 | 2 | 0 |
| Comparative Example 1 | H | B | A | — | — | — | — | — | — | — | 100 |
| Comparative Example 2 | H | A | A | — | — | — | — | — | — | — | 100 |
| Example 1 | H | A | A | | A | A | A | | | | 0 |
| Example 2 | H | A | A | | A | A | A | | | | 0 |
| Example 3 | H | A | A | | A | A | A | | | | 0 |
| Example 4 | H | B | A | | B | B | B | | | | 0 |
| Example 5 | H | B | B | | B | B | B | | | | 0 |
| Example 6 | H | B | B | | B | B | B | | | | 0 |
| Example 7 | H | A | A | | A | B | A | | | | 0 |
| Example 8 | H | B | B | | A | B | B | | | | 0 |
| Example 9 | H | B | A | | B | B | B | | | | 0 |
| Example 10 | H | B | B | | B | B | B | | | | 0 |
| Example 11 | H | B | B | | B | B | B | | | | 0 |
| Example 12 | H | B | B | | B | B | B | | | | 0 |
| Example 13 | H | B | A | | A | B | B | | | | 0 |
| Example 14 | H | A | A | | A | A | A | | | | 0 |
| Example 15 | H | A | A | | A | A | A | | | | 0 |
| Example 16 | H | A | A | | A | A | A | | | | 0 |

TABLE 2-continued

| | | | | | | | | | | | | |
|---|---|---|---|---|---|---|---|---|---|---|---|---|
| Example 17 | SR399E | 5 | 524.5 | 40 | IRAGURE 819 | — | H | A | A | A | A | 0 |
| Example 18 | SR399E | 5 | 524.5 | 40 | IRAGURE 819 | — | H | A | A | A | A | 0 |
| Example 19 | SR399E | 5 | 524.5 | 40 | IRAGURE 819 | — | H | A | A | A | A | 0 |
| Example 20 | SR399E | 5 | 524.5 | 40 | IRAGURE 819 | — | H | A | A | A | A | 0 |
| Example 21 | SR399E | 5 | 524.5 | 40 | IRAGURE 819 | ITX | 2H | A | A | A | A | 0 |
| Example 22 | SR399E | 5 | 524.5 | 40 | Omnipol 9210 | SpeedCure 7010 | 2H | A | A | A | A | 0 |
| Example 23 | SR399E | 5 | 524.5 | 40 | IRAGURE 819 | — | H | A | A | A | A | 0 |
| Example 24 | SR399E | 5 | 524.5 | 40 | IRAGURE 819 | — | H | A | A | A | B | 0 |
| Example 25 | SR399E | 5 | 524.5 | 40 | IRAGURE 819 | — | H | A | A | A | B | 0 |
| Example 26 | SR399E | 5 | 524.5 | 40 | IRAGURE 819 | — | H | A | A | A | A | 0 |
| Example 27 | SR399E | 5 | 524.5 | 40 | IRAGURE 819 | — | H | C | A | A | B | 0 |
| Comparative Example 1 | SR399E | 5 | 524.5 | 100 | IRAGURE 819 | — | H | D | D | D | D | 5 |
| Comparative Example 2 | SR399E | 5 | 524.5 | 100 | IRAGURE 819 | — | H | D | D | D | D | 5 |

*[1] A content rate (% by mass) of Structures (1) to (4) with respect to a total mass of the shell
*[2] A ratio (% by mass) with respect to a total amount of Structures (1) to (4) and a part of the structure derived from the isocyanate compound having an aromatic ring in the shell
*[3] A ratio (% by mass) with respect to a total amount of the di- or lower functional polymerizable compound and the tri- or higher function polymerizable compound

TABLE 3

| | Shell component | | | | | | | |
|---|---|---|---|---|---|---|---|---|
| | Compound into which hydrophilic group is introduced | | Isocyanate compound | | | | | |
| | | | Aliphatic isocyanate compount | | | | Aromatic isocyanate compound | |
| | Hydrophilic group 1 (polyethylene oxide group) | Hydrophilic group 2 (carboxy group) | Name | Formed structure | Ratio*1 (% by mass) | Ratio*2 (% by mass) | Name | Ratio*2 (% by mass) |
| Example 27 | MC27 | OLFINE E1010 | Lysine | D-120N Formula (B) | Structure (2) | 85.2 | 100 | D-110N (derived from XDI) | 0 |
| Example 28 | MC28 | OLFINE E1010 | Lysine | D-127N Formula (C) | Structure (3) | 85.2 | 100 | D-110N (derived from XDI) | 0 |
| Example 29 | MC29 | OLFINE E1010 | Lysine | 24A-100 Formula (D) | Structure (4) | 85.2 | 100 | D-110N (derived from XDI) | 0 |
| Example 30 | MC30 | OLFINE E1010 | Lysine | D-120N Formula (B) | Structure (2) | 85.2 | 100 | D-110N (derived from XDI) | 0 |
| Comparative Example 3 | Comparative MC3 | OLFINE E1010 | Lysine | — | — | 0.0 | 0 | D-110N (derived from XDI) | 100 |

| | Core component | | Evaluation result | | | | | | |
|---|---|---|---|---|---|---|---|---|---|
| | Polymerizable compound Name | Thermal curing acceleratore Name | Pencil harness | Coarse particles | | Jetting properties | Weather fastness | Storage stability | Adhesivenss PS |
| | | | | 0.5 μm to 5 μm | 5 μm or more | | | | |
| Example 27 | BI 7982 | — | H | A | A | A | A | A | 0 |
| Example 28 | BI 7982 | — | H | A | A | A | A | A | 0 |
| Example 29 | BI 7982 | — | H | A | A | A | A | A | 0 |
| Example 30 | EPICLON 840 | 2-Methylimidazole | H | A | A | A | A | A | 0 |
| Comparative Example 3 | BI 7982 | — | H | C | D | D | D | D | 5 |

*1 A content rate (% by mass) of Structures (1) to (4) with respect to a total mass of the shell
*2 A ratio (% by mass) with respect to a total amount of Structures (1) to (4) and a part of the stucture derived from the isocyanate compound having an aromatic ring in the shell Components in Tables 2 and 3 will be described.

D-120N: TAKENATE D-120N, Mitsui Chemicals, Inc., an ethyl acetate solution of a solid content of 75% by mass of TMP adduct modified isocyanate of H6XDI, the compound represented by General Formula (B)

D-110N: TAKENATE D-110N, Mitsui Chemicals, Inc., an ethyl acetate solution of a solid content of 75% by mass of TMP adduct modified isocyanate of xylene diisocyanate (XDI), the compound represented by General Formula (B)

D-101A: TAKENATE D-101A, Mitsui Chemicals, Inc., an ethyl acetate solution of a solid content of 75% by mass derived from tolylene diisocyanate D-127N: TAKENATE D-127N, Mitsui Chemicals, Inc., an ethyl acetate solution of a solid content of 75% by mass of isocyanurate-modified isocyanate of H6XDI, the compound represented by General Formula (C)

D-160N: TAKENATE D-160N, Mitsui Chemicals, Inc., an ethyl acetate solution of a solid content of 75% by mass of TMP adduct modified isocyanate of HDI, the compound represented by General Formula (B)

TKA-100: DURANATE TKA-100, Asahi Kasei Corporation, isocyanurate form of hexamethylene diisocyanate, the compound represented by General Formula (C)

TPA-100: DURANATE TPA-100, Asahi Kasei Corporation, isocyanurate form of hexamethylene diisocyanate, the compound represented by General Formula (C)

TSA-100: DURANATE TSA-100, Asahi Kasei Corporation, isocyanurate form of hexamethylene diisocyanate, the compound represented by General Formula (C)

TSS-100: DURANATE TSS-100, Asahi Kasei Corporation, isocyanurate form of hexamethylene diisocyanate, the compound represented by General Formula (C)

24A-100: DURANATE 24A-100, Asahi Kasei Corporation, biuret form of hexamethylene diisocyanate, the compound represented by General Formula (D)

SR833S: Sartomer Arkema Inc., difunctional polymerizable compound, tricyclodecanedimethanoldiacrylate SR399E: Sartomer Arkema Inc., pentafunctional polymerizable compound, dipentaerythritol pentaacrylate IRGACURE 819: BASF SE, acylphosphine oxide-based photopolymerization initiator Omnipol 9210: IGM Resins B. V., photopolymerization initiator, polymeric α-aminoketone SpeedCure 7040: Lambson Limited, photopolymerization initiator, polymer type amine-based coinitiator ITX: sensitizer, 2-isopropylthioxanthone SpeedCure 7010: Lambson Limited, sensitizer, thioxanthone-based Trixene™ BI 7982: thermally polymerizable monomer; blocked isocyanate, Baxenden Chemicals ltd EPICLON™ 840: thermally polymerizable oligomer having an epoxy group, DIC CORPORATION It could be understood that based on Tables 2 and 3, in the microcapsule of each of the examples, coarse particles were less, and weather fastness was excellent.

It could be understood that based on comparison between Examples 5 and 6, in case where the content rate of Structure (1) in the shell was 8% by mass or more with respect to the total mass of the shell, the ink composition became excellent storage stability, and it could be understood that based on comparison between Examples 3 and 4, in case where the content rate of Structure (1) in the shell was 25% by mass or more with respect to the total mass of the shell, the coarse particles were less.

In addition, it could be understood that based on comparison between Examples 1 and 21, in a case where the core of the microcapsule contained the polymerizable compound, the photopolymerization initiator, and the sensitizer, the film hardness became excellent.

The entire content of Japanese Patentent Application No. 2016-021362 filed on Feb. 5, 2016 and Japanese Patentent Application No. 2016-144296 filed on Jul. 22, 2016 is incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. A microcapsule comprising:
a shell that has a three-dimensional cross-linked structure containing a hydrophilic group and Structure (1); and
a core that is in the interior of the shell,
wherein at least one of the shell or the core has a polymerizable group,

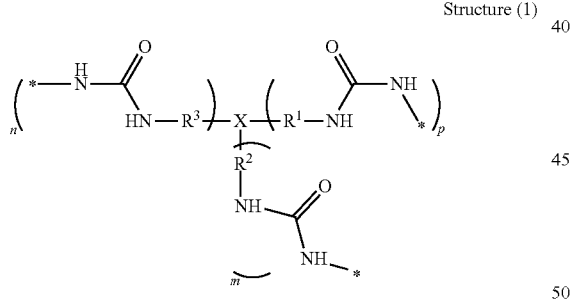

Structure (1)

in Structure (1), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from the organic group represented by X, in Structure (1), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (1), * represents a binding position, each of p, m, and n is equal to or greater than 0, and p+m+n equals 3 or greater.

2. The microcapsule according to claim 1,
wherein a content rate of Structure (1) in the shell is 8% by mass to 100% by mass with respect to a total mass of the shell.

3. The microcapsule according to claim 1,
wherein the shell contains at least one structure selected from Structure (2), Structure (3), or Structure (4), as Structure (1),

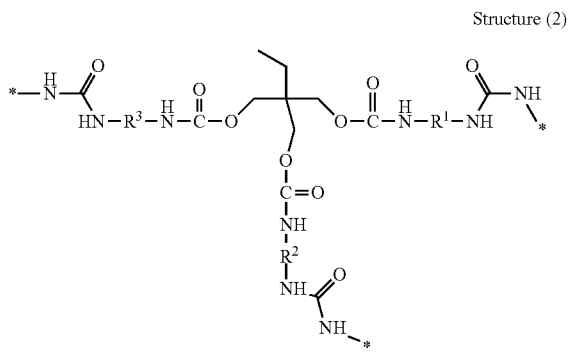

Structure (2)

in Structure (2), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (2), * represents a binding position,

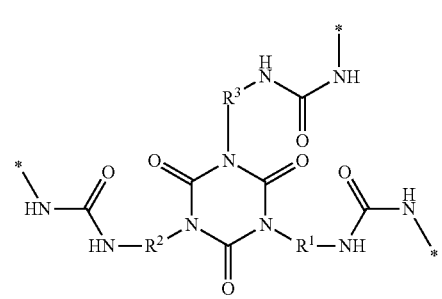

Structure (3)

in Structure (3), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (3), * represents a binding position, and Structure (4)

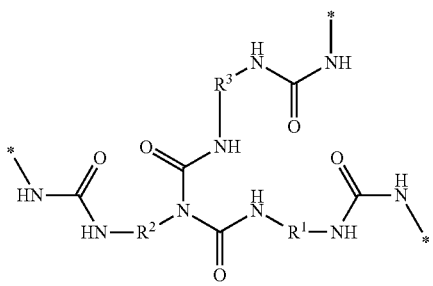

in Structure (4), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in Structure (4), * represents a binding position.

4. The microcapsule according to claim 1,
wherein the polymerizable group is a radically polymerizable group.

5. The microcapsule according to claim 1,
wherein the core contains a radically polymerizable compound.

6. The microcapsule according to claim 5,
wherein the radically polymerizable compound contains a di- or lower functional radically polymerizable compound and a tri- or higher functional radically polymerizable compound.

7. The microcapsule according to claim 1,
wherein the core contains a photopolymerization initiator.

8. The microcapsule according to claim 7,
wherein the photopolymerization initiator contains at least one of a carbonyl compound or an acylphosphine oxide compound.

9. The microcapsule according to claim 7,
wherein the core further contains a sensitizer.

10. The microcapsule according to claim 1,
wherein the polymerizable group is a thermally polymerizable group.

11. The microcapsule according to claim 1,
wherein the core contains a thermally polymerizable compound.

12. An aqueous dispersion comprising:
the microcapsule according to claim 1; and
water.

13. The aqueous dispersion according to claim 12, further comprising:
a colorant.

14. The aqueous dispersion according to claim 13,
wherein a content of an anionic surfactant is 1% by mass or less with respect to a total mass of the aqueous dispersion.

15. The aqueous dispersion according to claim 12,
wherein a total solid content of the microcapsule is 50% by mass or more with respect to a total solid content of the aqueous dispersion.

16. The aqueous dispersion according to claim 12, which is used as an ink jet ink.

17. A method for manufacturing an aqueous dispersion, comprising:
a preparation step of mixing an oil-phase component that contains a compound represented by General Formula (A), at least one compound of an isocyanate compound having a polymerizable group or a polymerizable compound, and an organic solvent, with a water-phase component that contains water and a compound having a hydrophilic group, and emulsifying and dispersing the mixture so as to prepare an aqueous dispersion,

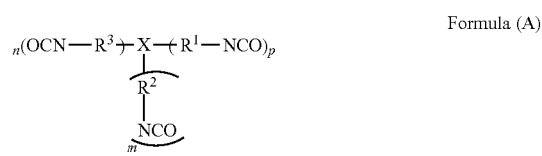

Formula (A)

in General Formula (A), X represents a (p+m+n)-valent organic group formed by linking at least two groups selected from —NH—, >N—, —C(=O)—, —O—, —S—, and an aliphatic hydrocarbon group which may have a ring structure, provided that an organic group having an aromatic ring is excluded from the organic group represented by X, in General Formula (A), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and in General Formula (A), each of p, m, and n is equal to or greater than 0, and p+m+n equals 3 or greater.

18. The method for manufacturing an aqueous dispersion according to claim 17,
wherein the compound represented by General Formula (A) includes at least one selected from compounds represented by General Formula (B), General Formula (C), or General Formula (D),

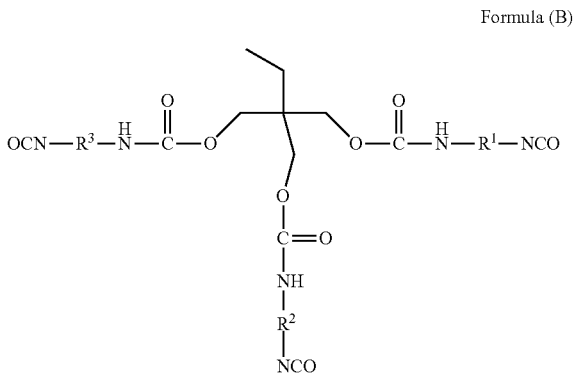

Formula (B)

in General Formula (B), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$,

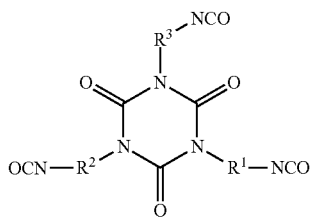

Formula (C)

in General Formula (C), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$, and

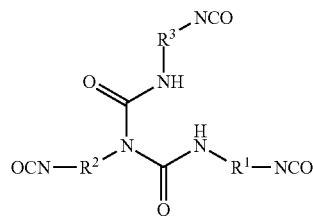

Formula (D)

in General Formula (D), $R^1$, $R^2$, and $R^3$ each independently represent an aliphatic hydrocarbon group having 5 to 15 carbon atoms which may have a ring structure, provided that an aliphatic hydrocarbon group having an aromatic ring is excluded from the aliphatic hydrocarbon group represented by $R^1$, $R^2$, and $R^3$.

19. An image forming method comprising:

an application step of applying the aqueous dispersion according to claim 12 onto a recording medium.

* * * * *